(12) United States Patent
Kloth

(10) Patent No.: US 12,008,246 B2
(45) Date of Patent: Jun. 11, 2024

(54) SECURE EXECUTABLE CODE UPDATE FOR A SECURELY-BOOTABLE PROCESSING CHIP

(71) Applicant: Axiado Corporation, San Jose, CA (US)

(72) Inventor: Axel K. Kloth, Pacifica, CA (US)

(73) Assignee: Axiado Corporation, San Jose, CA (US)

( * ) Notice: Subject to any disclaimer, the term of this patent is extended or adjusted under 35 U.S.C. 154(b) by 470 days.

(21) Appl. No.: 17/023,308

(22) Filed: Sep. 16, 2020

(65) Prior Publication Data

US 2021/0312053 A1 Oct. 7, 2021

Related U.S. Application Data

(60) Provisional application No. 63/068,675, filed on Aug. 21, 2020, provisional application No. 63/054,500,
(Continued)

(51) Int. Cl.
*G06F 21/57* (2013.01)
*G06F 3/06* (2006.01)
(Continued)

(52) U.S. Cl.
CPC .......... *G06F 3/0623* (2013.01); *G06F 3/0655* (2013.01); *G06F 3/0679* (2013.01);
(Continued)

(58) Field of Classification Search
CPC ...... G06F 21/57; G06F 21/572; G06F 21/575; G06F 21/602
See application file for complete search history.

(56) References Cited

U.S. PATENT DOCUMENTS

| 5,937,036 A | 8/1999 | Dean et al. |
|---|---|---|
| 6,868,492 B1 | 3/2005 | McCarty et al. |

(Continued)

FOREIGN PATENT DOCUMENTS

| CN | 109995507 A | 7/2019 |
|---|---|---|
| DE | 102010045580 A1 | 3/2012 |

(Continued)

OTHER PUBLICATIONS

U.S. Appl. No. 17/025,083 Non-Final Office Action dated Mar. 30, 2022.
(Continued)

*Primary Examiner* — Jaweed A Abbaszadeh
*Assistant Examiner* — Cheri L Harrington
(74) *Attorney, Agent, or Firm* — Wilson Sonsini Goodrich & Rosati

(57) ABSTRACT

Techniques in electronic systems, such as in systems including a processing chip and one or more external memory chips, provide improvements in one or more of system security, performance, cost, and efficiency. The processing chip includes immutable hardware enabled to securely boot one or more CPUs of the processing chip to execute code stored in a non-volatile one of the external memory chips, and to update the code. An update to the code is written to a portion of one of the external memory chips that is not accessible to the CPUs, and the immutable hardware copies the update to the non-volatile memory chip. The update is encrypted with a public portion of a key possessed by an entity sending the update, and a private portion of the key, used to decrypt code stored in the non-volatile memory chip, is unique to and solely possessed by the processing chip.

20 Claims, 13 Drawing Sheets

Related U.S. Application Data filed on Jul. 21, 2020, provisional application No. 63/010,326, filed on Apr. 15, 2020, provisional application No. 63/007,133, filed on Apr. 8, 2020, provisional application No. 63/004,288, filed on Apr. 2, 2020.

(51) Int. Cl.

| | | |
|---|---|---|
| *G06F 8/654* | (2018.01) | |
| *G06F 9/44* | (2018.01) | |
| *G06F 9/4401* | (2018.01) | |
| *G06F 21/12* | (2013.01) | |
| *G06F 21/54* | (2013.01) | |
| *G06F 21/60* | (2013.01) | |
| *G06F 21/64* | (2013.01) | |
| *G06F 21/72* | (2013.01) | |
| *G06F 21/75* | (2013.01) | |
| *G06F 21/79* | (2013.01) | |
| *G06F 21/82* | (2013.01) | |
| *H04L 9/08* | (2006.01) | |
| *H04L 9/14* | (2006.01) | |
| *H04L 9/32* | (2006.01) | |
| *G06F 21/10* | (2013.01) | |

(52) U.S. Cl.
CPC ............ *G06F 8/654* (2018.02); *G06F 9/4401* (2013.01); *G06F 9/4403* (2013.01); *G06F 9/4406* (2013.01); *G06F 21/12* (2013.01); *G06F 21/54* (2013.01); *G06F 21/57* (2013.01); *G06F 21/572* (2013.01); *G06F 21/575* (2013.01); *G06F 21/602* (2013.01); *G06F 21/64* (2013.01); *G06F 21/72* (2013.01); *G06F 21/75* (2013.01); *G06F 21/79* (2013.01); *G06F 21/82* (2013.01); *H04L 9/0861* (2013.01); *H04L 9/088* (2013.01); *H04L 9/0894* (2013.01); *H04L 9/14* (2013.01); *H04L 9/3278* (2013.01); *G06F 21/107* (2023.08); *G06F 2221/033* (2013.01); *G06F 2221/034* (2013.01)

(56) References Cited

U.S. PATENT DOCUMENTS

| | | | |
|---|---|---|---|
| 7,437,568 B2 * | 10/2008 | Das-Purkayastha | ............... G06F 21/6218 713/168 |
| 7,831,839 B2 | 11/2010 | Hatakeyama | |
| 7,945,792 B2 | 5/2011 | Cherpantier | |
| 8,060,732 B2 | 11/2011 | Jones et al. | |
| 8,533,444 B2 | 9/2013 | Jun | |
| 8,938,792 B2 | 1/2015 | Koeberl et al. | |
| 8,990,548 B2 | 3/2015 | Varnum et al. | |
| 9,177,122 B1 * | 11/2015 | Trier | ............... G06F 21/10 |
| 9,230,112 B1 * | 1/2016 | Peterson | ............... G06F 21/76 |
| 9,602,282 B2 | 3/2017 | Hussain | |
| 9,710,651 B2 | 7/2017 | Stewart et al. | |
| 9,755,831 B2 | 9/2017 | Laver et al. | |
| 9,930,051 B1 * | 3/2018 | Potlapally | ............. H04L 63/126 |
| 10,284,368 B2 | 5/2019 | Li et al. | |
| 10,331,593 B2 | 6/2019 | Lambert et al. | |
| 10,474,596 B2 | 11/2019 | Jayakumar et al. | |
| 10,592,671 B2 | 3/2020 | Chen et al. | |
| 10,742,421 B1 | 8/2020 | Wentz et al. | |
| 10,936,299 B2 | 3/2021 | Butcher et al. | |
| 11,144,652 B1 * | 10/2021 | Cochell | ................ H04L 9/3268 |
| 11,392,301 B2 | 7/2022 | Kloth | |
| 11,416,150 B2 | 8/2022 | Kloth | |
| 11,520,494 B2 | 12/2022 | Kloth | |
| 11,640,250 B2 | 5/2023 | Kloth | |
| 11,644,984 B2 | 5/2023 | Kloth | |
| 11,650,741 B2 | 5/2023 | Kloth | |
| 2002/0023206 A1 | 2/2002 | Klein | |
| 2002/0099950 A1 * | 7/2002 | Smith | ................ G06F 21/572 726/26 |
| 2003/0097558 A1 * | 5/2003 | England | ................ G06F 21/57 713/155 |
| 2004/0250056 A1 | 12/2004 | Chang | |
| 2005/0262571 A1 | 11/2005 | Zimmer et al. | |
| 2006/0053246 A1 | 3/2006 | Lee | |
| 2007/0260869 A1 | 11/2007 | Dade et al. | |
| 2007/0283140 A1 | 12/2007 | Jones et al. | |
| 2009/0089572 A1 | 4/2009 | Jun | |
| 2009/0222653 A1 | 9/2009 | Findeisen et al. | |
| 2009/0288160 A1 | 11/2009 | Esliger et al. | |
| 2010/0001786 A1 | 1/2010 | Ramachandran et al. | |
| 2011/0173457 A1 * | 7/2011 | Reh | ........ G06F 21/572 713/191 |
| 2012/0137117 A1 * | 5/2012 | Bosch | ..................... G06F 21/53 713/189 |
| 2012/0198224 A1 | 8/2012 | Leclercq | |
| 2012/0272296 A1 | 10/2012 | Hodzic et al. | |
| 2014/0164753 A1 | 6/2014 | Lee | |
| 2014/0189340 A1 | 7/2014 | Hadley | |
| 2014/0372670 A1 | 12/2014 | Vasilyuk | |
| 2015/0006914 A1 | 1/2015 | Oshida | |
| 2015/0012737 A1 * | 1/2015 | Newell | ................... G06F 21/44 713/2 |
| 2015/0199520 A1 | 7/2015 | Woolley et al. | |
| 2016/0013110 A1 | 1/2016 | Brokish et al. | |
| 2016/0147996 A1 * | 5/2016 | Martinez | ............... H04L 9/0877 713/171 |
| 2016/0300064 A1 | 10/2016 | Stewart et al. | |
| 2017/0126405 A1 | 5/2017 | Li et al. | |
| 2017/0312530 A1 | 11/2017 | Schilling et al. | |
| 2017/0366186 A1 | 12/2017 | Reese | |
| 2018/0089435 A1 | 3/2018 | Zander et al. | |
| 2018/0096151 A1 | 4/2018 | Ghetie et al. | |
| 2018/0145991 A1 * | 5/2018 | McCauley | ............ H04L 9/0891 |
| 2018/0165455 A1 | 6/2018 | Liguori et al. | |
| 2019/0311126 A1 | 10/2019 | Areno et al. | |
| 2020/0099815 A1 | 3/2020 | Ono | |
| 2020/0110880 A1 | 4/2020 | Ghetie et al. | |
| 2020/0117804 A1 | 4/2020 | Laffey et al. | |
| 2020/0151336 A1 | 5/2020 | Maletsky et al. | |
| 2020/0272480 A1 | 8/2020 | Admon et al. | |
| 2020/0320209 A1 | 10/2020 | Cohen et al. | |
| 2020/0356701 A1 * | 11/2020 | Pruss | ....................... G06F 21/78 |
| 2021/0192050 A1 | 6/2021 | Hird et al. | |
| 2021/0312051 A1 | 10/2021 | Kloth | |

FOREIGN PATENT DOCUMENTS

| | | |
|---|---|---|
| EP | 3214567 A1 | 9/2017 |
| EP | 3214797 A1 | 9/2017 |
| WO | WO-2014088172 A1 | 6/2014 |
| WO | WO-2014088239 A1 | 6/2014 |

OTHER PUBLICATIONS

U.S. Appl. No. 17/025,731 Non-Final Office Action dated Nov. 10, 2022.
U.S. Appl. No. 17/006,717 Non-Final Office Action dated Jun. 27, 2022.
U.S. Appl. No. 17/023,341 Final Office Action dated Jun. 30, 2022.
Co-pending U.S. Appl. No. 18/171,945, inventors Sirineni; Gopi et al., filed Feb. 21, 2023.
U.S. Appl. No. 17/006,717 Final Office Action dated Mar. 23, 2023.

\* cited by examiner

SECURE EXECUTABLE CODE UPDATE FOR A SECURELY-BOOTABLE PROCESSING CHIP

CROSS REFERENCE TO RELATED APPLICATIONS

To the extent permitted by the type of the instant application, this application incorporates by reference for all purposes the following applications, all commonly owned with the instant application not later than the effective filing date of the instant application:

U.S. Provisional Application Ser. No. 63/004,288, filed 2020 Apr. 2, first named inventor Axel K. KLOTH, and entitled SECURE BOOT OF A PROCESSING CHIP;

U.S. Provisional Application Ser. No. 63/007,133, filed 2020 Apr. 8, first named inventor Axel K. KLOTH, and entitled MANUFACTURING-TIME PROCEDURES TO ENABLE A PROCESSING CHIP FOR SECURE BOOT;

U.S. Provisional Application Ser. No. 63/010,326, filed 2020 Apr. 15, first named inventor Axel K. KLOTH, and entitled KEY MANAGEMENT AND UNIFIED MEMORY CONTROL FOR SECURE BOOT;

U.S. Provisional Application Ser. No. 63/054,500, filed 2020 Jul. 21, first named inventor Axel K. KLOTH, and entitled KEY MANAGEMENT AND UNIFIED MEMORY CONTROL FOR SECURE BOOT; and U.S. Provisional Application Ser. No. 63/068,675 filed 2020 Aug. 21, first named inventor Axel K. KLOTH, and entitled SECURELY BOOTING A PROCESSOR COMPLEX.

BACKGROUND

Field

Advancements in system security, such as secure boot of a system, are needed to provide improvements in factors such as one or more of intrusion and/or virus/malware prevention, performance, cost, and efficiency.

Related Art

Unless expressly identified as being publicly or well known, mention in the present disclosure of techniques and concepts, including for context, definitions, or comparison purposes, should not be construed as an admission that such techniques and concepts are previously publicly known or otherwise part of the prior art. References cited in the present disclosure (if any), including patents, patent applications, and publications, are hereby incorporated by reference in their entireties, whether specifically incorporated or not, for all purposes.

SUMMARY

The invention is implementable in numerous ways, e.g., as a process, an article of manufacture, an apparatus, a system, a composition of matter, and a computer readable medium such as a computer readable storage medium (e.g., media in an optical and/or magnetic mass storage device such as a disk, an integrated circuit having non-volatile storage such as flash storage), or a computer network in which program instructions are sent over optical or electronic communication links. The Detailed Description provides an exposition of one or more embodiments of the invention that enable improvements in factors such as one or more of security, cost, profitability, performance, efficiency, and/or utility of use in the field identified above. The Detailed Description includes an Introduction to facilitate understanding of the remainder of the Detailed Description. The Introduction includes Example Embodiments of one or more of systems, methods, articles of manufacture, and computer readable media in accordance with concepts described in the present disclosure. As is discussed in more detail in the Detailed Description, the invention encompasses numerous possible modifications and variations within the scope of the issued claims.

DETAILED DESCRIPTION

Figure 1:
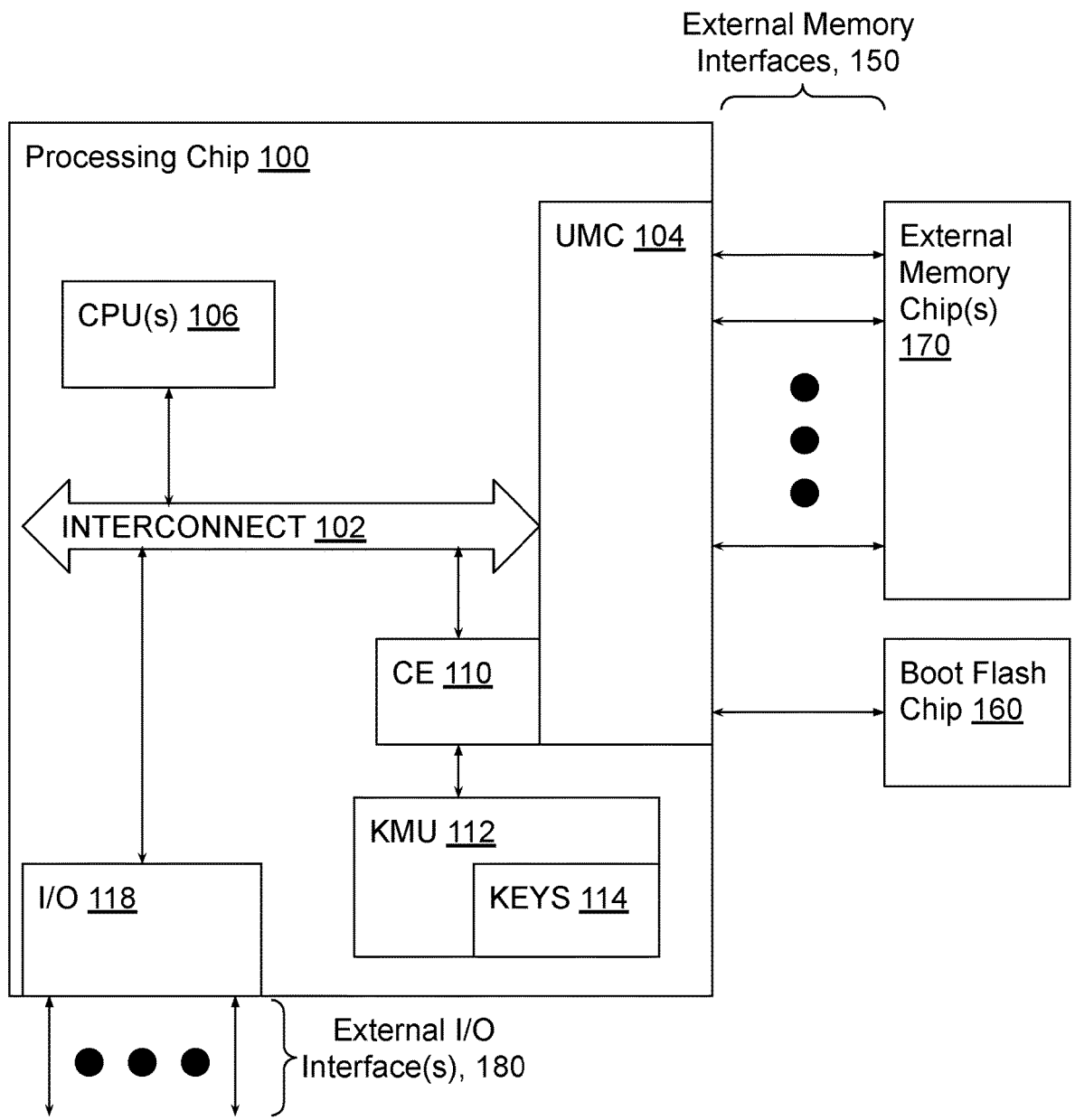
FIG. 1 illustrates an example of selected details of an embodiment of a basic processing chip.

A detailed description of one or more embodiments of the invention is provided below along with accompanying figures illustrating selected details of the invention. The invention is described in connection with the embodiments. The embodiments in the present disclosure are understood to be examples, the invention is expressly not limited to or by any or all of the embodiments in the present disclosure, and the invention encompasses numerous combinations, alternatives, modifications, and equivalents. To avoid monotony in the exposition, a variety of word labels (such as: first, last, certain, various, further, other, particular, select, some, and notable) may be applied to separate sets of embodiments; as used in the present disclosure such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, system, and/or program instruction features, other embodiments are contemplated that in accordance with a predetermined or a dynamically determined criterion perform static and/or dynamic selection of one of multiple modes of operation corresponding respectively to multiple of the multiple embodiments. Numerous specific details are set forth in the following description to provide a thorough understanding of the invention. In various embodiments, different numerical values may be used. The details are provided for the purpose of example and the invention may be practiced according to the claims without some or all of the details. For the purpose of clarity, technical material that is known in the technical fields related to the invention has not been described in detail so that the invention is not unnecessarily obscured.

INTRODUCTION

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

In some embodiments, security of an electronic system protects the system from an alteration in behavior by an adversary: unless the system is physically damaged (preventing it from booting), it should not be possible to corrupt the system in a way that alters its intended function after it is reset and rebooted. For example, a virus or malware is able to corrupt a running system, such as an IoT device, a firewall or a set-top box, but the virus or malware should not be able to install itself in a way where it is still present after a reboot, or where it has caused the system to cease performing its intended function ('bricking' the system).

Some security techniques attempt to render the system more immune to physical attacks (such as observing chip interfaces or examining contents of memory chips) by the adversary. Other security techniques attempt to render the system more immune to software attacks (such as viruses or malware). What is needed is a security system that is immune to a combination of physical attacks and software attacks. For example, even if the adversary has physical possession of the system (and can observe external interfaces and retrieve contents of non-volatile storage), and even if the adversary is simultaneously able (through viruses or malware) to temporarily gain control of the system, the adversary is unable (short of physical destruction) to alter state in the system that would prevent the system, after a reboot, from returning to its intended function. Techniques to accomplish this, as well as other security techniques, are described in the present disclosure.

Even if a system is secure after manufacturing and initial configuration, there remains the issue of keeping it secure when the system needs to be updated, such as updating to a newer version of executable code (e.g., firmware) used in the system. Current executable code updates are typically not secured against malicious attacks, and most executable code update mechanisms are not able to deal with power outages during an update and will corrupt the executable code image in non-volatile (e.g., flash) memory, and thus will 'brick' (permanently disable) the electronic device being updated. Consequently, a more secure executable code update process that is both secure against attack and takes into account the possibility of power-failure during writing to non-volatile memory is needed. An executable code update process may: ensure that updates are from a known (trusted) source; ensure that the update is only installed if it is verified (e.g., to be correct and/or from the known source); ensure that an update is not 'committed' unless it is successfully installed (e.g., any failure should cause the previous image to continue to be used); ensure that the executable code update process is not be able to be corrupted by viruses or malware (e.g., it must not be possible to install un-approved code, or to modify approved code in any way during the installation process); ensure that software executing on the system is not be able to tell what is being updated, or have any way of accessing (even just reading) the executable code update; enable separate updating of different portions (e.g., low-level vs. high-level) of the executable code; and/or provide separate security for the different portions of the executable code (so that an entity updating one portion is unable to affect another portion).

Common (e.g., Intel or AMD) processors, such as for servers or personal computers, are typically booted by initially having the processor execute code stored in a boot ROM (e.g., a flash chip). Some processors use a Trusted Platform Module (TPM) to provide security for booting, but these approaches generally rely on having a Core Root of Trust Module (CRTM), such as the bootblock of the BIOS, which is assumed to be trustworthy. Booting a processor using a TPM is typically a multi-step process involving successive checking of each additional software component (e.g., the BIOS, each driver, the operating system) to ensure that they have not been tampered with. This process is both time consuming and is only as trustworthy as the CRTM and the TPM.

Some processor systems include a Hardware Security Module (HSM) to provide security for critical data, such as for cryptographic keys. An HSM sometimes includes cryptographic hardware to use the cryptographic keys (e.g., to generate and/or to verify digital signatures) so that the cryptographic keys themselves need not be exposed. HSMs are often tamper-resistant and/or tamper-proof, for example by having features to erase their contents in case of a physical attack.

Systems sometimes provide a Root of Trust (RoT), and this is often associated with or part of a TPM and/or an HSM. The RoT provides the cornerstone around which all security is built, and frequently contains cryptographic keys and/or implements cryptographic functions (such as encryption, decryption, or authentication). For example, a piece of software can be trusted because it is authenticated by the RoT.

What is needed is a unified solution that provides techniques for quickly and securely booting processors as well as the features of one or more of a TPM, an HSM and a RoT, and with a higher degree of security than available today.

Processors (CPUs), Memory, and Processing Chips

Many electronic systems include at least one chip (such as an integrated circuit) containing one or more processors (also called Central Processing Units, or CPUs), and one or more memory chips external to the chip containing the one or more processors. In the present disclosure, a processor (also known as a CPU) refers to a hardware logic circuit that executes software (e.g., a program), and whose behavior is changeable by changing the software. Some examples of software include low-level software (such as firmware, drivers or a BIOS), an operating system, and an application. At a reset (such as a power-on reset), systems with one or more CPUs generally boot, that is the system is initialized so that one or more of the CPUs are able to execute specified software, starting with software that is part of a boot process. Secure boot refers to a boot process that is made more immune to physical and/or software attacks.

A chip containing one or more CPUs and implementing at least some of the techniques described in the present disclosure is called a 'processing chip'. FIG. 1 illustrates an example of selected details of an embodiment of a basic processing chip including CPU(s) 106.

In various embodiments, the techniques described in the present disclosure are implemented in a single chip, though multi-chip systems with interfaces (which are optionally and/or selectively encrypted interfaces) connecting the multiple chips are also contemplated. Without reservation, the term processing chip used in the present disclosure also refers to one or more integrated circuit chips (containing one or more CPUs) implementing at least some of the techniques described in the present disclosure. Further, the term 'on-chip' is used to specify that components or units are contained within the processing chip (i.e., as part of the circuitry of the processing chip), and does not restrict any such embodiment to be a single chip.

Some processing chips have multiple CPUs, and only some of the CPUs are able to be securely booted. In a first example, a processing chip includes a management CPU, and the management CPU uses its own boot sequence. In a second example, a processing chip includes two, separate subsystems, and CPUs in one of the subsystems are securely bootable, while CPUs in the other subsystem are not able to be securely booted.

For CPUs in a particular subsystem of a processing chip to be securely bootable, in some embodiments some restrictions are made. For example, in various embodiments, none of the run-time programmable CPUs in the particular subsystem are able to access particular hardware state of the subsystem, such as one or more keys used for encryption. In further embodiments, restrictions such as these on access to the particular hardware state of the particular subsystem apply equally to other subsystems of the processing chip. If exposure of the keys to attacks in the particular subsystem is a problem for the particular subsystem to be securely bootable, the keys need to be similarly inaccessible to the other subsystems (or an adversary is able to access the keys via the other subsystems). In the present disclosure, references to state being inaccessible by a CPU refer to the CPU not having programmatic (e.g., read or write) access to that state, and do not preclude the CPU from being able to specify a use of the state in an operation. For example, a key is inaccessible to a CPU (preventing the CPU from being able to determine a value of the key), and the CPU is able to specify a use of the key, such as by an index of the key, for use in an encryption or decryption operation.

To avoid repetition of phrases such as 'CPUs in a subsystem that are securely bootable', 'CPU' or 'CPUs' as used in the remainder of the present disclosure (unless otherwise stated, such as by specifically referring to one or more subsystems) refer to a CPU or CPUs in a subsystem that are securely bootable, and do not preclude the possibility of other subsystems (optionally with other CPUs) in a same processing chip.

In some embodiments, the one or more CPUs in the processing chip are identical and use a same CPU architecture (e.g., RISC-V® or ARMv8), use a same CPU configuration (e.g., 32-bit or 64-bit, a number of execution units, a number of load/store units, inclusion of other hardware units such as a floating-point unit, and other processor configuration options), use same other CPU architecture/design/construction parameters, and run at a same nominal maximum clock frequency. In other embodiments any one of the CPUs differs from one or more of the others in architecture, configuration, nominal maximum clock frequency, or another CPU architecture/design/construction parameter. For example, in some embodiments, a heterogeneous mixture of CPUs enables a given one of the CPUs to be optimized (such as for throughput, latency, or power efficiency) for the particular task or tasks it performs. The techniques described in the present disclosure are generally agnostic to the numbers and types of the one or more CPUs in the processing chip, though some embodiments advantageously use a heterogeneous mixture of CPUs for reasons such as throughput, latency, power efficiency, cost, compatibility with a given application, or other factors. Some examples of CPUs include single-core processors, multi-core processors, multi-threaded processors, graphics processors, speculative execution processors, out-of-order execution processors, RISC processors, CISC processors, microcoded processors, and a combination of the foregoing.

In various embodiments, one or more memory chips external to a processing chip are used for storage of data, including code that is executed by the CPUs. There are many types of memory generally characterized as either volatile (losing their contents when power is removed) or non-volatile (retaining their contents when power is removed). Examples of volatile memory types include Dynamic Random Access Memory (DRAM) and Static Random Access Memory (SRAM). Examples of non-volatile memory types include NOR flash, NAND flash, Phase Change Memory (PCM), and 3D Xpoint (e.g., Optane™) memory. Of course, many other types of memory are known in the art and the techniques described in the present disclosure are generally applicable to various types of memory.

Memory chips generally contain a single type of memory, though some memory chips contain a large amount of one type of memory and smaller amounts of one or more other types used internally for functions such as control or caching. For example, a NAND flash chip contains small amounts of SRAM used for buffering data to be written to (or that has just been read from) the NAND flash storage.

Different types of memory chips generally have a respective standard interface, enabling a processing chip implementing a particular one of the respective standard interfaces to communicate with a memory chip compatible with the particular standard interface. For example, for data transfer, DRAM chips have standards such as DDR3 or DDR4, NAND flash has a standard called ONFI-4, and NOR flash often uses a Serial Peripheral Interface (SPI) standard. Memory chips may be referred to by their type (e.g., a NAND flash memory chip), and/or by their interface (e.g., a SPI flash memory chip uses some type of flash memory with a SPI interface). SPI flash memory chips are often used to store initial 'boot' code (such as the BIOS in older personal computers) used when a system initially starts operation (such as after a reset). Some systems use NAND flash to store the initial boot code because of factors such as its generally higher bandwidth than SPI flash.

In addition to interface standards, many memory chips support some type of Serial Presence Detect (SPD) standard via which the processing chip is able to query the memory chips to determine their types and characteristics. (An SPD standard is sometimes part of and/or an annex to a corresponding interface standard.) Use of SPD enables systems to operate with different types and/or configurations and/or numbers of memory chips, as the types and configurations (e.g., size and other characteristics) and/or numbers are determinable when the system is powered on (or, in some embodiments, restarted) prior to when an initial operational transfer of data to or from the memory chips is performed. Use of the term 'SPD' in the present disclosure refers to an applicable memory querying technique, and, according to various embodiments, one or more types of SPD are used in a processing chip, depending on one or more factors such as: types of external memory interfaces supported; types of memory chips supported; versions of standards (e.g., DDR3 vs. DDR4); and/or other factors.

The techniques described in the present disclosure generally use a processing chip. Techniques that use data storage generally include one or more memory chips to store data. (In the present disclosure, memory chips are sometimes called 'external memory chips' to emphasize that, in various embodiments, they are external to the processing chip.) Techniques including CPU execution generally use one or more external volatile memory chips (such as DRAM chips or SRAM chips) to store data including executable code. Techniques including boot of a CPU generally use one or more external non-volatile memory chips, such as SPI flash or NAND flash.

Booting and Secure Boot

Booting a system that includes at least one processing chip refers to a series of operations starting from a reset (such as a power-on reset) of the system until one or more CPUs (in the at least one processing chip) are able to carry out their intended function(s). (Typically, a reset is performed by asserting a reset signal that initializes a certain or particular state in a chip or in a system. On de-assertion of the reset signal, the chip begins operation. In the present disclosure, 'receiving a reset', 'at a reset', or similar wording refer to a time just after reset is de-asserted, e.g. when hardware has been initialized by the reset having been asserted and is able to begin operation.) For example, booting a personal computer is generally complete when the Operating System (OS) is loaded and begins running or executing. (In the present disclosure, a CPU is generally said to execute software, and the software is generally said to run or to execute on the CPU.)

Booting generally involves some initial hardware operation (e.g., power-on or other reset circuitry to reset the system and start a CPU executing at a known address in a physical memory space of the processor), followed by the CPU executing software to continue the boot process. Processors usually boot directly from a non-volatile memory (e.g., a flash chip) by having that flash chip be mapped into the address space of the processors. At reset, the processors typically start executing at the known address, which is, e.g., hardwired to refer to a physical address in the flash chip. Booting, in some applications, involves multiple layers of software, such as a bootloader which includes an initial portion of executable code to run on the system after being booted. The bootloader in turn is responsible for loading other programs (which may in turn load yet other programs), until the final program such as an OS is loaded. During this process, operations such as self-test, discovering and configuring hardware in the system (e.g., SPD for external memories), and loading driver software that interfaces with internal hardware and external interfaces and/or chips are generally performed. Various standards exist for supporting boot of an OS, such as a Unified Extensible Firmware Interface (UEFI) standard, which is an improved version of a Basic Input/Output System (BIOS).

While the term 'executable code' is used in the present disclosure, it is understood that executable code comes in many forms and often includes both instructions and at least some non-instructions (e.g., data values to be used by the instructions). The instructions in the executable code are also understood to come in many forms. Generally, at least some of the instructions, such as the initial executable code to run on the system after being booted, are directly executable by a CPU. In some embodiments and/or usage scenarios, other instructions are interpreted by software (e.g., using scripting languages such as JavaScript, Forth, or Python).

The techniques in the present disclosure are generally agnostic to the specifics of the executable code (or other code executed by the CPUs in the processing chip). For example, secure boot techniques operate to allow desired software stored in non-volatile memory to be securely loaded at boot time and subsequently executed. The software optionally and/or selectively has one or more layers, such as a bootloader and an operating system (such as Linux™). This is not to say that a same bootloader is usable on both a traditional system and one implementing the secure boot techniques in the present disclosure, but rather that the techniques in the present disclosure are generally agnostic to a final platform-level program (such as an OS). Secure boot is different from a traditional boot process for a system, where many initial boot functions are carried out by software, leaving the system exposed to attacks. Accordingly, in some embodiments, the initial executable code used with a processing chip supporting secure boot techniques is customized for that particular processing chip application.

Secure boot is part of providing a secure system—if initial code that is loaded and executed cannot be guaranteed to be unchanged (e.g., not corrupted by a virus or malware), then the system as a whole cannot be guaranteed to perform its intended function properly. According to various embodiments, the described secure boot techniques provide advantages including one or more of: the initial code is not limited to lower-level boot code, and optionally and/or selectively includes one or more layers of programs, such as an operating system and/or applications to be securely booted; the initial code is stored encrypted, not just when in non-volatile storage, but in an attached external storage, rendering the initial code unobservable by physical means; the initial code is stored in local, non-volatile storage so that stand-alone devices are able to securely boot; the initial code is encrypted, such as with a hardware-created, chip-unique key that, after manufacturing of the secure system, is optionally and/or selectively only usable to read the initial code; the hardware-created, chip-unique key is one of multiple hardware-created, chip-unique keys at least some of which are usable by applications (or other software) executing on the processing chip; some or all external memory of the processing chip is maintained encrypted, such as by using one or more of the hardware-created, chip-unique keys; on every boot, CPUs in the processing chip are held in a reset state until the initial code is securely loaded; because the initial code is stored encrypted (and in some embodiments is only decryptable using one of the hardware-created, chip-unique keys) an authentication of the initial code (such as to verify a source of the initial code, and as distinct from an integrity check on the initial code, such as a Cyclic Redundancy Check) is only performed once when the initial code is written to non-volatile storage; in embodiments where the initial code is stored encrypted and is only decryptable using one of the hardware-created, chip-unique keys, it is not possible to copy the initial code from the non-volatile storage for use on another device; secure boot may be performed without an external communication, other than with external memory chips that are directly connected to the processing chip; and other advantages as described in the present disclosure. In further embodiments, an ability to securely boot an operating system enables operation of totally stand-alone secure systems, such as Internet of Things (IoT) devices.

According to various embodiments, executable code that is loaded by secure boot includes one or more of: a bootloader; firmware, such as UEFI; an operating system kernel; an operating system; a hypervisor; a virtual machine manager; DLLs and other libraries; device drivers; application code; updates or patches to any of the preceding; other code used in an application of a processing chip; and a combination of the foregoing. In further embodiments, in order to keep a size of an operating system kernel small so verifying and hardening of the kernel is easier, applications are run in a virtual machine and optionally and/or selectively have their own, dedicated memory space.

Immutable Hardware, Immutable Hardware (H/W) Boot Sequence, and Software (S/W) Boot Sequence As part of and/or in addition to secure boot, many other techniques are contemplated as part of improvements in system security, system efficiency, and/or other factors. These techniques are optionally and/or selectively usable either separately or collectively in a combination and include one or more of: separating a boot process into an immutable hardware (H/W) boot sequence that subsequently initiates a software (S/W) boot sequence; a hardware Key Management Unit (KMU) to create (using, for example, a hardware random number generator) and protect (such as in on-chip, one-time programmable storage) keys (such as for cryptographic and/or scrambling operations) that are unique to a given processing chip; a manufacturing-time procedure for the given processing chip that initializes the respective KMU (creating the processing-chip-unique keys) and then associates a non-volatile memory chip (such as a SPI flash chip) with the processing chip by loading the non-volatile memory chip with data (such as executable code) encrypted using one of the processing-chip-unique keys; a Unified Memory Controller (UMC) that handles external memory for the processing chip and is able to treat the external memory as a unified encrypted domain; and other techniques described in the present disclosure. If the executable code that is encrypted and loaded into the non-volatile memory chip is used for the S/W boot sequence of the processing chip, the non-volatile memory chip in the present disclosure is called a 'boot flash chip' (although it optionally uses any non-volatile memory type and/or interface, and in some embodiments includes multiple non-volatile memory chips). A first example of a boot flash chip is a single SPI flash chip. A second example of a boot flash chip is a NAND flash package (containing multiple NAND flash chips). A third example of a boot flash chip is a solid-state disk or an eMMC card.

In the present disclosure, the 'manufacturing time' of processing chip refers to a time before the processing chip is put into 'operational use' (such as running or executing an application in real-world use, and more fully defined below). According to various embodiments, manufacturing time includes one or more of: a chip-level manufacturing time (e.g., fabricating an integrated circuit die and packaging the integrated circuit die in a package); a system-level manufacturing time (e.g., assembling the packaged integrated circuit die on a circuit board with other components); other procedures performed at times prior to operational use of the processing chip; and a combination of the foregoing.

The term Read-Only Memory (ROM) in the present disclosure is used to refer to a memory that is manufacturing-time-programmed and/or One-Time Programmable (OTP), such as an on-chip, mask-programmed ROM, an on-chip, manufacturing-time, fuse-programmable ROM, and/or other types of on-chip, manufacturing-time-programmed or OTP memory (including field-programmable OTP memory). (To be clear, one-time programmable, e.g. write-once, memories are considered ROMs in the present disclosure because they are read-only once programmed, and the programming occurs before an operational use, such as application-level use, of the processing chip.) Because the ROM is on a same processing chip as the logic circuitry it is associated with and/or controls, such as a microcontroller, and is not changeable once programmed, operations performed by the logic circuitry are effectively immutable after the chip is manufactured (or in some embodiments and/or usage scenarios, after the ROM is programmed). In various embodiments, no mask-programmed ROMs are used. For example, in various embodiments, on-chip ROMs are one-time programmable, or are built out of hardware logic circuitry (such as a look-up table).

In some embodiments, an initial portion of a boot sequence for a system including a processing chip is performed entirely by immutable hardware. For example, a boot sequence is divided into an initial immutable H/W boot sequence begun at a reset and which, at some point, initiates a S/W boot sequence. In various embodiments, the immutable H/W boot sequence terminates when the S/W boot sequence commences, while in other embodiments portions of the immutable H/W boot sequence continue to operate after the S/W boot sequence commences. For example, overall boot time is advantageously sped up by starting the S/W boot sequence once an initial portion of the executable code used by the S/W boot sequence is securely loaded into DRAM. In various embodiments, use of immutable hardware renders the operations performed by that hardware immune to attacks such as from viruses and malware, as the hardware (and thus the operations it performs) are not changeable without physical tampering (which may be impossible without physical possession of the system, and may end up destroying the system rather than changing its behavior).

In the present disclosure, the immutable H/W boot sequence is sometimes shortened to just 'H/W boot sequence'.

Immutable hardware is a type of autonomous hardware whose function has been rendered unchangeable (not able to be configured or controlled externally) and is thus immune to non-physical attacks. For example, a function of immutable hardware used for a H/W boot sequence on a particular processing chip is to perform copying of contents of a boot flash chip that has been associated with the particular processing chip, and to reject as invalid any other flash chip. This function is typically not influenceable by any external configuration or control, or by other hardware (including any run-time programmable CPUs) on the processing chip, and is thus immutable. This is not to say that the function performs an identical sequence of operations on every processing chip, but rather that, given the associated boot flash chip (assuming it has not been corrupted or altered), the particular processing chip performs a same copying function every time the immutable hardware is initiated. Even in embodiments and/or usage scenarios where the boot flash chip contains metadata configuring the copying of the contents, for example by configuring parameters such as a length of the copying, a key to be used to decrypt the contents, and/or other similar parameters, a function of the immutable hardware (to perform the copying according to the contents) is not changeable.

A first example of immutable hardware is one or more Finite State Machines (FSMs) implemented in circuitry as part of the processing chip. In various embodiments, these FSMs operate separately, in whole or in part in parallel, cooperatively, or a combination thereof in order to perform the immutable H/W boot sequence. A second example of immutable hardware is a microcontroller, such as a RISC processor, a PIC-16 processor, or a hardware logic circuit with a sequencer (such as a microsequencer), operating from instructions contained in an on-chip ROM. In some embodiments, use of a microcontroller with an on-chip ROM for immutable hardware enables sequences to be more easily constructed, and allows for easier customization (such as prior to or during manufacturing) of immutable hardware operations. If the on-chip ROM is field-programmable (e.g., subsequent to fabrication of the processing chip), then the hardware is not immutable until such programming is complete. A third example of immutable hardware is a combination of one or more of the first two examples, operating one or more of: separately (such as on different portions of the immutable H/W boot sequence); in whole or in part in parallel on one or more portions of the immutable H/W boot sequence; cooperatively on one or more portions of the H/W boot sequence; and a combination of the foregoing. In other embodiments, the immutable H/W boot sequence does not use any microcontrollers. For example, in some embodiments, all control of operations of the immutable H/W boot sequence is via FSMs.

According to various embodiments, immutable hardware of a processing chip is made unchangeable once fully configured by one or more of: using mask-programmable state, such as a mask-programmed ROM, that is not changeable subsequent to manufacturing of an integrated circuit die (e.g., the processing chip); using manufacturing-time fuse (or antifuse) state that is only changeable during a manufacturing-time configuration of an integrated circuit die (e.g., the processing chip), such as by using physical access to the die to change the state (e.g., with lasers), or by disabling hardware used to change the state as a last-such change; using on-chip, field-programmable ROM, and disabling hardware used to program the on-chip, field-programmable ROM once it has been programmed (such as by setting a bit in the on-chip, field-programmable ROM that disables further programming of the on-chip, field-programmable ROM); other similar techniques; and a combination of the foregoing. Notwithstanding the preceding, in some usage scenarios even immutable hardware is changeable, though generally only with extraordinary measures to which an integrated circuit is susceptible. One example of changing immutable hardware is ION beam milling, which is sometimes performed to repair a defective or incorrectly designed chip as part of initial testing. ION beam milling involves not just physical access to the chip, but also detailed knowledge of the layout of the chip (where the circuitry that needs to be changed is located).

While a microcontroller used as part of the immutable H/W boot sequence has been described above as operating from instructions contained in an on-chip ROM, in some embodiments the instructions for the microcontroller are stored in an encrypted form in the boot flash chip, and (via other parts of the immutable hardware) are read from the boot flash chip, decrypted, and loaded into an on-chip SRAM used by the microcontroller. In various embodiments, encryption of the control information for the microcontroller uses one of the processing-chip-unique keys that is not usable by the CPUs in the processing chip. Provided that the microcontroller instructions stored in the boot flash chip are unchangeable (other than by physical attacks that render the processing chip unable to boot), a function of the immutable hardware is not changed by storing unchangeable instructions external to the processing chip.

In various embodiments, a processing chip has other hardware than the immutable hardware used to perform the H/W boot sequence, and the other hardware is optionally and/or selectively changeable at any time. In a first example, a state in an on-chip ROM is used to enable (or disable) use of one of the external I/O interfaces of the processing chip so that a same version of a system containing the processing chip is sellable as two different products with different capabilities. In a second example, autonomous hardware is used to perform at least part of a manufacturing-time procedure to configure the processing chip. Subsequent to the manufacturing-time procedure being performed, a state in an on-chip ROM is changed, rendering a portion of the autonomous hardware immutable, and the immutable hardware used to perform the H/W boot sequence includes the portion of the autonomous hardware rendered immutable.

Autonomous hardware, such as immutable hardware, includes hardwired logic, finite state machines, and/or microcontrollers. Autonomous hardware, unlike immutable hardware, is optionally and/or selectively controllable (changeable in function) and/or configurable (changing parameters that modify behavior of functions). In a first example, autonomous hardware used as part of a manufacturing-time procedure includes a microcontroller associated with an on-chip SRAM providing control for the microcontroller. The on-chip SRAM is loaded prior to initiating operation of the autonomous hardware to change a function of the autonomous hardware, such as to change a type of key generation to be performed. In a second example, autonomous hardware used as part of a manufacturing-time procedure receives inputs providing configuration parameters that modify a function performed by the autonomous hardware. The autonomous hardware performs key generation, and the configuration parameters modify a number and/or a type of keys that are generated by the autonomous hardware. In a third example, autonomous hardware used as part of a manufacturing-time procedure associates a flash chip with a particular processing chip by encrypting data stored in an external memory with a key unique to the particular processing chip, and writing the encrypted data to the flash chip. After the flash chip is written, a state in an on-chip ROM is changed preventing the key from being used in any subsequent encryption operation (thus changing the function of the autonomous hardware).

In order to distinguish a microcontroller (or other circuitry whose behavior is controlled by an on-chip ROM) from the CPUs, the CPUs in the present disclosure are run-time programmable, in that they are able to execute arbitrary software (under control of whatever program, such as an operating system, is loaded from the boot flash chip). A microcontroller or other circuitry whose operation is controlled by an on-chip ROM is part of the autonomous hardware or the immutable hardware, and is not considered in the present disclosure to be run-time programmable.

In various embodiments, the one or more CPUs in the processing chip are held in a reset state during at least an initial part of the H/W boot sequence, such as until (encrypted) executable code has been loaded from a boot flash chip into an external memory (such as a DRAM) and the processing chip has been configured to enable at least one of the CPUs to fetch an initial instruction of the executable code (such as from the external memory). Holding the CPUs in a reset state prevents software that has not been securely loaded from being executed. According to various embodiments, the respective reset state of each of the CPUs is one or more of: asserting a reset signal to the CPU; enabling the CPU to begin execution but deferring a response to the CPU's initial instruction fetch; keeping the CPU powered-down; keeping the CPU in a low-power standby state in which it is idle; and one or more other technique for preventing, delaying, or deferring the CPU from fetching instructions or data. In some embodiments, the one or more CPUs are held in the reset state until released from the reset state as part of the H/W boot sequence. In other embodiments, the H/W boot sequence releases an initial one of the one or more CPUs from the reset state, and the initial CPU is enabled, as part of the S/W boot sequence, to release others of the one or more CPUs from the reset state, such as part of the S/W boot sequence. This advantageously simplifies the S/W boot sequence by enabling software to determine an order in which subsequent ones of the one or more CPUs begin operating.

Cryptographic Engine and Key Management Unit

In some embodiments, a Cryptographic Engine (CE) is coupled (via a fast and/or wide interface) with a Key Management Unit (KMU), so that the KMU is able to supply keys to the CE for cryptographic or other operations. FIG. 1 illustrates an example of selected details of an embodiment of a basic processing chip including CE 110 and KMU 112.

The CE generally operates on data units such as 512-byte cache lines, though a size of the data units is application-dependent (and some embodiments optionally and/or selectively support multiple sizes of the data units). According to various embodiments, the CE implements one or more types of encryption (and corresponding types of decryption): data scrambling using a reversible scrambling process (which in the present disclosure is considered to be a quick but less secure form of encryption); symmetric key encryption (such as AES with 128-bit or 256-bit keys); asymmetric or public key encryption (such as RSA encryption with 1024-bit keys or elliptic curve encryption with 256-bit or 1K-bit keys); other known cryptographic or scrambling techniques; and a combination of the foregoing. In further embodiments, the CE is enabled to encrypt traffic going to an external memory chip, and to decrypt traffic coming from an external memory chip. In yet further embodiments, the CE is enabled to encrypt all traffic going to any external memory chip, and to decrypt all traffic coming from any external memory chip.

In various embodiments, a size of the data unit used by the CE is according to a type of encryption (or decryption) used. In a first example, in some embodiments, a scrambling operation uses data units smaller than those used for a cryptographic operation, and the cleartext and ciphertext for the scrambling operation are a same size. In a second example, in various embodiments, AES encryption operates on 128-bit data units and the cleartext and ciphertext are a same size. In a third example, in further embodiments, RSA encryption operates on 100-byte cleartext data units and produces 128-byte ciphertext data units. In yet further embodiments, if a length of data to be encrypted is not as long as a size of a data unit used by a desired encryption technique, the data to be encrypted is padded (such as with zeros) to the size of the data unit.

An example of data scrambling is to optionally and/or selectively combine (such as with an XOR or another reversible function) input data with a key provided by the KMU, and permute the resulting bits in a reversible way, including permutations that depend on the input data itself. Generally, kinds of reversible functions and/or kinds or amounts of permutations used by scrambling are much simpler than corresponding operations used in modern cryptography, such as AES, RSA or 3DES. For example, in a particular implementation, data scrambling is designed to operate in one cycle, whereas RSA encryption is designed to operate in, e.g., nine cycles. There is a trade-off between latency of access to external memory via encryption/decryption functions of the CE and a strength of encryption. For example, using scrambling for encryption/decryption provides a shorter latency for reads and writes to external memory and is able to maintain contents of the external memory as unique to a given processing chip, but is more susceptible to an attack if data on interfaces to the external memory is monitorable. Scrambling, as used in the present disclosure, refers to a type of scrambling, either with or without a key being combined with data being scrambled. Key-less scrambling is used to specifically refer to scrambling in which there is no combination with a key. As described previously, scrambling is considered to be a form of encryption, and this includes key-less scrambling. When a key is referred to as part of encryption (or decryption), a type of that encryption (or decryption) is optionally and/or selectively a scrambling type, but not a key-less scrambling type.

In some embodiments, a hardware Random Number Generator (RNG) is used in the KMU as part of a manufacturing-time procedure that creates keys unique to a specific processing chip. In further embodiments, the hardware RNG includes a Physically Unclonable Function (PUF) that generates results unique to a given processing chip containing such a PUF. An example PUF generates results that are highly dependent on the given processing chip containing the PUF and/or on the current environmental conditions in which the given processing chip is operated, such as by generating Process-sensitive, Voltage-sensitive, and/or Temperature-sensitive (PVT-sensitive) results. For example, a ring oscillator is generally PVT-sensitive, and sampling a long ring oscillator at a stable clock frequency produces PVT-sensitive results that are random and unpredictable. More complicated PUFs are also contemplated, such as by using multiple ring oscillators (at different nominal frequencies) and combining their results, and/or using other techniques such as results dependent on transistor threshold variations. The techniques in the present disclosure are generally agnostic to a type of PUF used, though some embodiments advantageously use a particular type of PUF for reasons of performance, efficiency, compatibility with security standards, or other factors.

In various embodiments, the KMU is used to create and store (at a manufacturing-time of the specific processing chip) one or more keys that are used for cryptographic and/or scrambling operations. In some embodiments, a KMU key-creation process performed at manufacturing time includes one or more of the following operations: creating a primordial key, such as with a secure hash (e.g., SHA-512) from a combination of known information such as one or more of a company name, a product line, a product name, and/or a product and/or processing chip identification (e.g., a serial number); combining, such as by one or more secure hashes, the primordial key with PUF-generated values to produce a large (e.g., 8K-bit or 8.6K-bit) Unique Identification (in the present disclosure called an 'unclonable unique identifier' or 'UUID'); using the UUID in combination (e.g., via secure hashes) with further PUF-generated values to create a 512-bit default key to be used for system-level encryption such as for contents of the boot flash chip; similarly creating a set (for example, 15 or 16) of additional 512-bit keys that are usable by software for other cryptographic and/or scrambling operations; storing these keys (and the UUID) in an on-chip ROM; and other initial operations. An order in which these operations are performed is implementation-dependent, and in different embodiments the operations are performed in different orders and/or at least some of the operations are optionally and/or selectively performed in whole or in part in parallel. Of course, sizes and numbers of keys are application-dependent, and specific sizes of keys or of corresponding hash, cryptographic and/or scrambling functions used in the present disclosure are just examples. In various embodiments, different techniques are used to combine the known information and PUF-generated values to generate the primordial key and/or the UUID. In some embodiments, the UUID as generated is a first size, such as a size at least as large as all of the keys to be generated from the UUID, and the UUID as saved in on-chip ROM is a second, smaller size, such as produced by one or more hashes of respective portions of the UUID. In further embodiments, other functions are performed on the keys, either as part of the KMU key-creation process or later as part of using the keys, to render them suitable for a particular cryptographic technique (e.g., generating a 256-bit public/private key pair from a 512-bit key).

In the present disclosure, the default key and the set of additional keys created at manufacturing time, some or all of which are usable directly and/or indirectly by software, are called the KMU initial keys. The KMU initial keys are persistent in that, once created and stored in the on-chip ROM, the keys remain for the life of the processing chip. The KMU initial keys (including the default key) are unique to a respective processing chip in which they were created (because the PUF on the respective processing chip generates values that are physically unclonable) and are impossible to reproduce. Further, in some embodiments, because the KMU initial keys are only accessed by hardware (and are not accessible by the run-time programmable CPUs in a processing chip), the KMU initial keys are effectively unknowable. But they are usable by the run-time programmable CPUs such as by specifying a particular one of the KMU initial keys (for example, the default key, or key number three in the set of additional keys) to be used for a particular data transfer. In some embodiments, any one of the run-time programmable CPUs is able to refer to keys by a respective index number (such as a respective position in the set of additional keys) to specify a given one of the keys for use in a particular data transfer operation. In further embodiments, for at least some of the ones of the KMU initial keys that are generated as public/private key pairs, only the private portion of the key is inaccessible to the run-time programmable CPUs, and the run-time programmable CPUs are able to read the public portion of the key for uses such as external communication or authentication with another entity. For example, the public portion of the key is shared to establish communication, and encryption or decryption is handled by immutable hardware, keeping knowledge of the private portion of the key safe from any adversary.

In further embodiments, the KMU is able, under control of software (including the executable code in the boot flash chip), and once the run-time programmable CPUs begin executing, to create further keys for software uses, but these further keys are not stored in an on-chip ROM (and are, for example, stored in external memory), and thus do not have a same level of security as the KMU initial keys which are inaccessible to any run-time programmable CPU. The primordial key, because it is a function of known elements, is able to be recreated (by anyone knowing the known elements and the particular type of secure hash or other operation used to create the primordial key). This is used to advantage to enable, under appropriate authorization (such as knowledge of the primordial key) of securely-booted software running or executing on the processing chip (if not disabled such as by a manufacturing-time fuse setting), an authorized user to perform functions such as an update of some or all of contents of the boot flash chip. According to various embodiments, the primordial key is made more difficult to determine by one or more of: keeping portions of the known elements, such as a processing chip identification number, secret (e.g., not existing outside of secure databases, such as in a private database of a manufacturer of a system containing the processing chip); only enabling (in immutable hardware) use of the primordial key to be one-time at a given power-on of the processing chip, so that attempts to guess the primordial key are significantly slowed down; other similar techniques; and a combination of the foregoing.

Manufacturing-Time Procedure

In some embodiments, a manufacturing-time procedure is used to initially configure the processing chip and associate it with a boot flash chip (such as a SPI flash chip) containing known-good code that is used to boot the processing chip. In some embodiments, once associated in this fashion at manufacturing time, the processing chip is only bootable using the associated boot flash chip, and/or the code in the associated boot flash chip is only executable by that processing chip. This manufacturing-time procedure is in addition to other manufacturing-time operations generally performed for or with integrated circuits, such as inspection, testing, packaging, system-level assembly and testing, etc. In further embodiments, an external memory interface of the processing chip used to access the boot flash chip is one or more of: a sole external memory interface that supports the boot flash chip; an external memory interface that is not usable by any run-time-programmable CPU; an external memory interface that is optionally and/or selectively only usable for write to the boot flash chip at manufacturing time; and other techniques to secure contents of the boot flash chip.

According to various embodiments, the manufacturing-time procedure performs one or more of the following operations: initialization of the processing chip including the UMC, the CE, and the KMU; performing the manufacturing-time KMU key-creation process to create the KMU initial keys and other information (such as the UUID) stored in the KMU; providing software to the processing chip to be written into the boot flash chip via the CE which encrypts the software, such as by using the default key from the KMU (or a particular one of the KMU initial keys) so as to uniquely associate the software in the boot flash chip with this processing chip; and other operations for initial configuration of the processing chip. An order in which these operations are performed is implementation-dependent, and in different embodiments the operations are performed in different orders and/or at least some of the operations are optionally and/or selectively performed in whole or in part in parallel. The software that is loaded into the boot flash chip as part of the manufacturing-time procedure is software that is desired to be securely booted. One example is a boot loader and an operating system such as Linux. Another example is an embedded operating system or a Real-Time Operating System (RTOS).

According to various embodiments, the manufacturing-time procedure is performed by one or more of: immutable hardware; using JTAG (Joint Test Action Group) control; using special test pins and/or pins that are operable for the manufacturing-time procedure only at manufacturing time; other manufacturing-time configuration techniques; and a combination of the foregoing. In further embodiments, once the manufacturing-time procedure completes, an on-chip fuse is blown (or other on-chip ROM state is set) prohibiting the manufacturing-time procedure from being performed a second time. In various embodiments, other on-chip fuses are optionally and/or selectively blown (and/or other on-chip ROM state is optionally and/or selectively set) to configure the processing chip for desired behaviors. In a first example, a first on-chip fuse controls whether software updates are to be permitted. If this first fuse is blown at manufacturing time, then the processing chip hardware will not be able to repeat the manufacturing-time procedure (and thus will not be able to update the boot flash chip, or write a second chip usable as a boot flash chip). In a second example, a second on-chip fuse is blown at completion of the manufacturing-time procedure. This second fuse disables at least some JTAG operation so that attempts to repeat the manufacturing-time procedure or to probe portions of the processing chip able to directly or indirectly access state in the KMU or the CE via JTAG will fail.

In some embodiments, a special one of the KMU initial keys used to encrypt and decrypt executable code stored in the boot flash chip is used solely for that purpose. When contents of the boot flash chip are copied to another memory, such as an external DRAM, as part of the H/W boot sequence, the executable code is decrypted with this special key and then re-encrypted with the default key (or another one of the KMU initial keys other than the special key) prior to writing the executable code to the external DRAM. In systems where on-chip ROM state is set (after the boot flash chip is initially written) to disable a second attempt to write the boot flash chip, this advantageously makes it impossible, even with full control of the software running or executing on the processing chip, to change or replace the boot flash chip, as the special key (which, like the other manufacturing-time-created keys of the KMU, is not CPU-accessible) is no longer usable for a write operation to a boot flash chip (or alternatively, for a write operation to an external memory). Consider the alternative where an adversary with physical access to the processing chip and full control of software running or executing on it, such as via a virus or malware, is able to use the default key to write their own boot flash chip, perhaps by just writing the desired code to DRAM, observing the DRAM interface to snoop the code in an encrypted form, and then writing the snooped code to a duplicate boot flash chip. With physical control of the system, the adversary can swap their boot flash chip for the manufacturing-time-programmed one, and the system would no longer be secure.

Many variations of the preceding are contemplated that also effectively render unrepeatable the manufacturing-time procedure used to write the boot flash chip for a given processing chip, so that there is no possible manner in which the boot flash chip associated with the given processing chip is able to be changed and so that a second boot flash chip usable with the given processing chip is not creatable. These variations, after writing the boot flash chip associated with the given processing chip and verifying correctness of the associated boot flash chip, use on-chip ROM state to render at least a portion of the manufacturing-time procedure that was used to write the boot flash chip unrepeatable. In some embodiments, at least some of these ways also restrict the boot flash chip to be attachable only on a specific one of the external memory interfaces of the given processing chip. Some of these ways also use a particular one of the KMU initial keys other than the default key to encrypt contents of the boot flash chip. According to various embodiments, the at least a portion of the manufacturing-time procedure is rendered unrepeatable by using the on-chip ROM state to one or more of: disable write operations on the specific external memory interface; prevent the key used to encrypt contents of the boot flash chip from being used for at least one and, in some embodiments, any encryption operation destined for the specific external memory interface; prevent the particular key from being used for at least one and, in some embodiments, any encryption operation; prevent the particular key from being used by at least one and, in some embodiments, any run-time programmable CPU; other techniques to render the manufacturing-time procedure unrepeatable; and a combination of the foregoing. In further embodiments where the particular key is used as a public/private key pair, the particular key is prevented from being used for at least one and, in some embodiments, any encryption operation by destroying the private (or alternatively the public) portion of the particular key, such as by over-writing state in an on-chip ROM holding the private (or alternatively the public) portion of the particular key.

An operational use of a processing chip in the present disclosure refers to a use of the processing chip for an intended application (e.g., as an IoT device) after the manufacturing-time procedure has configured the processing chip and has associated the processing chip with a boot flash chip containing the executable code used for the intended application. Generally, initial functional operation (such as booting to test the intended application) of a processing chip occurs as a final stage of system-level testing prior to shipping and/or deployment of a system including the processing chip. In some embodiments and/or usage scenarios, a final portion of the manufacturing-time procedure is not performed until after such system-level testing, such as changing on-chip ROM state to prevent creation of another boot flash chip usable with the processing chip. Such use during system-level testing is not considered an operational use in the present disclosure, unless the manufacturing-time procedure has been completed.

Boot Flash Chip

Figure 6:
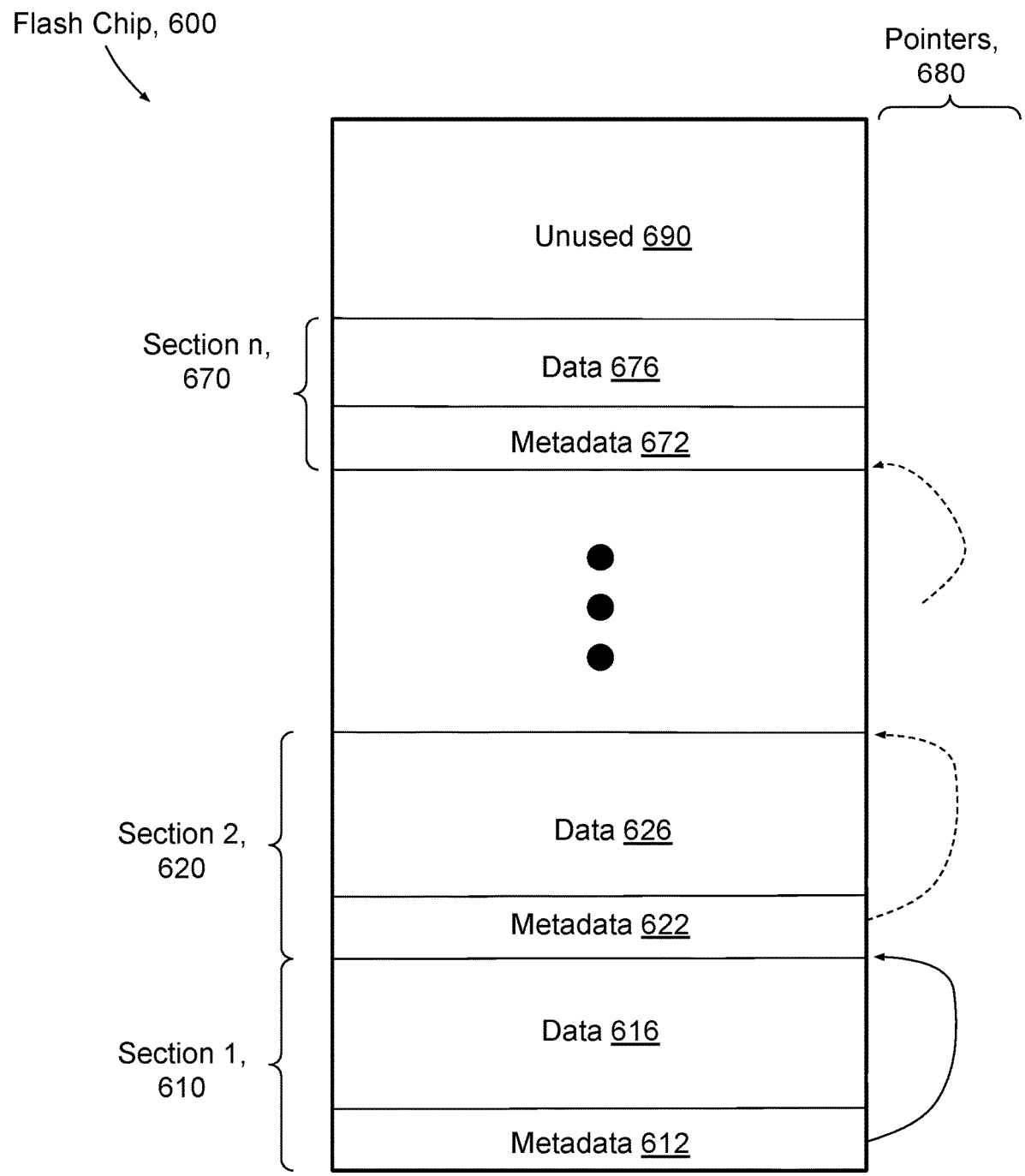
FIG. 6 illustrates an example of selected details of contents of a flash chip usable with a processing chip, such as for a boot flash chip.

In some embodiments, the contents of the boot flash chip include and/or are associated with metadata. In further embodiments, the boot flash chip has multiple sections, a given one of which has metadata and corresponding data contents such as executable code. The metadata of the given one of the sections includes a way to indicate whether there is a next section and where the next section starts. For example, the metadata of the given one of the sections includes a pointer to a start of the next section (and there is no next section if the pointer is all zeros). FIG. 6 illustrates an example of selected details of contents of a flash chip usable with a processing chip, such as for a boot flash chip.

According to various embodiments, one or more of: at least some of the metadata is stored in an on-chip ROM; at least some of the metadata is stored in the boot flash chip; at least some of the metadata is used as part of copying of the contents of the boot flash chip to the DRAM chips, such as for controlling the copying and/or as the digital signature for an integrity check; at least some of the metadata that is stored in the boot flash chip is not copied to the DRAM chips; and a combination of the foregoing. According to various embodiments, the metadata includes one or more of: one or more integrity check values (such as digital signatures); a length of the contents of the boot flash chip that is to be copied to the DRAM chips; one or more addresses (or offsets from a predetermined address, such as zero) in the boot flash chip, such as an address (or an offset) at which to start the copy; a length of the contents of the boot flash chip that is to be copied prior to commencing the S/W boot sequence; a length of this section of the boot flash chip; a pointer to a next section of the boot flash chip; a destination address in the DRAM chips; a sequence number, such as for a version of the contents of the boot flash chip; a respective section number; other data used to control the copy and/or check the contents of the boot flash chip; control for caching a portion of the contents of the boot flash chip in a cache of the UMC; an index of one of the KMU initial keys used to encrypt this section of the boot flash chip, or an indication that the section is unencrypted; and a combination of the foregoing. In a first example, the metadata includes the digital signature, and the contents of the boot flash chip except for the digital signature are copied to the DRAM chips. In a second example, the metadata includes a particular length and the digital signature, and the contents of the boot flash chip starting at address zero for the particular length are copied to the DRAM chips. In a third example, the boot flash chip includes more than one section to be copied to the DRAM chips. Continuing the third example, the metadata includes multiple address range specifications, a given one of which includes a respective start address (or offset) and a respective length specifying one of the sections in the boot flash chip, and optionally and/or selectively a destination address in the DRAM chips. Particular ones of the address ranges, as controlled by an on-chip ROM and/or by external pins of the processing chip, are copied from the boot flash chip to the DRAM chips.

As part of the hardware boot sequence, one or more of the sections of the boot flash chip are copied from the boot flash chip to other external memory (such as to DRAM). In various embodiments where the boot flash chip has multiple sections, an initial one or more of the sections, such as one or more of the sections starting at address zero in the boot flash chip, are encrypted with one of the KMU initial keys that is reserved solely for use with the initial sections and/or with a particular encryption technique. Subsequent ones of the sections of the boot flash chip are optionally and/or selectively encrypted using different keys and/or with different encryption techniques. In one usage example, the boot flash chip is written at a manufacturing time of the processing chip with the initial sections having executable code for booting the processing chip, and pointing to a subsequent section which is just a stub that loads a null application. At some later time, including times after the processing chip has been in operational use, an authorized user is able (using software controls in the executable code and having certain permission such as knowledge of the primordial key) to update the subsequent section and add further executable code there, and/or add one or more additional sections (to add more data, such as more executable code). Continuing the usage example, the authorized user is unable to modify the initial sections because the hardware has been configured, subsequent to the manufacturing time, to disable this portion of the boot flash chip from being modified (such as by restricting use of the key and/or the encryption technique used to write the initial section, or by not allowing writes within a range of addresses in the boot flash chip that includes the initial sections).

In some embodiments where the boot flash chip includes multiple flash chips and has multiple sections, one or more of the sections are optionally and/or selectively stored in different ones of the multiple flash chips. According to various embodiments, the sections of the boot flash chip include one or more of: an initial section with low-level (e.g., UEFI) boot code; a second section with an operating system; a third section with application code; a fourth section with configuration data (such as for the bootloader, the operating system and/or the application); other types of sections as needed in different usage scenarios; and a combination of the foregoing. In further embodiments, the configuration data includes bootloader (e.g., BIOS or UEFI) configuration data, such as data relating to an expected configuration of external memory and/or I/O devices. In yet further embodiments, failure of the bootloader to find the expected configuration upon enumeration of external memory and/or I/O devices is an indication that the system has been corrupted and/or tampered with.

In various embodiments, at least some of the executable code in the contents of the boot flash chip is associated with the processing chip by encryption with a processing-chip-unique key. This ensures that at boot-time, the at least some of the executable code is not externally observable (as it is encrypted) when it is on the boot flash chip interface. To more fully protect the executable code from a combination of physical attacks and viruses or malware, other techniques are used. According to various embodiments, a portion of the executable code copied from at least one section, such as an initial section, of the boot flash chip is rendered unobservable by one or more of: maintaining encryption on the portion of the executable code, both in storage in the boot flash chip and (in a copy) in another external memory; ensuring that one or more keys used for encryption of the portion of the executable code in storage in the boot flash chip and (in a copy) in another external memory are accessible only to immutable hardware (e.g., not accessible to any run-time programmable CPUs) and are not externally visible (e.g., not on a JTAG scan chain); ensuring that none of the one or more keys used to encrypt the portion of the executable code in storage in the boot flash chip and (in a copy) in the another external memory are usable by any of the run-time programmable CPUs except for instruction fetches from a portion of the another external memory containing the copy of the portion of the executable code; ensuring that no on-chip cache holding any of the portion of the executable code (in a decrypted form) is directly accessible (such as with a diagnostic instruction) by any of the run-time programmable CPUs (at least in address ranges corresponding to the portion of the executable code); ensuring that a range of addresses in the another external memory are only accessible by the run-time programmable CPUs with instruction fetches (and not with load or store instructions); ensuring that the run-time programmable CPUs are not observable, such as on a JTAG scan chain or via an ICE interface; other similar techniques; and a combination of the foregoing.

Unified Memory Controller

In some embodiments, a Unified Memory Controller (UMC) is a sole interface between entities that generally use unencrypted data (such as one or more on-chip CPUs and/or external I/O interfaces) and external memory which is kept encrypted. FIG. 1 illustrates an example of selected details of an embodiment of a basic processing chip including UMC 104. According to various embodiments, the UMC either includes or is coupled to the CE so that data to or from the external memory is optionally and/or selectively encrypted (to the external memory) or decrypted (from the external memory). In further embodiments, some internal (on-chip) traffic to or from the UMC does not pass through the CE (or passes through the CE without alteration). For example, in some embodiments, sending encrypted data read from the external memory (without decrypting the data) to an I/O port, such as a USB port, allows I/O data to be protected and to be accessible only by this processing chip. This enables additional external storage, such as a USB flash drive, to have a same protection as the external memory.

In some embodiments, the UMC uses a single encryption/decryption technique for the external memory. For example, the technique is selected at manufacturing time by the state of one or more manufacturing-time fuses. In various embodiments, two or more different encryption/decryption techniques are used. According to various embodiments, the technique to be used is selected based on one or more of: a type of external memory interface used; a type and/or size of a particular external memory chip used; a range of addresses being accessed; under control of software; other factors; and a combination of the foregoing.

In some embodiments, the UMC includes one or more external memory interface circuits, such as one external memory interface circuit for the boot flash chip, and one or more other external memory interface circuits for DRAM chips. In further embodiments, the UMC includes other types of external memory interface circuits, such as a NAND flash interface circuit (e.g., an ONFI-4 interface circuit). In further embodiments, a given one of the external memory interface circuits in the UMC includes respective memory interface logic, such as a controller and/or physical layer interfacing circuitry. In a first example, the respective memory interface logic for a DRAM interface circuit includes a DDR3 and/or DDR4 memory controller and DDR-compatible physical interface circuitry. In a second example, the respective memory interface logic for a NAND flash memory interface circuit or a SPI flash memory interface circuit includes a controller, such as a microcontroller. According to various embodiments, the microcontroller operates at least in part using a stored program that is one or more of: in on-chip ROM; in on-chip, non-volatile memory that is not ROM; in on-chip volatile memory loaded from an on-chip ROM; in on-chip volatile memory loaded from an external non-volatile memory; in an on-chip volatile memory that is loaded or is changeable (if already loaded) as part of the S/W boot sequence; and a combination of the foregoing. Continuing the second example, in some embodiments, a NAND flash microcontroller in the UMC operates during the H/W boot sequence using an on-chip SRAM copied from an on-chip ROM, and is able under control of a run-time programmable CPU (after the S/W boot sequence has begun) to update contents of the on-chip SRAM. This advantageously enables updating of the stored program used by the microcontroller (such as to enable higher performance or newer features) while not compromising security of the H/W boot sequence.

In some embodiments, a given external memory interface of the processing chip has a respective external memory interface circuit (including a controller) in the UMC. In further embodiments, the respective external memory interface circuit either includes or is associated with a respective Serial Presence Detect (SPD) circuit to perform an SPD operation on the given external memory interface.

In various embodiments, as part of the H/W boot sequence (and thus without software involvement), the UMC performs the SPD operation on at least some of the external memory interfaces to determine types and configurations of memory chips attached to those external memory interfaces. In further embodiments, subsequent to completion of the SPD operation, for at least some of the external memory interfaces, the UMC performs configuration of itself and/or of the memory chips attached to those external memory interfaces so that those memory chips are usable (enabled for memory access) by the processing chip, including by a subsequent part of the H/W boot sequence. In some embodiments, the UMC performs the SPD and interface/memory configuration operations on at least an external memory interface having a boot flash chip, and an external memory interface having one or more DRAM chips. (While the description in the present disclosure often uses DRAM as an example memory type, in various embodiments one or more types of memory are used for the same purposes as described for DRAM, including both volatile and non-volatile memory types.) This enables the UMC, as part of the H/W boot sequence, to access the boot flash chip and the DRAM chips in order to copy contents of the boot flash chip to the DRAM chips. In some embodiments, the external memory interface having the boot flash chip is a fixed interface, while in other embodiments (or optionally and/or selectively in yet other embodiments) the presence of the boot flash chip on a particular one of the external memory interfaces is discovered as part of the SPD operation. Similarly, in some embodiments, one or more of the external memory interfaces having the DRAM chips are fixed interfaces, while in other embodiments (or optionally and/or selectively in yet other embodiments) the presence of the DRAM chips on a particular one or more of the external memory interfaces is discovered as part of the SPD operation.

In some embodiments, as part of copying the contents of the boot flash chip to the DRAM chips (or other external memory chips), an integrity check is performed on at least some of the contents. An integrity check is distinguished, at least in part, from authentication in that an integrity check is dependent solely on local information and does not use global information such as a public key. Because of a manner in which, in some embodiments, the contents of the boot flash chip are (at manufacturing time) encrypted, written to the boot flash chip, and then copied to an external DRAM, the integrity check is not necessary for security and is used to determine if the at least some of the contents of the boot flash chip have been corrupted. In further embodiments, the integrity check is optionally and/or selectively seeded with processing-chip-unique information, such as at least a portion of the primordial key or the UUID. According to various embodiments, the integrity check is one or more of: applied once to at least some of the sections of the boot flash chip; applied multiple times to one or more sections of the boot flash chip; applied periodically, such as once every 8K-bytes, to a given one of the sections of the boot flash chip; not applied to some sections of the boot flash chip; and a combination of the foregoing.

In a first example of computing an integrity check, in some embodiments, a digital signature, such as a Cyclic Redundancy Check (CRC) or hash (e.g., a SHA-256 hash), is performed on the at least some of the contents of the boot flash chip and the result is stored with the at least some of the contents when the at least some of the contents are written to the boot flash chip. In a second example of computing an integrity check, in various embodiments, an error-correcting code, such as a Reed-Solomon code or a Low-Density Parity Check (LDPC) code, is computed on the at least some of the contents of the boot flash chip and the result is stored with the at least some of the contents when the at least some of the contents are written to the boot flash chip. Continuing the second example, when the boot flash chip includes a NAND flash chip, an LDPC code used as at least a portion of an integrity check is applied to each page of the NAND flash chip containing a particular section of the boot flash chip. In various embodiments, using an error-correcting code as at least a portion of an integrity check provides a trade-off between detection of corruption and an ability to correct the corruption. In a third example, an integrity check uses a combination of one or more of the first example and the second example.

In some embodiments, when the at least some of the contents of the boot flash chip are read, a value of the integrity check (e.g., the digital signature) is recomputed and compared with the stored version. The integrity check thus ensures that the at least some of the contents of the boot flash chip are unchanged (such as by physical corruption, degradation of the boot flash chip, etc.) since they were written. In further embodiments, even if an adversary is able to replace a boot flash chip with another version that somehow passes integrity checking, the adversary is unable to cause the processing chip to execute malicious code as original contents of the boot flash chip are encrypted with a processing-chip-unique key, and the most the adversary could achieve is causing the processing chip to execute invalid (illegal) code resulting from decrypting contents of the replacement boot flash chip (and the processing chip would not boot successfully). In yet further embodiments, if an integrity check is performed on data to be written to the boot flash chip prior to encryption of the data, and a value of the integrity check is encrypted along with the data and stored in the boot flash chip with the data (and thus the integrity check is confirmed after decryption of the contents of the boot flash chip), an adversary would be unable to create a replacement boot flash chip that passes the integrity check.

In various embodiments, as part of the H/W boot sequence, the UMC generates an initial address map to enable access by the one or more on-chip CPUs to the various external memory chips. In some embodiments, the address map associates one or more ranges of addresses used by the one or more on-chip CPUs (via a respective address space used by a given one of the one or more on-chip CPUs) with external memory chips holding corresponding data. For example, the UMC generates an address map in which external DRAM chips are in a contiguous portion of an address map starting at address zero, followed (optionally and/or selectively with a gap) by a portion of the address map for non-volatile memory chips other than the boot flash chip, and with the boot flash chip at the very top of the address map. In various embodiments, the boot flash chip is used as part of the H/W boot sequence and is never placed in the address map, rendering it inaccessible by software. In other embodiments, the boot flash chip is placed in the address map only during a process of updating the boot flash chip (if the updating is permitted by on-chip ROM state).

In some embodiments, the initial address map is a portion of a complete address map, where the portion is sufficient for the H/W boot sequence and enough of the S/W boot sequence that a remainder of the complete address map is able to be configured by software running or executing on the one or more on-chip CPUs once the S/W boot sequence commences. In further embodiments, generation of the initial address map is implicit. In a first example, a particular one of the external memory interfaces of a processing chip supports DRAM chips, and the particular interface supports only a single DRAM chip. The processing chip uses the SPD operation to confirm presence and configuration (including capacity) of an expected DRAM chip on the particular interface, and the initial address map places the expected DRAM chip at address zero and for a predetermined length sufficient for the H/W boot sequence and the S/W boot sequence. In a second example, a processing chip is enabled to support multiple DRAM chips on multiple ones of the external memory interfaces, and is assembled into a system so as to have at least one DRAM chip on a specific one of the external memory interfaces. Subsequent to the SPD operation confirming presence of the at least one DRAM chip and its configuration (including its capacity), the initial address map places the at least one DRAM chip at address zero and for a predetermined length sufficient for the H/W boot sequence and the S/W boot sequence.

In various embodiments, at least some of the external memory chips (or portions thereof) found by the SPD operation are not placed in the initial address map (or are placed in a portion of the initial address map that is reserved for the UMC and is not visible to the one or more on-chip CPUs), and are, thus, inaccessible to the one or more on-chip CPUs. For example, in some embodiments and/or usage scenarios, the boot flash chip is not placed in the initial address map. Preventing access by the one or more on-chip CPUs to the boot flash chip may prevent an attempt by malicious software to change and/or damage the executable code stored in the boot flash chip.

Processors, such as the one or more on-chip CPUs, typically begin execution after a reset at a known address. In some embodiments, the initial address map is configured to map the known address to a location in DRAM where a copy of the executable code from the boot flash chip is stored. In this manner, the one or more on-chip CPUs are able to be booted without having access to the boot flash chip.

Of course, many variations of address map arrangement are contemplated, some of which are optionally and/or selectively used in various embodiments. For example, in some embodiments, one or more on-chip memories, such as an on-chip SRAM used for I/O buffering, are accessible via the address map, enabling more efficient data transfers to or from the on-chip memories. In another example, the UMC is enabled to use at least a portion of external DRAM as a cache for external non-volatile memory. In yet further examples, software, once executing, has at least some control over the address map, such as how DRAM is partitioned into a cache for external non-volatile memory vs. a portion directly accessible (in the address map) by software.

In some embodiments, different ranges of the address map are associated with a use of different ones of the KMU initial keys (and optionally and/or selectively with similar software-created keys). In further embodiments, software is enabled to specify an association between at least some of the ranges and ones of the KMU initial keys (or optionally and/or selectively with similar software-created keys). In various embodiments, the association between at least some of the ranges and ones of the KMU initial keys is fixed in immutable hardware. In one example, a particular one of the ranges is reserved for a copy of contents of the boot flash chip in external DRAM, and the particular range is associated with a specific one of the KMU initial keys other than a key that was used to encrypt the contents of the boot flash chip. This advantageously keeps the contents of the boot flash chip encrypted using a key that is optionally and/or selectively restricted from software uses while still enabling, if not disabled (such as by on-chip ROM state) and with appropriate authorization (such as by use of the primordial key), the boot flash chip to be updated.

In some embodiments, different ranges of the address map are associated with a use of different encryption (and corresponding types of decryption) techniques that are supported in the processing chip. In further embodiments, software is enabled to specify an association between at least some of the ranges and the encryption (and the corresponding types of decryption) techniques. In further embodiments, the boot flash chip (which in various embodiments is not in the address map) uses a particular one of the encryption (and the corresponding types of decryption) techniques, and DRAM chips use a different one of the encryption (and the corresponding types of decryption) techniques. For example, in various embodiments, as part of the H/W boot sequence, contents of the boot flash chip are decrypted using an RSA technique, and the decrypted contents are copied into the DRAM chips after re-encryption using a scrambling technique. In further embodiments, the scrambling technique is a key-less scrambling technique.

In various embodiments, the UMC performs encryption (on write, or decryption on read) by default using a particular one of the KMU initial keys (such as the default key), and at least some portion of external memory (including, in some embodiments, all of external memory) is maintained encrypted. In further embodiments, software is enabled to specify a use of another one of the KMU initial keys for a particular operation (e.g., a DMA operation) and/or for a particular range of addresses, and encryption (on write, or decryption on read) is performed with the another key and also with the particular key. In other embodiments, the CE performs encryption (or decryption) with the another key, and the UMC performs encryption (or decryption) with the particular key, and none of the run-time programmable CPUs are enabled to specify use of the particular key (such as the default key) for a DMA operation, for use with an address range, or for other purposes.

Caches

According to various embodiments, at least one of the one or more on-chip CPUs has a respective zero or more levels of caching. In a first example, a first one of the CPUs has only a level one (L1) cache. In a second example, a second one of the CPUs has a multi-level cache such as an L1 cache and a level two (L2) cache. In some embodiments, the CPUs have identical, respective caches. In other embodiments, different ones of the CPUs have different respective caches. For example, if different ones of the CPUs perform different respective tasks, in some embodiments a cache structure for a particular one of the CPUs is chosen based on performance and/or efficiency (and/or other) requirements of the particular CPU in performing its respective task. In further embodiments, one or more of the CPUs share a higher-level cache, such as a level three (L3) cache. In yet further embodiments, the higher-level cache is part of the UMC. According to various embodiments, a higher-level cache in the UMC one or more of: is the only cache in the processing chip; is a higher-level cache for the CPUs; is respectively optionally and/or selectively a higher-level cache for one or more of the CPUs; is a cache for the external memory chips; is a cache for the external memory chips except the boot flash chip; is respectively optionally and/or selectively a cache for one or more of the external memory chips; is a cache for portions of an address map or address space; is a cache according to another CPU, external memory type, external memory chip, external memory interface, address map limitations, or address space limitations; and a combination of the foregoing.

Of course, many configurations and types of caches are known in the art, such as instruction caches, data caches, side caches, victim caches, associative caches, multi-way set caches, hierarchical caches, etc. The techniques described in the present disclosure are generally agnostic to a type of a particular one of the caches, though some embodiments advantageously use one or more particular types of caches for reasons of performance, efficiency, cost, or other factors.

In some embodiments where the UMC includes a cache of external memory of the processing chip, such as an L3 cache, contents of the cache are maintained encrypted in a same way as the corresponding external memory is encrypted. In alternative embodiments, at least some of the contents of the cache are maintained in decrypted form, advantageously providing faster access by the CPUs to cached data.

Authentication

Figure 9:
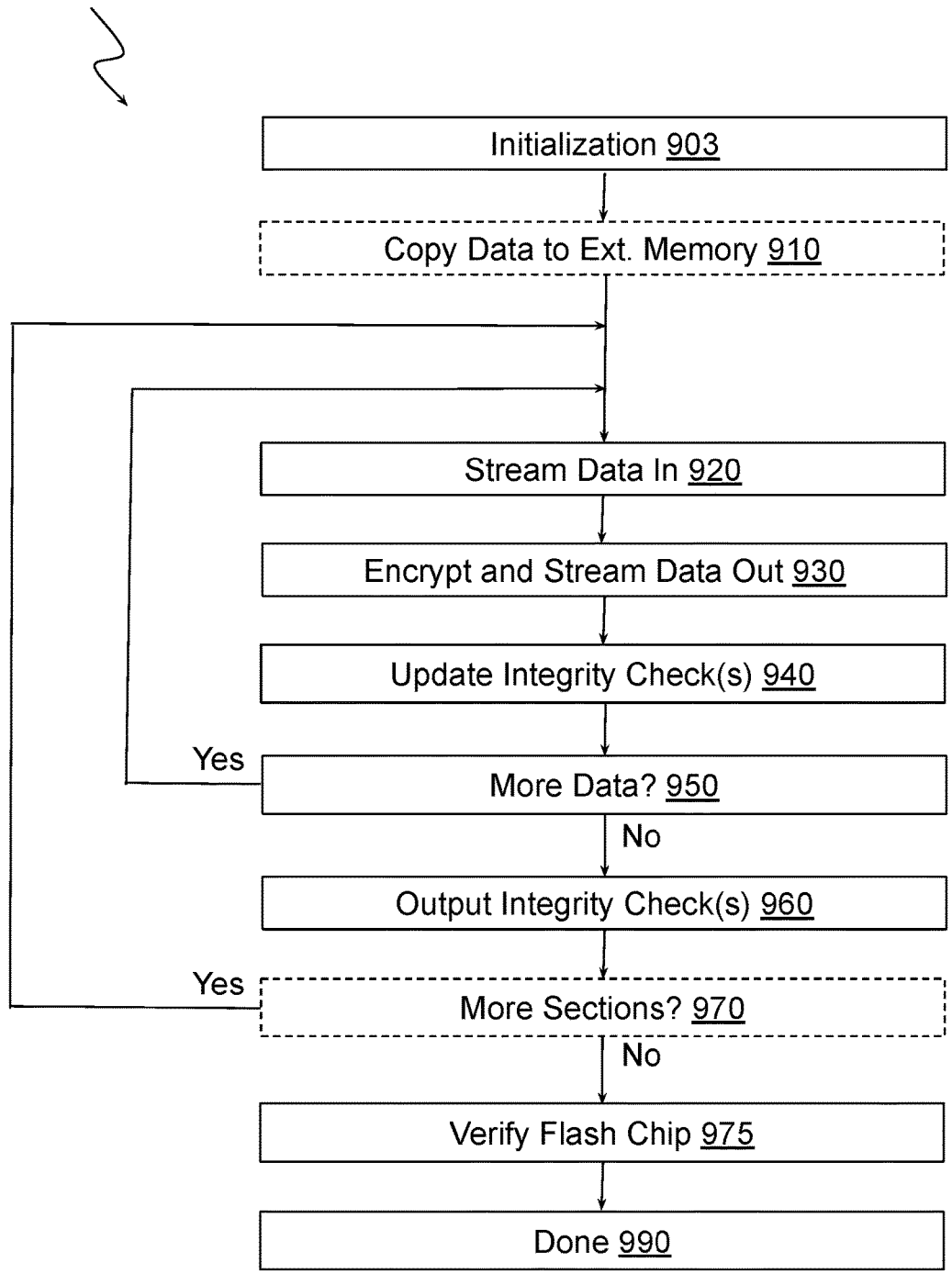
FIG. 9 illustrates examples of selected details of a process to write a flash chip.
Figure 10A:
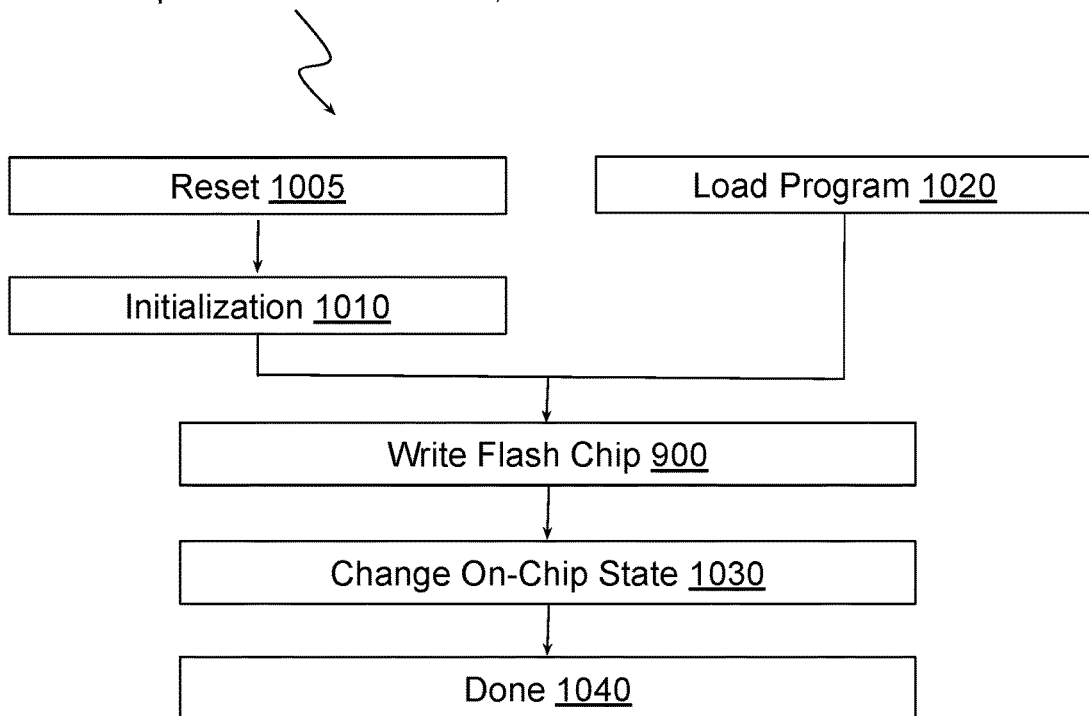
FIG. 10A illustrates examples of selected details of a flash chip association process.
Figure 10B:
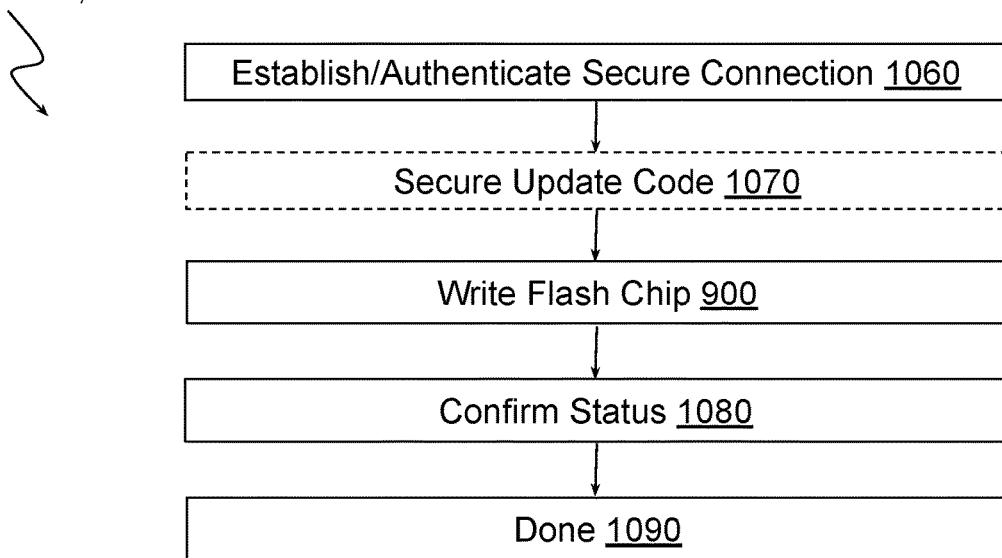
FIG. 10B illustrates examples of selected details of an update process.

In some embodiments, a connection (such as secure connection established by Establish/Authenticate Secure Connection 1060 as illustrated in FIG. 10B) and/or a set of data (such as data received by Copy Data to External Memory 910 as illustrated in FIG. 9) is authenticated. A goal of authentication is to ensure that the connection or the data is from a known (and trusted) source. Without limitation, the known source is called a 'Network Management Center' (NMC) in the present disclosure, though in various embodiments, the source is an entity, such as an OEM building systems that include processing chips or a company selling devices that include processing chips. However, in some embodiments and/or usage scenarios, authentication is performed with more than one entity. For example, a processing chip is able to authenticate with a fabrication entity in order to enable updating of low-level executable code (e.g., a bootloader and/or a kernel), and is able to authenticate with an OEM entity in order to enable updating of high-level executable code (e.g., applications).

There are many ways of performing authentication, and the following describes particular example embodiments. The techniques herein are generally agnostic to a type of authentication used.

In various embodiments, authentication uses a key, such as a public/private key pair (an asymmetric key), called the 'authentication key' in the present disclosure. (Either the NMC or the processing chip is able to use the public part of the key pair, provided the other of the NMC and the processing chip uses the private part of the key pair, hence the key pair is referred to as just a 'key' for simplicity of explanation.) In further embodiments, authentication uses a symmetric key in similar ways.

In some embodiments, the authentication key is created from the primordial key using a technique implemented on the processing chip (such as by autonomous hardware and/or in software on the CPUs in the processing chip) and known to the NMC (which also knows the components that were used to create the primordial key, and the technique, such as a hash, used to do so). Hence, both the processing chip and the NMC know (or can compute) the authentication key. In further embodiments, the authentication key is saved in on-chip ROM in addition to or instead of the primordial key.

In other embodiments, the authentication key is a public/private key pair, and the processing chip stores one part (e.g., the private part) and the NMC stores the other part (e.g., the public part). By doing this, no shared knowledge of a known technique is needed to use the authentication key. In a first example, the authentication key is created on-chip by the KMU as a public/private key pair, and the processing chip saves the private part of the key pair and provides the public part to the NMC, advantageously rendering the private part of the key unknown and unknowable outside of the processing chip. In a second example, one part of the authentication key (e.g., the public part) is provided to the processing chip during manufacturing time and is saved in on-chip ROM of the processing chip at manufacturing time, enabling the processing chip to know just that part (and the NMC to know the other part).

In some embodiments, authentication of a connection to the processing chip is performed by sending a message encoded using the authentication key. According to various embodiments, the encoding uses the authentication key to one or more of: encrypt the message; append a digital signature to the message; append a message authentication code to the message; other techniques of verifying the sender of a message using a key; and a combination of the foregoing. Without limitation, 'digital signature' in the present disclosure refers to any of these authentication techniques, unless explicit reference is made to another one of the authentication techniques in the same context.

In various embodiments, the message itself is any data known to both the NMC and the processing chip, such as one or more of: a timestamp (including the current time); a date stamp (including the current date); a portion or all of the primordial key; any information saved in on-chip ROM of the processing chip at manufacturing time and known to the NMC; any data that can be known or computed by both the NMC and the processing chip, such as the first 100 digits of an irrational number or sequence, such as pi; and a combination of the foregoing. In various embodiments, when the processing chip receives a message to be authenticated, it decodes the message using the authentication key if it was encrypted. If the (decoded) message matches an expected value of the message, and if a digital signature, if used, is verified, then authentication succeeds. In further embodiments where the message is encrypted, an integrity check (such as a CRC or a hash) is computed on the message, and a value of the integrity check is appended to the message and encrypted along with the message. When the message is decrypted, the appended integrity check value is compared against a recomputed integrity check value, and authentication succeeds if the two integrity check values match.

In some embodiments, authentication of a set of data is performed similarly to authentication of a connection where the set of data is the message. In a first example, the set of data includes an appended integrity check value and both the set of data and the integrity check value are encrypted by the NMC with the authentication key. After decrypting the set of data with the authentication key, the processing chip recomputes the integrity check, and verifies that the recomputed integrity check value matches the appended integrity check value to confirm that the NMC provided the set of data. In a second example, the NMC appends a digital signature of the set of data to the set of data using the authentication key. The processing chip verifies, using the authentication key, that the digital signature matches the set of data it received to confirm that the NMC provided the set of data.

Example Embodiments

In concluding the Introduction to the Detailed Description, what follows is a collection of example embodiments, including at least some explicitly enumerated as 'ECs' (Example Combinations), providing additional description of a variety of embodiment types in accordance with the concepts described in the present disclosure; these examples are not meant to be mutually exclusive, exhaustive, or restrictive; and the invention is not limited to these example embodiments but rather encompasses numerous possible modifications and variations within the scope of the issued claims and their equivalents.

EC1) A method implemented on a processing chip comprising: receiving a reset; in response to the reset, performing an immutable H/W boot sequence while holding one or more run-time-programmable units in a reset state; subsequent to the H/W boot sequence having copied executable code from an external non-volatile boot storage into an external memory from which the one or more run-time-programmable units are enabled to execute the executable code, removing the reset state from at least one of the one or more run-time-programmable units; and wherein the executable code is stored in the external non-volatile boot storage in an encrypted form and is decrypted on-chip, using a key that is never accessible by the one or more run-time-programmable units, whenever the executable code is read from the external memory for use by one of the one or more run-time-programmable units.

EC2) The method of EC1, wherein the one or more run-time-programmable units comprise one or more CPUs.

EC3) The method of EC1, wherein the receiving the reset is via an external pin of the processing chip.

EC4) The method of EC1, wherein the reset is enabled to be generated in the processing chip in response to a power supply voltage crossing a threshold.

EC5) The method of EC1, wherein the reset is a power-on reset.

EC6) The method of EC1, wherein the reset is a restart reset.

EC7) The method of EC1, wherein the processing chip is a particular one of multiple processing chips, and the encrypted form of the executable code is only decryptable within the particular processing chip.

EC8) The method of EC7, further comprising creating the key at a manufacturing time of the particular chip.

EC9) The method of EC8, wherein the creating comprises using a physically unclonable function that is part of the particular chip.

EC10) The method of EC8, further comprising storing the key in an on-chip, one-time programmable ROM at the manufacturing time of the particular chip.

EC11) The method of EC1, wherein the executable code is stored in the external memory in the encrypted form.

EC12) The method of EC1, wherein the encrypted form is a scrambled form.

EC13) The method of EC1, wherein the encrypted form is a cryptographic form.

EC14) The method of EC13, wherein the cryptographic form uses RSA encryption.

EC15) The method of EC13, wherein the cryptographic form uses elliptic curve encryption.

EC16) The method of EC1, wherein the performing the immutable H/W boot sequence comprises performing a Serial Presence Detect (SPD) operation to detect types and configurations of memory chips attached to the processing chip, the memory chips comprising the external memory and the external non-volatile boot storage.

EC17) The method of EC16, wherein the performing the immutable H/W boot sequence further comprises configuring a memory controller of the processing chip and at least some of the attached memory chips including the external non-volatile boot storage and the external memory for memory access.

EC18) The method of EC17, wherein the performing the immutable H/W boot sequence further comprises copying the executable code from the external non-volatile boot storage to the external memory.

EC19) The method of EC1, wherein the immutable H/W boot sequence is configured entirely at a manufacturing time of the processing chip.

EC20) The method of EC1, wherein at least part of the immutable H/W boot sequence is controlled by an on-chip ROM.

EC21) The method of EC20, wherein the on-chip ROM is a mask-programmed ROM.

EC22) The method of EC20, wherein the on-chip ROM is field programmable.

EC23) The method of EC1, further comprising writing the external non-volatile boot storage with the executable code at a manufacturing time of the processing chip.

EC24) The method of EC23, further comprising setting state in an on-chip, one-time programmable ROM to disable an interface of the processing chip used to write the external non-volatile boot storage from being able to write to an external memory chip a second time.

EC25) The method of EC1, wherein the external memory is DRAM.

EC26) The method of EC1, wherein the external non-volatile boot storage is SPI flash.

EC27) The method of EC1, wherein the holding the one or more run-time-programmable units in a reset state comprises asserting a reset input of the one or more run-time-programmable units.

EC28) The method of EC1, wherein the holding the one or more run-time-programmable units in a reset state comprises not providing operating power to the one or more run-time-programmable units.

EC29) The method of EC1, wherein the one or more run-time-programmable units comprise every run-time-programmable unit in the processing chip.

EC30) The method of EC1, further comprising subsequent to the H/W boot sequence having copied the executable code from the external non-volatile boot storage into the external memory, continuing to copy additional data from the external non-volatile boot storage into the external memory.

EC31) The method of EC1, wherein the processing chip is a single integrated circuit.

EC32) The method of EC1, wherein the performing the immutable H/W boot sequence comprises performing an integrity check on at least a portion of contents of the external non-volatile boot storage.

EC33) The method of EC32, wherein the at least a portion of the contents of the external non-volatile boot storage comprises the executable code.

EC34) The method of EC32, wherein the performing an integrity check comprises performing a CRC.

EC35) The method of EC32, wherein the performing an integrity check comprises performing a digital signature.

EC36) The method of EC32, wherein the performing an integrity check on the at least a portion of the contents of the external non-volatile boot storage is subsequent to the H/W boot sequence having copied the executable code from the external non-volatile boot storage into the external memory, and the integrity check is performed on a copy of the at least a portion of the contents of the external non-volatile boot storage in the external memory.

EC37) The method of EC32, wherein the performing an integrity check on the at least a portion of the contents of the external non-volatile boot storage is prior to the H/W boot sequence having completed copying the executable code from the external non-volatile boot storage into the external memory.

EC38) The method of EC1, wherein the key is a specific one of multiple keys; and further comprising subsequent to using a particular one of the multiple keys at a manufacturing time of the processing chip, changing a state in an on-chip, one-time programmable ROM so that the particular key is unusable for an encryption operation.

EC39) The method of EC38, wherein subsequent to the changing the state in the on-chip, one-time programmable ROM, the particular key is unusable for an operation other than decrypting data read from the external non-volatile boot storage.

EC40) The method of EC38, further comprising prior to the changing the state in the on-chip, one-time programmable ROM, using the particular key to encrypt data and writing the encrypted data to the external non-volatile boot storage; and wherein the encrypted data comprises the executable code.

EC41) The method of EC40, wherein the performing the immutable H/W boot sequence further comprises copying the executable code from the external non-volatile boot storage to the external memory; and wherein the copying comprises decrypting the executable code with the particular key and re-encrypting the executable code with the specific key.

EC42) The method of EC41, wherein the processing chip is a particular one of multiple processing chips; wherein the encrypted form of the executable code is only decryptable using the particular key and within the particular processing chip; and further comprising creating the multiple keys at a manufacturing time of the particular chip.

EC43) The method of EC42, wherein the creating comprises using a physically unclonable function that is part of the particular chip.

EC44) The method of EC41, wherein the copying comprises using metadata to control the copying.

EC45) The method of EC1, wherein the executable code comprises an operating system.

EC46) The method of EC1, wherein the external non-volatile boot storage is written with the executable code as part of a manufacturing-time procedure, and the manufacturing-time procedure is subsequently rendered unrepeatable.

EC50) A method comprising: holding one or more CPUs in a reset state; subsequent to receiving a reset, copying, by boot hardware, executable code from an external non-volatile boot storage into an external memory; subsequent to the copying, releasing the reset state on at least one of the one or more CPUs; and wherein a processing chip comprises the boot hardware and the one or more CPUs, and the boot hardware does not contain a run-time-programmable CPU.

EC51) The method of EC50, wherein subsequent to manufacturing of the boot hardware, the boot hardware is immutable hardware.

EC52) The method of EC50, wherein subsequent to field programming of an on-chip, one-time programmable ROM, the boot hardware is immutable hardware.

EC53) The method of EC50, wherein the reset is received on a reset signal, and further comprising, beginning the holding the one or more CPUs in the reset state when the reset signal is asserted and continuing the holding the one or more CPUs in the reset state after the reset signal is de-asserted.

EC54) The method of EC50, wherein the receiving the reset is via an external pin of the processing chip.

EC55) The method of EC50, wherein the reset is enabled to be generated in the processing chip in response to a power supply voltage crossing a threshold.

EC56) The method of EC50, wherein the reset is a power-on reset.

EC57) The method of EC50, wherein the reset is a restart reset.

EC58) The method of EC50, wherein the one or more CPUs comprise every run-time-programmable CPU in the processing chip.

EC59) The method of EC50, wherein the copying by the boot hardware of the executable code from the external non-volatile boot storage into the external memory copies a portion of contents of the external non-volatile boot storage prior to the releasing the reset state.

EC60) The method of EC59, wherein the copying by the boot hardware of the executable code from the external non-volatile boot storage into the external memory continues after the releasing the reset state.

EC61) The method of EC50, further comprising prior to the copying by the boot hardware of the executable code from the external non-volatile boot storage into the external memory, performing by the boot hardware a Serial Presence Detect (SPD) operation on one or more external memory interfaces of the processing chip.

EC62) The method of EC61, wherein the external non-volatile boot storage is coupled to at least one of the one or more external memory interfaces.

EC63) The method of EC62, further comprising configuring, by the boot hardware and according to results of the SPD operation, the boot hardware and the external non-volatile boot storage to communicate.

EC64) The method of EC63, wherein the external non-volatile boot storage is NAND flash.

EC65) The method of EC63, wherein the external non-volatile boot storage is SPI flash.

EC66) The method of EC61, wherein the external memory is coupled to at least one of the one or more external memory interfaces.

EC67) The method of EC66, further comprising configuring, by the boot hardware and according to results of the SPD operation, the boot hardware and the external memory to communicate.

EC68) The method of EC67, wherein the external memory is DRAM.

EC69) The method of EC50, wherein the executable code as stored in the external non-volatile boot storage is encrypted using a key that is part of the boot hardware.

EC70) The method of EC69, wherein the copy of the executable code as stored in the external memory is encrypted using the key.

EC71) The method of EC69, wherein the key is not accessible by any of the one or more CPUs.

EC72) The method of EC69, wherein the copy of the executable code as stored in the external memory is encrypted using a key-less scrambling technique.

EC73) The method of EC69, wherein the processing chip is a particular one of multiple processing chips, and the executable code as stored in the external non-volatile boot storage is only decryptable within the particular processing chip.

EC74) The method of EC73, further comprising creating the key at a manufacturing time of the particular chip.

EC75) The method of EC74, wherein the creating comprises using a physically unclonable function that is part of the particular chip.

EC76) The method of EC75, further comprising storing the key in an on-chip, one-time programmable ROM at the manufacturing time of the particular chip.

EC77) The method of EC74, wherein the key is particular one of multiple keys created and stored in an on-chip, one-time programmable ROM at the manufacturing time of the particular chip.

EC78) The method of EC77, wherein the copying by the boot hardware of the executable code from the external non-volatile boot storage into the external memory comprises the boot hardware decrypting the executable code stored in the external non-volatile boot storage with the particular key and re-encrypting the executable code with another one of the multiple keys; and wherein the copy of the executable code as stored in the external memory is encrypted with the another one of the multiple keys.

EC79) The method of EC77, wherein the copying by the boot hardware of the executable code from the external non-volatile boot storage into the external memory comprises the boot hardware decrypting the executable code stored in the external non-volatile boot storage with the particular key and re-encrypting the executable code with a key-less scrambling technique; and wherein the copy of the executable code as stored in the external memory is encrypted with the key-less scrambling technique.

EC80) The method of EC50, wherein the executable code is encrypted when communicated on one or more external memory interfaces of the processing chip.

EC81) The method of EC50, further comprising: subsequent to the releasing the reset state on the at least one of the one or more CPUs, fetching by the at least one of the one or more CPUs an initial instruction; and decrypting, by the boot hardware, at least a portion of the executable code to supply the initial instruction.

EC82) The method of EC81, further comprising reading the at least a portion of the executable code from the external memory.

EC83) The method of EC81, wherein the decrypting uses a key that is part of the boot hardware and is not accessible by any of the one or more CPUs.

EC84) The method of EC83, wherein the processing chip is a particular one of multiple processing chips, and further comprising creating the key at a manufacturing time of the particular chip using a physically unclonable function that is part of the particular chip.

EC85) The method of EC81, wherein the decrypting uses a key-less scrambling technique.

EC86) The method of EC50, wherein the processing chip is a single integrated circuit.

EC87) The method of EC50, wherein the processing chip comprises multiple integrated circuits.

EC88) The method of EC87, wherein the multiple integrated circuits are in a same package.

EC89) The method of EC87, wherein at least some interfaces between ones of the multiple integrated circuits are encrypted.

EC90) The method of EC50, wherein the boot hardware comprises a Unified Memory Controller (UMC).

EC91) The method of EC50, wherein the boot hardware comprises a Key Management Unit (KMU).

EC92) The method of EC50, wherein the executable code comprises an operating system.

EC93) The method of EC50, wherein the copying comprises using metadata to control the copying.

EC94) The method of EC93, wherein the metadata comprises a length of data to be copied.

EC95) The method of EC50, wherein the external non-volatile boot storage is written with the executable code as part of a manufacturing-time procedure, and the manufacturing-time procedure is subsequently rendered unrepeatable.

EC96) The method of EC50, wherein the copying by the boot hardware of the executable code from the external non-volatile boot storage into the external memory copies the executable code without modification.

EC97) The method of EC96, wherein the executable code is stored in the external non-volatile boot storage in an encrypted form using a key-less scrambling technique.

EC100) A system embodying a method of any one or more of the preceding method-based ECs.

EC101) The system of EC100, wherein the system comprises the processing chip.

EC102) The system of EC100, wherein the system comprises a single integrated circuit chip that performs the method of any one of the one or more of the preceding method-based ECs.

EC103) The system of EC100, wherein the system comprises multiple integrated circuit chips that together perform the method of any one of the one or more of the preceding method-based ECs.

EC104) The system of EC103, wherein at least some interconnections between ones of the multiple integrated circuit chips are encrypted.

EC105) The system of any one of EC100 through EC104, further comprising a non-volatile memory chip, and wherein the external non-volatile boot storage comprises the non-volatile memory chip.

EC106) The system of EC105, wherein the non-volatile memory chip is a SPI flash chip.

EC107) The system of EC105, wherein the non-volatile memory chip is a NAND flash chip.

EC108) The system of EC105, further comprising one or more other memory chips, and wherein the external memory comprises the one or more other memory chips.

EC109) The system of EC108, wherein at least one of the one or more other memory chips is one or more DRAM chips.

EC110) The system of EC109, wherein the executable code is copied into the one or more DRAM chips.

EC200) A processing chip comprising: one or more CPUs; and immutable hardware configured to perform, commencing with a reset of the processing chip, boot-time actions including: preventing the one or more CPUs from completing a respective initial instruction fetch; copying executable code from non-volatile storage external to the processing chip to a memory external to the processing chip, wherein the executable code is encrypted in both the external non-volatile storage and the external memory; and subsequent to the copying the executable code, enabling at least one of the one or more CPUs to complete the respective initial instruction fetch by decrypting the executable code stored in the external memory and returning a result of the decrypting.

EC201) The processing chip of EC200, wherein the preventing the one or more CPUs from completing the respective initial instruction fetch comprises holding the one or more CPUs in a respective reset state.

EC202) The processing chip of EC201, wherein the boot-time actions further include: releasing the respective reset state on the at least one of the one or more CPUs.

EC203) The processing chip of EC200, wherein the immutable hardware comprises one or more finite state machines.

EC204) The processing chip of EC200, wherein the immutable hardware comprises a microcontroller and an on-chip ROM, and wherein the microcontroller is operable according to contents of the on-chip ROM.

EC205) The processing chip of EC204, wherein the on-chip ROM is a mask-programmed ROM.

EC206) The processing chip of EC204, wherein the on-chip ROM is a one-time programmable ROM.

EC207) The processing chip of EC206, wherein the one-time programmable ROM is a field-programmable ROM.

EC208) The processing chip of either of EC206 or EC207, wherein the immutable hardware is unchangeable subsequent to programming of the one-time programmable ROM.

EC209) The processing chip of EC200, wherein the immutable hardware comprises a key management unit including multiple keys, and wherein the executable code in the external non-volatile storage is encrypted with a first one of the multiple keys using a first encryption technique, and the executable code in the external memory is encrypted with a second encryption technique.

EC210) The processing chip of EC209, wherein the executable code in the external memory is encrypted with a second one of the multiple keys using the second encryption technique; and wherein the first key and the second key are a same one of the multiple keys, and the first encryption technique and the second encryption technique are a same encryption technique.

EC211) The processing chip of EC209, wherein the second encryption technique is a key-less scrambling technique.

EC212) The processing chip of EC209, wherein the immutable hardware comprises an on-chip ROM storing the multiple keys.

EC213) The processing chip of EC212, wherein the processing chip comprises autonomous hardware; wherein the autonomous hardware comprises the immutable hardware and a hardware random number generator; and wherein the autonomous hardware is enabled to perform, at a manufacturing time of the processing chip, manufacturing-time actions including: creating, using the hardware random number generator, the multiple keys; and writing the multiple keys to the on-chip ROM.

EC214) The processing chip of EC213, wherein the hardware random number generator comprises a physically unclonable function.

EC215) The processing chip of EC213, wherein the manufacturing-time actions further include: encrypting the executable code with the first key so that an encrypted version of the executable code is enabled to be stored in the external non-volatile storage at the manufacturing time.

EC216) The processing chip of EC215, wherein the on-chip ROM is a first on-chip ROM, wherein the autonomous hardware comprises a second on-chip ROM, and wherein the manufacturing-time actions further include: subsequent to the encrypting the executable code with the first key, changing state in the second on-chip ROM so that the first key is disabled from use by an encryption operation.

EC217) The processing chip of EC213, wherein the copying the executable code comprises: reading the executable code in the external non-volatile storage; decrypting the executable code read from the external non-volatile storage with the first key using the first encryption technique; re-encrypting the decrypted executable code with the second encryption technique; and writing the re-encrypted executable code to the external memory.

EC218) The processing chip of EC217, wherein the re-encrypting the decrypted executable code with the second encryption technique uses a second one of the multiple keys; and wherein the first key and the second key are different ones of the multiple keys.

EC219) The processing chip of EC218, wherein the first encryption technique and the second encryption technique are a same encryption technique, EC220) The processing chip of EC218, wherein the second key is a default one of the multiple keys.

EC221) The processing chip of EC217, wherein the second encryption technique is a key-less scrambling technique.

EC222) The processing chip of EC217, wherein the processing chip is configured to perform, subsequent to the enabling the at least one of the one or more CPUs to complete the respective initial instruction fetch, encrypting data written to the external memory by any one of the one or more CPUs, and decrypting the data read from the external memory by any one of the one or more CPUs.

EC223) The processing chip of EC222, wherein the encrypting the data written to the external memory by any one of the one or more CPUs uses one of the multiple keys, and wherein the decrypting the data read from the external memory by any one of the one or more CPUs uses one of the multiple keys.

EC224) The processing chip of EC222, wherein the encrypting the data written to the external memory by any one of the one or more CPUs uses a key-less scrambling technique, and wherein the decrypting the data read from the external memory by any one of the one or more CPUs uses the key-less scrambling technique.

EC225) The processing chip of EC213, wherein the immutable hardware does not have a path to provide any one of the multiple keys to any one of the one or more CPUs.

EC226) The processing chip of EC200, wherein the executable code in the external non-volatile storage is encrypted with a key-less scrambling technique.

EC227) The processing chip of EC226, wherein the copying the executable code from the external non-volatile storage to the external memory copies the executable without modification.

EC250) A system comprising: a processing chip comprising one or more CPUs, and hardware configured to perform an immutable hardware boot sequence, the hardware including one or more keys and one or more external memory interfaces; multiple memory chips, the one or more external memory interfaces coupled to a respective one or more of the memory chips; wherein the hardware is configured to perform a series of boot-time actions beginning after de-assertion of a reset signal and including: holding the one or more CPUs in a reset state in which the one or more CPUs are not able to either commence or complete a respective initial instruction fetch; performing a Serial Presence Detect (SPD) operation on the one or more external memory interfaces to determine or confirm respective configuration information of the respective one or more of the memory chips; generating at least a portion of an address map based on at least some of the respective configuration information; and subsequent to the generating the at least a portion of the address map, releasing the reset state on an initial one of the CPUs; wherein the hardware is enabled to return one or more instructions in response to the respective initial instruction fetch of the initial CPU by performing actions including: reading initial data from a particular one or more of the memory chips; wherein the one or more instructions are obtainable by decrypting the initial data using a specific one of the one or more keys; and wherein the hardware, without involvement of the one or more CPUs, performs the operations from the de-assertion of the reset signal until the return of the one or more instructions in response to the respective initial instruction fetch of the initial CPU.

EC251) The system of EC250, wherein the one or more CPUs are run-time programmable CPUs in the processing chip; and wherein the immutable hardware boot sequence is not alterable by the one or more CPUs.

EC252) The system of EC251, wherein no key of the one or more keys is accessible by the one or more CPUs.

EC253) The system of EC250, wherein the hardware comprises one or more finite state machines.

EC254) The system of EC250, wherein the hardware comprises a microcontroller and an on-chip ROM, and wherein the microcontroller is operable according to contents of the on-chip ROM.

EC255) The system of EC254, wherein the on-chip ROM is a mask-programmed ROM.

EC256) The system of EC255, wherein the on-chip ROM is a one-time programmable ROM.

EC257) The system of EC256, wherein the one-time programmable ROM is a field-programmable ROM.

EC258) The system of either of EC256 or EC257, wherein subsequent to programming of the one-time programmable ROM, the hardware configured to perform the immutable hardware boot sequence is unchangeable.

EC259) The system of EC250, wherein the series of boot-time actions further include: copying, without decrypting, encrypted executable code including the initial data from a non-volatile one of the memory chips to a volatile one or more of the memory chips.

EC260) The system of EC259, wherein the particular one or more of the memory chips are the volatile one or more of the memory chips.

EC261) The system of EC260, wherein the hardware is enabled to return the one or more instructions in response to the respective initial instruction fetch of the initial CPU by decrypting the initial data using the specific key.

EC262) The system of EC259, wherein the particular one or more of the memory chips are the non-volatile memory chip, wherein the hardware comprises a cache; and wherein the series of boot-time actions further include: decrypting the initial data using the specific key to produce the one or more instructions; and storing the one or more instructions in the cache.

EC263) The system of EC262, wherein the hardware is enabled to return the one or more instructions in response to the respective initial instruction fetch of the initial CPU by reading the one or more instructions from the cache.

EC264) The system of EC250, wherein the series of boot-time actions further include: reading encrypted executable code including the initial data from a non-volatile one of the memory chips; decrypting the executable code using the specific key; re-encrypting the decrypted executable code using either a particular one of the one or more keys different from the specific key or a key-less scrambling technique; writing the re-encrypted executable code to a volatile one or more of the memory chips; and wherein the particular one or more of the memory chips are the non-volatile memory chip.

EC265) The system of EC264, wherein the hardware is enabled to return the one or more instructions in response to the respective initial instruction fetch of the initial CPU by reading first data from the volatile one or more of the memory chips, and decrypting the first data using the key-less scrambling technique to produce the one or more instructions; and wherein the first data comprises the initial data after decryption with the specific key and re-encryption with the key-less scrambling technique.

EC266) The system of EC264, wherein the hardware is enabled to return the one or more instructions in response to the respective initial instruction fetch of the initial CPU by reading first data from the volatile one or more of the memory chips, and decrypting the first data using the particular key to produce the one or more instructions; and wherein the first data comprises the initial data after decryption with the specific key and re-encryption with the particular key.

EC267) The system of EC264, wherein the hardware comprises a cache; wherein the series of boot-time actions further include: storing at least some of the decrypted executable code, including the decrypted initial data, in the cache; and wherein the hardware is enabled to return the one or more instructions in response to the respective initial instruction fetch of the initial CPU by reading the one or more instructions from the cache.

EC268) The system of EC250, wherein the hardware comprises an on-chip ROM and a hardware random number generator; and wherein the hardware is enabled to perform, at a manufacturing time of the processing chip, manufacturing-time actions including: creating, using the hardware random number generator, the one or more keys; and writing the one or more keys to the on-chip ROM.

EC269) The system of EC268, wherein the hardware random number generator comprises a physically unclonable function.

EC270) The system of EC268, wherein the manufacturing-time actions further include: encrypting executable code with the specific key so that an encrypted version of the executable code is enabled to be stored in a non-volatile one of the memory chips at the manufacturing time.

EC271) The system of EC270, wherein the on-chip ROM is a first on-chip ROM; wherein the hardware comprises a second on-chip ROM; and wherein the manufacturing-time actions further include: subsequent to the encrypting the executable code with the specific key, changing state in the second on-chip ROM so that the specific key is disabled from use by an encryption operation.

EC272) The system of EC270, wherein the processing chip is configured to perform, subsequent to the releasing the reset state on the initial CPU, encrypting, using one of the one or more keys, data written to any of the memory chips by the one or more CPUs, and decrypting, using one of the one or more keys, the data read from any of the memory chips by the one or more CPUs.

EC273) The system of EC270, wherein the processing chip is configured to perform, subsequent to the releasing the reset state on the initial CPU, encrypting, using one of the one or more keys or a key-less scrambling technique, data written to any of the memory chips by the one or more CPUs, and decrypting, using one of the one or more keys or a key-less scrambling technique, the data read from any of the memory chips by the one or more CPUs.

EC274) The system of EC250, wherein the hardware further includes three or more external memory interfaces, and the three or more external memory interfaces comprise the one or more external memory interfaces.

EC275) The system of EC250, wherein the hardware includes expected configuration information, and wherein the series of boot-time actions further include: confirming at least some of the respective configuration information by comparing at least some results of the SPD operation with the expected configuration information.

EC276) The system of EC250, wherein the series of boot-time actions further include: performing an integrity check on the particular one or more of the memory chips; and in response to a failure of the integrity check, aborting the immutable hardware boot sequence.

EC277) The system of EC250, wherein the series of boot-time actions further include: aborting the immutable hardware boot sequence if, subsequent to the SPD operation, a predetermined configuration of the memory chips is not found.

EC278) The system of EC277, wherein the predetermined configuration of the memory chips comprises at least one DRAM memory chip on a first one of the external memory interfaces, and at least one non-volatile memory chip on a second one of the external memory interfaces.

EC279) The system of EC278, wherein the non-volatile memory chip is a SPI flash chip.

EC280) The system of EC250, wherein the processing chip comprises a securely-bootable subsystem, and the securely-bootable subsystem comprises the one or more CPUs and the hardware configured to perform the immutable hardware boot sequence.

EC281) The system of EC280, wherein the one or more CPUs are all of the run-time programmable CPUs in the securely-bootable subsystem.

EC300) A method comprising: at a manufacturing time of a specific one of multiple processing chips, creating, in the specific processing chip and using a physically unclonable function in the specific processing chip, two or more keys that are unique to the specific processing chip, and storing the keys in an on-chip ROM of the specific processing chip; prior to an initial operational boot time of the specific processing chip, encrypting, in the specific processing chip and using a boot one of the keys, executable code, and storing the encrypted executable code in a non-volatile memory external to the specific processing chip; at an operational boot time of the specific processing chip while holding one or more run-time programmable CPUs in the specific processing chip in a reset state and using immutable hardware in the specific processing chip, reading the external non-volatile memory to retrieve the encrypted executable code, and writing a version of the encrypted executable code to another memory external to the processing chip; at the operational boot time of the specific processing chip and using the immutable hardware in the specific processing chip, subsequent to the writing the version of the encrypted executable code to the other memory, commencing a software boot process of the specific processing chip by removing the reset state from at least an initial one of the run-time programmable CPUs which enables the initial run-time programmable CPU to either commence or complete an initial instruction fetch of one or more initial instructions; at the operational boot time of the specific processing chip, decrypting, using the boot key, at least some of the encrypted executable code, wherein the decrypted at least some of the encrypted executable code comprises the one or more initial instructions; wherein the keys are solely accessible by the immutable hardware in the specific processing chip; and wherein, as the keys are unique to the specific processing chip and not accessible by any of the run-time programmable CPUs in the specific processing chip, the encrypted executable code in the external non-volatile memory is not decryptable other than on the specific processing chip.

EC301) The method of EC300, wherein the external non-volatile memory is a first non-volatile memory; further comprising: prior to the initial operational boot time of the specific processing chip and subsequent to the encrypting the executable code, disabling, by changing state in an on-chip ROM of the specific processing chip, the specific processing chip from being able to store encrypted executable code in a second non-volatile memory that could store encrypted initial instructions usable by the software boot process; and wherein the specific processing chip is only bootable using the first non-volatile memory.

EC302) The method of EC301, wherein the changing state in the on-chip ROM disables the boot key from being used by an encryption operation.

EC303) The method of EC301, wherein the external non-volatile memory is coupled to the specific processing chip on a sole external memory interface of the specific processing chip that supports a type of the external non-volatile memory; and wherein the changing state in the on-chip ROM disables the sole external memory interface from being able to perform write operations.

EC304) The method of EC300, wherein the decrypting the at least some of the encrypted executable code is prior to the removing the reset state from the initial run-time programmable CPU.

EC305) The method of EC304, further comprising: re-encrypting the decrypted executable code to produce the version of the encrypted executable code written to the other memory; and wherein the encrypting uses a first encryption technique, and the re-encrypting uses a second encryption technique different from the first encryption technique.

EC306) The method of EC305, wherein the re-encrypting uses a second one of the keys, the second key different from the boot key.

EC307) The method of EC305, wherein the second encryption technique is a key-less scrambling technique.

EC308) The method of EC304, further comprising: writing at least some of the decrypted executable code to a cache in the specific processing chip, the at least some of the decrypted executable code comprising the one or more initial instructions.

EC309) The method of EC308, wherein the version of the encrypted executable code written to the other memory is same as the encrypted executable code.

EC310) The method of EC300, wherein the version of the encrypted executable code written to the other memory is same as the encrypted executable code; and wherein the decrypting the at least some of the encrypted executable code is subsequent to the removing the reset state from the initial run-time programmable CPU.

EC311) The method of EC300, further comprising: prior to the initial operational boot time of the specific processing chip, storing metadata in the external non-volatile memory; and at the operational boot time of the specific processing chip, reading the metadata from the external non-volatile memory and using the metadata to control the reading the external non-volatile memory to retrieve the encrypted executable code.

EC312) The method of EC311, further comprising using the metadata to control the writing the version of the encrypted executable code to the other memory.

EC313) The method of EC300, wherein the encrypting the executable code and the storing the encrypted executable code in the external non-volatile memory are at the manufacturing time of the specific processing chip.

EC314) The method of EC300, wherein the manufacturing time of the specific processing chip is a chip-level manufacturing time, and wherein the encrypting the executable code and the storing the encrypted executable code in the external non-volatile memory are at a system-level manufacturing time subsequent to the chip-level manufacturing time.

EC315) The method of EC314, further comprising: at the chip-level manufacturing time of the specific processing chip, packaging the specific processing chip in a package.

EC316) The method of EC315, wherein the package comprises the specific processing chip and the external non-volatile memory.

EC317) The method of EC300, wherein the executable code comprises Unified Extensible Firmware Interface (UEFI) code.

EC318) The method of EC317, wherein the executable code further comprises one or more drivers.

EC319) The method of EC318, wherein the executable code further comprises an operating system.

EC320) The method of EC319, wherein the executable code further comprises one or more applications.

EC350) A method of securely booting a processing chip, including: using immutable hardware and subsequent to de-assertion of a reset signal, continuing to hold one or more run-time programmable CPUs in the processing chip in a respective reset state; performing Serial Presence Detect (SPD) to determine or confirm presence of a boot flash chip on a first external memory interface of the processing chip and the presence of at least one volatile memory chip on a second external memory interface of the processing chip; configuring the first external memory interface and the boot flash chip to communicate; configuring the second external memory interface and the at least one volatile memory chip to communicate; generating a portion of an address map associating a range of addresses with the at least one volatile memory chip; reading contents of the boot flash chip, the contents including encrypted executable code; decrypting the contents using a particular one of multiple keys stored in an on-chip, Read-Only Memory (ROM) in the immutable hardware, the decrypted contents including decrypted executable code; re-encrypting the decrypted contents using a different one of the multiple keys, the re-encrypted contents including re-encrypted executable code; writing the re-encrypted contents to the at least one volatile memory chip; subsequent to the reading, decrypting, re-encrypting, and writing, releasing a particular one of the one or more run-time programmable CPUs from the respective reset state; subsequent to being released from the respective reset state, completing, by the particular run-time programmable CPU, an initial instruction fetch referencing, via the portion of the address map, an initial portion of the re-encrypted executable code in the at least one volatile memory; wherein the multiple keys are unique to the processing chip, the multiple keys having been created at a manufacturing time of the processing chip using a physically unclonable function in the processing chip; wherein the multiple keys are only accessible to the immutable hardware; and wherein read and write accesses by the or more run-time programmable CPUs are able to use the different key to encrypt data being written to the at least one volatile memory and decrypt data being read from the at least one volatile memory, but the or more run-time programmable CPUs are unable to use the particular key.

EC351) The method of EC350, wherein the one or more run-time programmable CPUs are enabled to perform instruction fetches referencing the re-encrypted executable code in the at least one volatile memory, and are not able to read a decrypted version of the executable code from any memory in or external to the processing chip.

EC352) the method of EC350, wherein, subsequent to the manufacturing time, the multiple keys are not accessible other than by the immutable hardware.

EC353) The method of EC350, wherein, subsequent to the manufacturing time, the multiple keys are not accessible via a JTAG scan chain or any other interface of the processing chip.

EC354) The method of EC350, wherein the one or more run-time programmable CPUs are enabled to perform instruction fetches referencing a decrypted version of the executable code in caches in the processing chip, and are not able to read the executable code from the caches in another way.

EC355) The method of EC350, wherein all data stored in the at least one volatile memory is encrypted by at least one of the multiple keys.

EC356) The method of EC350, wherein the one or more run-time programmable CPUs are the only run-time programmable CPUs in the processing chip.

EC357) The method of EC350, wherein the one or more run-time programmable CPUs are the only run-time programmable CPUs in a securely-bootable sub-system of the processing chip that includes the immutable hardware.

EC3558) The method of EC350, wherein completing the initial instruction fetch comprises returning a decrypted version of the initial portion of the re-encrypted executable code from a cache in the processing chip.

EC359) The method of EC358, further including: using the immutable hardware and subsequent to the decrypting, writing at least some of the decrypted contents to the cache as the decrypted version of the initial portion of the re-encrypted executable code.

EC360) The method of EC350, wherein completing the initial instruction fetch comprises reading from an address in the at least one volatile memory chip to retrieve initial data, and decrypting the initial data using the different key.

EC361) The method of EC350, wherein, subsequent to the manufacturing time, the decrypted executable is not readable by the one or more run-time programmable CPUs, and is able to be returned to the one or more run-time programmable CPUs in response to instruction fetching of the one or more run-time programmable CPUs.

EC362) The method of EC361, wherein the decrypted executable is not readable by the one or more run-time programmable CPUs in any memory on or coupled to the processing chip.

EC400) A procedure (or method), comprising: prior to an initial operational use of a particular one of multiple processing chips: creating, in the particular processing chip and by using a physically unclonable function in the particular processing chip, at least one key; storing the at least one key in an on-chip ROM of the particular processing chip, wherein the at least one key is usable by a cryptographic engine in the particular processing chip but is not accessible by any run-time programmable CPU in the particular processing chip (or is only accessible by autonomous hardware); receiving, via one or more inputs of the particular processing chip, a stream of data; using a particular one of the at least one key and the cryptographic engine, encrypting the stream of data to produce a stream of encrypted data; computing an integrity check on the stream of data; outputting, via one or more outputs of the particular processing chip, the stream of encrypted data followed by a final value of the integrity check; writing the stream of encrypted data and the final value of the integrity check to a non-volatile memory coupled to the particular processing chip; and wherein the stream of encrypted data in the non-volatile memory is only usable with the particular processing chip as no other device has knowledge of the particular key.

EC401) The procedure of EC400, wherein, beginning prior to the receiving, no internal state of the particular processing chip that exposes knowledge of the at least one key is externally observable.

EC402) The procedure of EC400, wherein the creating and the storing are performed by autonomous hardware in the particular processing chip.

EC403) The procedure of EC402, wherein the receiving, the encrypting, the computing, and the outputting are performed by the autonomous hardware.

EC404) The procedure of EC400, comprising: storing the stream of data in a DRAM coupled to the particular processing chip; and wherein, subsequent to the storing, autonomous hardware in the particular processing chip is enabled to perform the receiving by reading the stream of data from the DRAM, and the autonomous hardware performs the encrypting, the computing, and the outputting.

EC405) The procedure of EC404, wherein the autonomous hardware is further enabled to perform the storing the stream of data in the DRAM by copying the stream of data from the non-volatile memory.

EC406) The procedure of EC405, comprising: subsequent to the writing the stream of encrypted data and the final value of the integrity check to the non-volatile memory, changing state in an on-chip ROM so that at least some data read via an interface of the particular processing chip to which the non-volatile memory is coupled is decrypted with the particular key before it is used.

EC407) The procedure of EC406, comprising: decrypting data read from the interface; re-computing an integrity check on the decrypted data; if a value of the re-computed integrity check is consistent with the final value of the integrity check, using the decrypted data; and if a value of the re-computed integrity check is not consistent with the final value of the integrity check, discarding the decrypted data.

EC408) The procedure of EC400, wherein the computing the integrity check on the stream of data produces a resulting integrity check value, and the encrypting produces the final value of the integrity check by encrypting the resulting integrity check value along with the stream of data.

EC409) The procedure of EC408, wherein the integrity check comprises a Cyclic Redundancy Check (CRC).

EC410) The procedure of EC408), wherein the integrity check comprises an error-correcting code.

EC411) The procedure of EC400, wherein the receiving the stream of data comprises reading the stream of data via an external interface of the processing chip.

EC412) The procedure of EC411, wherein one or more memory chips are coupled to the external interface of the processing chip, and the reading the stream of data comprises reading the stream of data from the one or more memory chips.

EC413) The procedure of EC412, comprising: prior to the receiving, copying the stream of data into the one or more memory chips.

EC414) The procedure of EC413, wherein the copying is from the non-volatile memory.

EC415) The procedure of EC414, wherein the copying does not encrypt or decrypt the stream of data.

EC450) A method of associating a particular one of two or more flash chips with a particular one of two or more processing chips, the method comprising: prior to an initial operational use of the particular processing chip, creating, in the particular processing chip and using autonomous hardware including a physically unclonable function, a key, wherein the key is only accessible by the autonomous hardware and is never exposed outside of the particular processing chip; encrypting, in the particular processing chip and using the key, a received stream of data; writing the encrypted stream of data to the particular flash chip; and wherein none of the processing chips except the particular processing chip are able to decrypt the encrypted stream of data in the particular flash chip.

EC451) The method of EC450, wherein the encrypting and the writing are prior to the initial operational use of the particular processing chip.

EC452) The method of EC450, wherein the received stream of data comprises executable code used to boot the particular processing chip for the initial operational use.

EC453) The method of EC452, wherein the creating is at a chip-level manufacturing time of the particular processing chip.

EC454) The method of EC452, wherein the encrypting and the writing are at or prior to a system-level manufacturing time of the particular processing chip.

EC455) The method of EC450, comprising: storing the key in an on-chip ROM of the particular processing chip.

EC456) The method of EC450, comprising: subsequent to the encrypting, changing state in an on-chip ROM of the particular processing chip to disable use of the key for encryption; and wherein the particular processing chip is able, using the key, to decrypt only the encrypted stream of data stored in the particular flash chip.

EC457) The method of EC450, comprising: performing an integrity check on the received stream of data.

EC458) The method of EC457, comprising: saving a value computed by the integrity check in an on-chip ROM of the particular processing chip.

EC459) The method of EC457, comprising: encrypting a value computed by the integrity check, and writing the encrypted value to the particular flash chip.

EC460) The method of EC459, wherein the encrypting the value computed by the integrity check is via appending the value computed by the integrity check to the received stream of data prior to the encrypting the received stream of data.

EC461) The method of EC450, comprising: reading an external memory coupled to the particular processing chip to obtain the received stream of data.

EC462) The method of EC461, wherein the autonomous hardware is enabled to perform the reading, the encrypting, and the writing.

EC463) The method of EC462, wherein the executable code comprises a bootloader.

EC464) The method of EC463, wherein the executable code comprises an operating system.

EC500) A system comprising a processing chip and a non-volatile memory chip, wherein the system embodies the method of any one or more of EC400 to EC415, the processing chip is the particular processing chip. and the non-volatile memory chip comprises the non-volatile memory.

EC501) A system comprising a processing chip and a non-volatile memory chip, wherein the system embodies the method of any one or more of EC450 to EC461, the processing chip is the particular processing chip. and the non-volatile memory chip comprises the particular flash chip.

EC550) A system comprising: a memory coupled to an external memory interface of a particular one of multiple processing chips; autonomous hardware in the particular processing chip including a physically unclonable function; a key management unit in the particular processing chip, wherein the key management unit is enabled to create, via the autonomous hardware and using the physically unclonable function, one or more keys at a manufacturing time of the particular processing chip; a non-volatile memory chip coupled to an external boot flash interface of the particular processing chip, wherein the non-volatile memory chip contains executable code encrypted with a boot one of the keys; immutable hardware in the particular processing chip enabled to perform a secure boot operation of the particular processing chip to place the particular processing chip in operational use where one or more processors of the particular processing chip execute a decrypted version of the encrypted executable code stored in the non-volatile memory chip; the immutable hardware enabled, during the operational use of the particular processing chip and subsequent to establishing a connection with a network host, to perform a firmware update operation comprising: as part of or subsequent to receiving a stream of update data comprising updated executable code from the network host and writing the stream of update data in the memory, authenticating the received stream of update data using an authentication one of the one or more keys; subsequent to the authenticating succeeding, reading the written stream of update data from the memory; encrypting the read stream of update data with the boot key; storing the encrypted stream of update data to the non-volatile memory chip; wherein the immutable hardware is enabled, subsequent to the storing, to perform the secure boot operation of the particular processing chip to place the particular processing chip in the operational use where the one or more processors execute a decrypted version of the encrypted updated executable code stored in the non-volatile memory chip; and wherein subsequent to the manufacturing time of the particular processing chip, the one or more keys are only accessible by the immutable hardware.

EC551) The system of EC550, wherein the non-volatile memory chip is a NAND flash chip including multiple NAND flash dice.

EC552) The system of EC550, wherein the non-volatile memory chip comprises two or more SPI flash chips.

EC553) The system of EC550, wherein the memory is a DRAM DIMM including multiple DRAM chips.

EC554) The system of EC550, comprising: the one or more processors in the particular processing chip, wherein the one or more processors are unable to influence operation of the immutable hardware.

EC555) The system of EC554, wherein one of the one or more processors is enabled to initiate the firmware update operation of the immutable hardware.

EC556) The system of EC550, wherein the one or more keys are unique to the particular processing chip.

EC557) The system of EC550, wherein the connection to the network host is a secure connection.

EC558) The system of EC557, wherein the immutable hardware is enabled to establish the secure connection.

EC559) The system of EC557, wherein the immutable hardware is enabled to authenticate the secure connection.

EC560) The system of EC550, wherein a network management center comprises the network host.

EC561) The system of EC560, wherein authentication key is one of a public key and a private key, and the network management center is enabled to store the other of the public key and the private key.

EC562) The system of EC550, wherein the authenticating uses the authentication key to compute a digital signature of the received stream of update data.

EC563) The system of EC562, wherein the authenticating succeeding comprises verification of the consistency of the digital signature with a received digital signature.

EC564) The system of EC550, wherein the secure boot operation comprises reading a current version of encrypted executable code in the non-volatile memory chip, decrypting the current version of the encrypted executable code using the boot key, re-encrypting the decrypted executable using a default one of the one or more keys, and writing the re-encrypted executable code to the memory; and wherein subsequent to the firmware update operation, the current version of the encrypted executable code is the encrypted updated executable code.

EC565) The system of EC564, wherein the secure boot operation comprises holding the one or more processors of the particular processing chip in a respective reset state until after at least some of the writing, and then releasing at least one of the one or more processors from the respective reset state and enabling the at least one of the one or more processors to complete an initial instruction fetch referencing a portion of the re-encrypted executable code in the memory.

EC566) The system of EC565, wherein the secure boot operation does not authenticate the current version of the encrypted executable code in the non-volatile memory chip.

EC567) The system of EC565, wherein the secure boot operation comprises verifying the current version of the encrypted executable code with an integrity check.

EC568) The system of EC567, wherein the integrity check is performed on a decrypted version of the current version of the encrypted executable code.

EC569) The system of EC550, wherein the non-volatile memory chip is initially stored with executable code encrypted with the boot key at the manufacturing time of the particular processing chip.

EC570) The system of EC550, wherein at the manufacturing time of the particular processing chip, on-chip state of the particular processing chip is enabled to be changed so as to render at least a portion of the autonomous hardware immutable, and wherein the immutable hardware comprises the at least a portion of the autonomous hardware.

EC571) The system of EC550, comprising: an I/O interface of the particular processing chip; and wherein the receiving the stream of update data comprises receiving the stream of update data via the I/O interface.

EC571) The system of EC550, wherein the I/O interface is a network interface.

EC572) The system of EC550, comprising: the particular processing chip; and a package containing the particular processing chip.

EC573) The system of EC572, wherein the package contains the particular processing chip and the non-volatile memory chip.

EC574) The system of EC572, wherein the package contains the particular processing chip and the memory.

EC600) A processing chip comprising: immutable hardware including a Key Management Unit (KMU) storing multiple keys, the multiple keys having been created previously, e.g., at a manufacturing time of the processing chip, using a physically unclonable function in the processing chip; a Unified Memory Controller (UMC) including two or more external memory interfaces, a boot one of the external memory interfaces enabled to communicate with a boot flash chip, at least one of others of the external memory interfaces enabled to communicate with one or more other memory chips; one or more CPUs enabled to securely boot to run executable code stored in the boot flash chip; wherein the immutable hardware includes a portion of the UMC enabled, in response to a reset of the processing chip, to perform the secure boot of the one or more CPUs by copying contents of the boot flash chip including the executable code to the one or more other memory chips, wherein the copying comprises: reading the contents from the boot flash chip; decrypting the contents with a particular one of the multiple keys; re-encrypting the decrypted contents with another one of the multiple keys; and writing the re-encrypted contents to the one or more other memory chips; wherein the KMU and the boot flash chip are inaccessible to the one or more CPUs; and wherein data written to the others of the external memory interfaces via the UMC is encrypted with one of the multiple keys except for the particular key, and data read from the others of the external memory interfaces via the UMC is decrypted with one of the multiple keys except for the particular key.

EC601) The processing chip of EC600, wherein all data written to the others of the external memory interfaces by the UMC is encrypted with one of the multiple keys except for the particular key, and all data read from the others of the external memory interfaces by the UMC is decrypted with one of the multiple keys except for the particular key.

EC602) The processing chip of EC600, wherein the multiple keys are accessible only to the immutable hardware.

EC603) The processing chip of EC602, wherein the immutable hardware includes a Cryptographic Engine (CE) coupled to the KMU and to the UMC, the CE providing one or more types of encryption and decryption operations.

EC604) The processing chip of EC602, wherein the immutable hardware is only enabled to use the particular key to decrypt data read from and to encrypt data written to the boot flash chip.

EC605) The processing chip of EC604, wherein, during operational use of the processing chip, the immutable hardware is only enabled to write to the boot flash chip as part of an update process.

EC606) The processing chip of EC605, wherein the immutable hardware, in response to initiation of the update process, is enabled to: read updated contents from the one or more other memory chips; decrypt the updated contents with one of the multiple keys other than the particular key; re-encrypt the decrypted contents with the particular key; and write the re-encrypted contents to the boot flash chip.

EC607) The processing chip of EC600, wherein ones of the multiple keys other than the particular key are enabled to be specified by the one or more CPUs for use in encryption or decryption operations, and the particular key is not enabled to be specified by the one or more CPUs for any use.

EC608) The processing chip of EC607, wherein the ones of the multiple keys other than the particular key have a respective index, and wherein a given one of the ones of the multiple keys other than the particular key is enabled to be specified by the one or more CPUs by the respective index of the given key.

EC609) The processing chip of EC600, wherein the UMC includes Serial Presence Detect (SPD) hardware enabled to perform an SPD operation on at least some of the two or more external memory interfaces.

EC610) The processing chip of EC609, wherein the immutable hardware, prior to the copying the contents of the boot flash chip, is enabled to perform the SPD operation.

EC611) The processing chip of EC610, wherein the at least some of the two or more external memory interfaces includes the at least one of the others of the external memory interfaces enabled to communicate with the one or more other memory chips.

EC612) The processing chip of EC600, wherein the one or more other memory chips are coupled to a single one of the others of the external memory interfaces.

EC613) The processing chip pf EC600, wherein the one or more other memory chips are a single DRAM chip.

EC614) The processing chip pf EC600, wherein the boot flash chip is one or more NAND flash chips.

EC615) The processing chip of EC600, wherein the immutable hardware includes a Cryptographic Engine (CE) coupled to the KMU and to the UMC, the CE providing one or more types of encryption and decryption operations; and wherein the decrypting the contents and the re-encrypting the decrypted contents are via the CE.

EC616) The processing chip of EC600, wherein the immutable hardware includes a first Cryptographic Engine (CE) coupled to the KMU and to the UMC, the CE providing one or more types of encryption and decryption operations; wherein the decrypting the contents and the re-encrypting the decrypted contents are via the UMC; and wherein encryption and decryption using the one of the multiple keys other than the particular key and the another one of the multiple keys are via the CE.

EC616) The processing chip of EC600, wherein the immutable hardware includes a first Cryptographic Engine (CE) coupled to the KMU and to the UMC and a second CE as part of the UMC; where the first CE and the second CE provide a respective one or more types of encryption and decryption operations; wherein the decrypting the contents and the re-encrypting the decrypted contents are via the second CE; and wherein encryption and decryption using the one of the multiple keys other than the particular key and the another one of the multiple keys are via the first CE.

EC617) The processing chip of EC616, wherein the KMU includes a first portion separate from the UMC and a second portion as part of the UMC.

EC618) The processing chip of EC617, wherein the first portion of the KMU is coupled to the first CE, and the second portion of the KMU is coupled to the second CE.

EC619) The processing chip of EC618, wherein the particular key is stored in the second portion of the KMU.

EC620) The processing chip of EC600, wherein the immutable hardware, in response to the reset of the processing chip and while copying the contents of the boot flash chip to the one or more other memory chips, is enabled to hold the one or more CPUs in a respective reset state.

EC621) The processing chip of EC620, wherein the immutable hardware, subsequent to copying at least some of the executable code to the one or more other memory chips, is enabled to release at least one of the one or more CPUs from the respective reset state EC650) A processing chip comprising: one or more external memory interfaces, a boot one of the external memory interfaces enabled to communicate with a boot flash chip storing encrypted executable code; immutable hardware including: a key management unit including one or more keys, the one or more keys having been created at a manufacturing time of the processing chip using a physically unclonable function in the processing chip, wherein the encrypted executable code in the boot flash chip is encrypted using a particular one of the one or more keys; boot hardware enabled to securely boot one or more CPUs by performing secure boot actions including copying the executable code from the boot flash chip to an external memory coupled to one of the one or more external memory interfaces, and holding the one or more CPUs in a respective reset state until at least an initial portion of the executable code is copied from the boot flash chip; wherein there is no programmatic access to or usage of the particular key by the one or more CPUs; and wherein the executable code includes an operating system kernel.

EC651) The processing chip of EC650, wherein the at least the initial portion of the executable code includes the operating system kernel.

EC652) The processing chip of EC650, wherein the secure boot actions include: subsequent to the at least the initial portion of the executable code being copied from the boot flash chip, releasing the respective reset state on a particular one of the one or more CPUs.

EC653) The processing chip of EC652, wherein the particular CPU is enabled, subsequent to the releasing the respective reset state on the particular CPU, to complete an initial instruction fetch referencing a portion of the executable code as stored in the external memory.

EC654) The processing chip of EC653, wherein the secure boot actions include: creating at least a portion of an address map via which the one or more CPUs are able to access the external memory; and wherein the referencing is via the portion of the address map.

EC655) The processing chip of EC653, comprising: a unified memory controller including the boot hardware; and wherein the unified memory controller is enabled to return a response to the initial instruction fetch by reading initial data from the external memory and decrypting the initial data with a default one of the one or more keys.

EC656) The processing chip of EC655, wherein the default key is different from the particular key.

EC657) The processing chip of EC653, comprising: a unified memory controller including the boot hardware and a cache; and wherein the unified memory controller is enabled to return a response to the initial instruction fetch by returning data read from the cache.

EC658) The processing chip of EC650, comprising the one or more CPUs.

EC659) The processing chip of EC650, wherein the copying the executable code from the boot flash chip to the external memory includes: reading the encrypted executable code from the boot flash chip; decrypting the encrypted executable code with the particular key; re-encrypting the decrypted executable code with a default one of the one or more keys; and writing the re-encrypted executable code to the external memory.

EC660) The processing chip of EC650, wherein ones of the one or more keys other than the particular key have a respective index.

EC661) The processing chip of EC660, wherein the one or more CPUs are enabled to specify one of the ones of the one or more keys other than the particular key for use in an encryption or decryption operation via the respective index.

EC662) The processing chip of EC661, wherein there is no read or write access to the one or more keys by the one or more CPUs.

EC663) The processing chip of EC662, wherein, subsequent to the manufacturing time, the one or more keys are only accessible by the immutable hardware.

EC664) The processing chip of EC663, wherein, subsequent to the manufacturing time, the one or more keys are not accessible by any diagnostic or debug mechanism.

EC665) The processing chip of EC650, wherein the immutable hardware includes a cryptographic engine enabled to perform encryption of the executable code at the manufacturing time and decryption of the executable code as part of the copying; and wherein the key management unit is coupled to the cryptographic engine.

EC666) The processing chip of EC665, wherein the processing chip includes a unified memory controller, the unified memory controller including the cryptographic engine and at least a portion of the key management unit that stores the particular key.

EC667) The processing chip of EC666, wherein the cryptographic engine is a first cryptographic engine, and the at least a portion of the key management unit is a first portion of the key management unit; wherein the processing chip includes a second cryptographic engine separate from the unified memory controller; wherein a second portion of the key management unit separate from the unified memory controller; stores at least some of the one or more keys other than the particular key; wherein the second portion of the key management unit is coupled to the second cryptographic engine; and wherein the one or more CPUs are enabled to use the second cryptographic engine to perform encryption and decryption operations using ones of the keys stored in the second portion of the key management unit.

EC700) A method including: receiving, at a processing chip and via a secure network connection, an executable code update to executable code stored in a boot flash chip coupled to the processing chip; writing the executable code update to a portion of external memory coupled to the processing chip that is only accessible to immutable hardware of the processing chip; and copying, via the immutable hardware, the executable code update from the portion of the external memory to the boot flash chip.

EC701) The method of EC700, further including: establishing the secure network connection between the processing chip and an external entity possessing a public portion of a key with which the executable code update is encrypted; and wherein a private portion of the key is unique to the processing chip and is stored solely within the processing chip.

EC702) The method of EC701, wherein the private portion of the key is accessible solely by the immutable hardware.

EC703) The method of EC701, further including: securely booting one or more CPUs of the processing chip by the immutable hardware performing operations including: reading the executable code update from the boot flash chip; decrypting the read executable code update using the private portion of the key; and satisfying an initial instruction fetch of one of the CPUs with the decrypted executable code update.

EC704) The method of EC700, further including: excluding the portion of the external memory from an address map used by one or more CPUs of the processing chip; and wherein the one or more CPUs are enabled to be securely booted by the immutable hardware to execute code read from the boot flash chip.

EC705) The method of EC700, wherein the writing is via the immutable hardware.

EC706) The method of EC705, further including: enabling, via software executing on one of the one or more CPUs, the immutable hardware to perform the writing.

EC707) The method of EC700, further including: enabling, via software executing on a run-time programmable CPU of the processing chip, the immutable hardware to perform the copying.

EC708) The method of EC707, wherein the enabling includes: issuing a command to a unified memory controller that causes the unified memory controller to set state in a DMA controller to perform the copying.

EC709) The method of EC700, wherein the copying includes performing an integrity check on the executable code update.

EC750) A system including: one or more system processors; secure boot logic separate from the one or more system processors; an external memory accessible to the secure boot logic; one or more non-volatile memory chips accessible to the secure boot logic; wherein the one or more non-volatile memory chips are not accessible to the one or more system processors; wherein the secure boot logic is enabled, in response to a reset of the system, to copy system boot code from the one or more non-volatile memory chips to the external memory; and wherein at least one of the one or more system processors, subsequent to the reset of the system, is enabled to perform an initial instruction fetch referencing the system boot code in the external memory.

EC751) The system of EC750, wherein the system boot code in the external memory appears in an address space of the at least one of the one or more system processors at a location where a boot ROM is expected.

EC752) The system of EC751, wherein the secure boot logic is enabled to control mapping of at least a portion of the external memory into the address space of the at least one of the one or more system processors at the location where the boot ROM is expected.

EC753) The system of EC750, wherein the secure boot logic is enabled to determine when to allow the initial instruction fetch to complete.

EC754) The system of EC753, wherein the secure boot logic is enabled to hold the one or more system processors in a reset state to prevent a start of the initial instruction fetch.

EC755) The system of EC750, wherein, in response to a reset of the system and prior to the at least one of the one or more system processors completing the initial instruction fetch, the secure boot logic is enabled to securely boot at least one boot processor of the secure boot logic.

EC756) The system of EC755, wherein the secure boot logic includes immutable hardware; and wherein the immutable hardware is enabled to securely boot the at least one boot processor.

EC757) The system of EC756, wherein the at least one boot processor is enabled to control the copy of the system boot code from the one or more non-volatile memory chips to the external memory.

EC758) The system of EC756, wherein the immutable hardware is enabled to copy the system boot code to the external memory as part of the immutable hardware securely booting the at least one boot processor.

EC759) The system of EC750, wherein the system boot code includes a bootloader.

EC760) The system of EC759, wherein the system boot code includes a kernel.

EC761) The system of EC750, including: a southbridge; and wherein the southbridge includes the secure boot logic.

EC762) The system of EC750, including: a southbridge; and wherein the secure boot logic is in a chip separate from the southbridge and coupled to one or more external I/O interfaces of the southbridge.

EC763) The system of EC750, including: a northbridge; and wherein the northbridge includes the secure boot logic.

EC764) The system of EC750, wherein the secure boot logic is distributed among two or more of: a northbridge; a southbridge; and a chip coupled to one or more external I/O interfaces of the southbridge.

EC765) The system of EC750, wherein the external memory is coupled to the secure boot logic.

EC766) The system of EC765, where the external memory includes one or more DRAM chips.

EC767) The system of EC750, wherein the one or more non-volatile memory chips are coupled to the secure boot logic.

EC768) The system of EC750, wherein the secure boot logic is enabled to securely boot at least one boot processor of the secure boot logic to execute known-good executable code.

EC769) The system of EC768, wherein the known-good executable code includes code to perform operations including one or more of: controlling booting of the at least one of the one or more system processors; functions to monitor performance, power supplies, fans, temperature, and/or other physical, security, and environmental conditions; functions of a Trusted Platform Module (TPM); functions of a Hardware Security Module (HSM); functions of a Root of Trust (RoT); functions to securely update the known-good executable code; and functions to securely update the system boot code.

EC770) The system of EC750, wherein the system includes at least one network interface used by the one or more system processors; and wherein the secure boot logic is enabled to perform functions of a firewall on traffic to and/or from the at least one network interface.

System Overview

Basic Processing Chip

Figure 2:
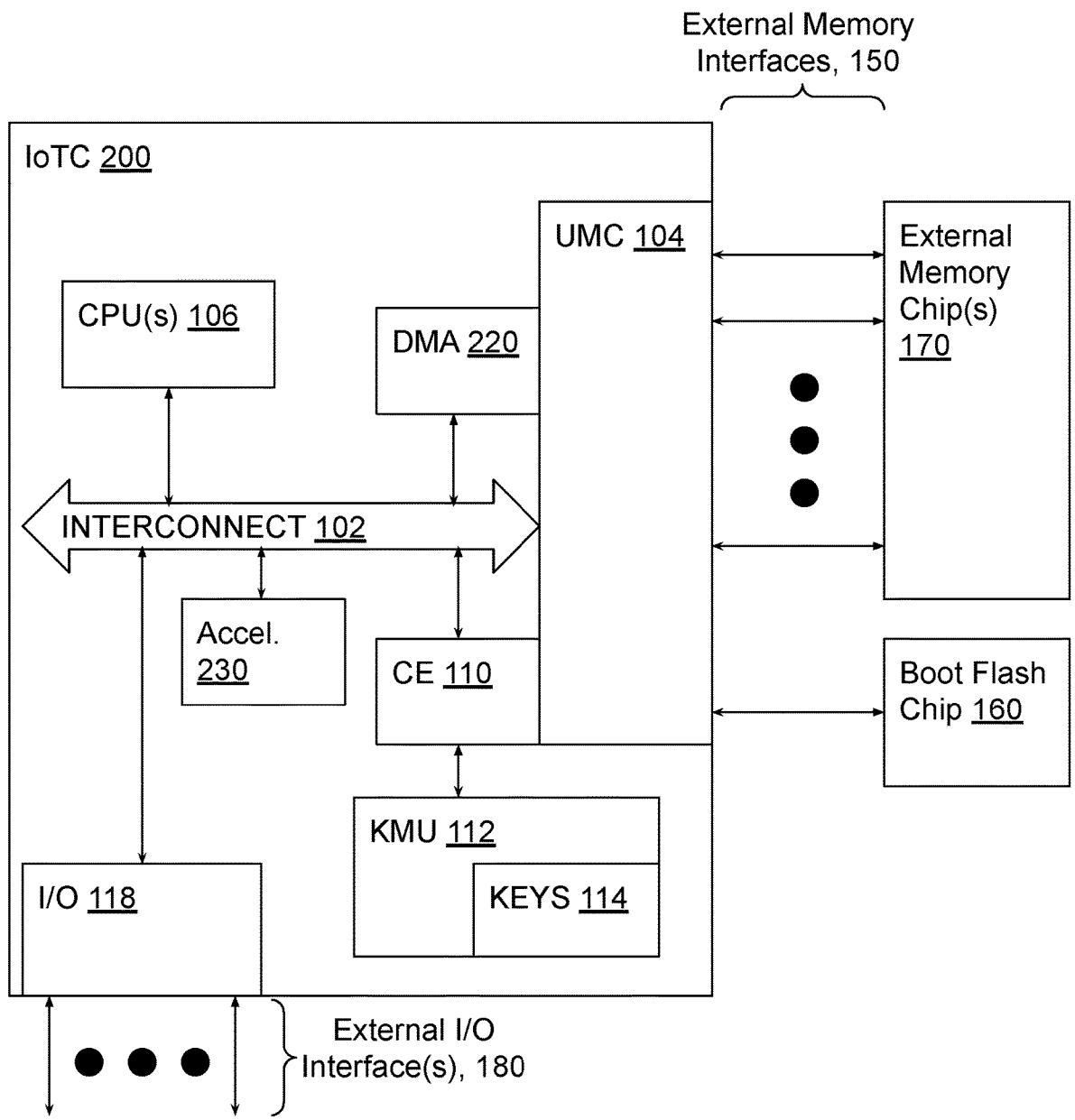
FIG. 2 illustrates an example of selected details of an embodiment of a processing chip used as an Internet of Things Chip (IoTC).
Figure 3:
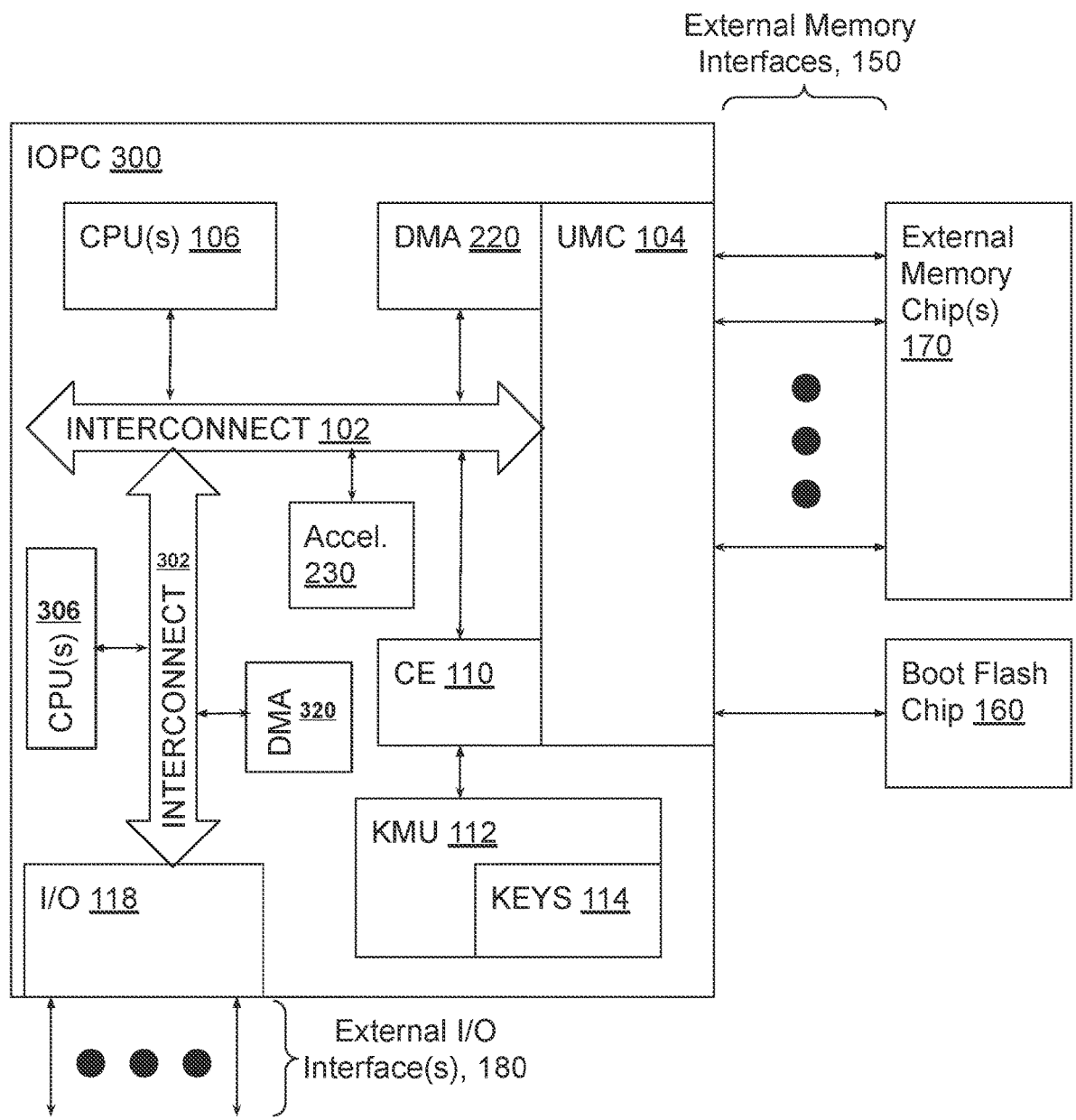
FIG. 3 illustrates an example of selected details of an embodiment of a processing chip used as an Input/Output Processing Chip (IOPC).
Figure 4:
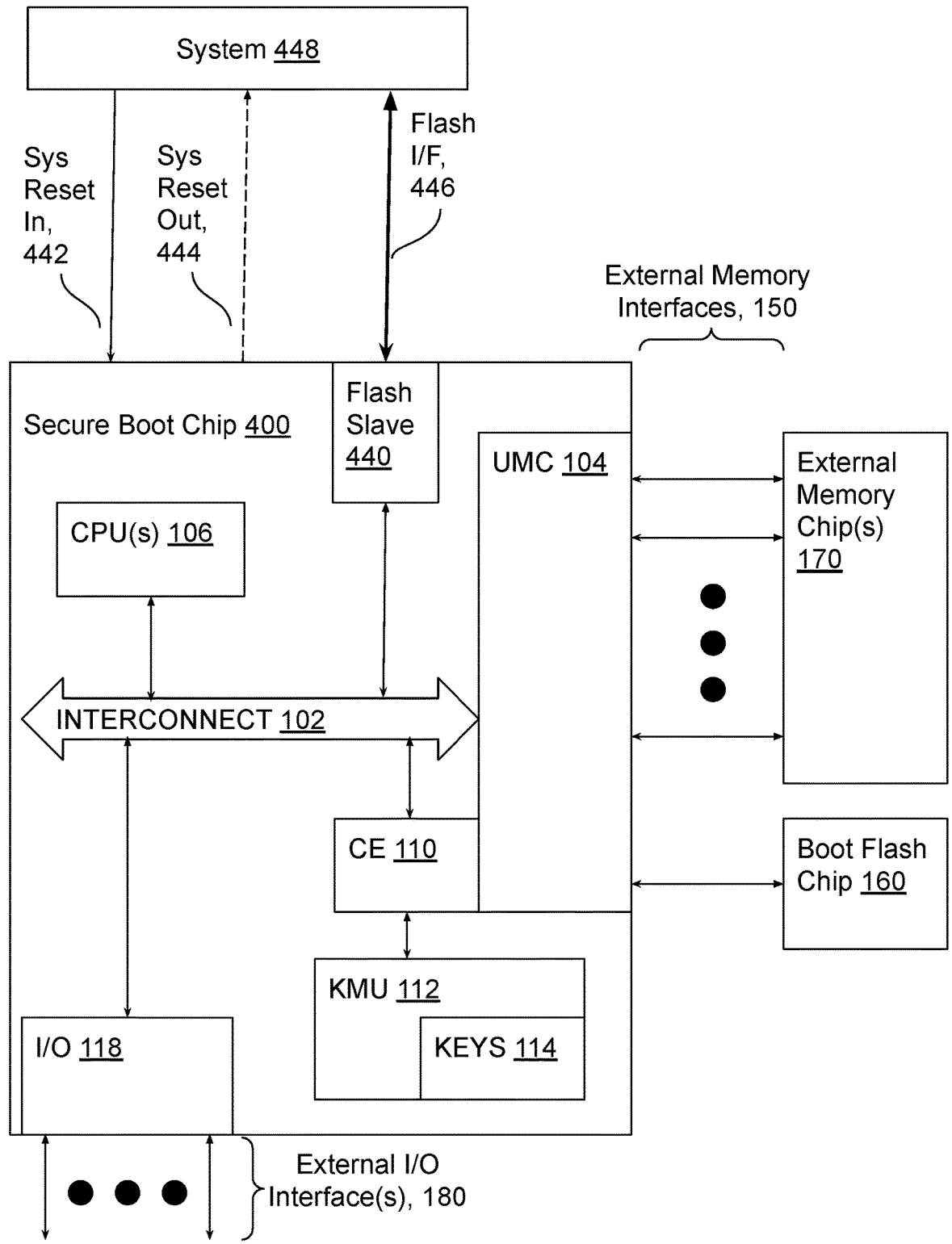
FIG. 4 illustrates an example of selected details of an embodiment of a system including a processing chip used as a Secure Boot Chip (SBC).

FIG. 1 illustrates an example of selected details of an embodiment of a basic processing chip, and FIGS. 2-4 illustrate examples of selected details of other embodiments of processing chips. Processing chips are not limited to these specific embodiments or to the specific applications discussed with respect to them. One or more integrated circuits containing one or more CPUs and implementing at least some of the techniques described in the present disclosure, such as a Secure Boot Process, a KMU, a UMC, and/or the manufacturing-time procedure above, is a processing chip.

Processing chip 100 is coupled to boot flash chip 160, and to one or more other external memory chip(s) 170 by external memory interfaces 150. In some embodiments, a given external memory interface complies with one or more memory interface standards, such as a DRAM interface standard (e.g., DDR3 or DDR4), a NAND flash memory standard (such as ONFI-4), a NOR flash memory interface standard (such as SPI), and other memory standards. According to various embodiments, the given external memory interface includes a data interface and/or a Serial Presence Detect (SPD) interface. In various embodiments, one or more of the external memory interfaces support more than one memory interface standard, and an SPD operation is used to determine the relevant standard to be used for data interfacing. For example, a DRAM interface supports multiple DRAM standards, and an appropriate standard is used according to a type of DRAM connected on the DRAM interface as discovered by the SPD operation. A choice of numbers of and types of external memory interfaces is dependent on an application in which processing chip 100 is intended to operate. While FIGS. 1-4 illustrate multiple external memory interfaces, in some embodiments a processing chip has only a single external memory interface.

According to various embodiments, one or more of: particular types or uses of external memory chip(s) 170 (and of boot flash chip 160) are on fixed ones of external memory interfaces 150; particular types or uses of external memory chip(s) 170 (and of boot flash chip 160) are able to operate on multiple ones of external memory interfaces 150; and a combination of the foregoing. In a first example, boot flash chip 160 is able to be located on a particular one of external memory interfaces 150. In a second example, boot flash chip 160 is able to be located on more than one of external memory interfaces 150, and its presence on a particular one of external memory interfaces 150 is determined using the SPD operation.

In a third example, particular ones of external memory interfaces 150 are able to support DRAM chips, and DRAM chips are not able to operate on other ones of external memory interfaces 150. In a fourth example, one of external memory interfaces 150 is able to support multiple types of non-volatile memory chips, such as both NAND flash and Phase Change Memory (PCM).

Processing chip 100 includes a number of units that are illustrated as being connected by interconnect 102: a Unified Memory Controller (UMC) 104; one or more CPU(s) 106; a Cryptographic Engine (CE) 110; and an Input/Output (I/O) unit 118. While FIG. 1 illustrates these units being interconnected, in some embodiments one or more of these units have more limited connectivity. For example, in some embodiments, CE 110 is part of UMC 104, does not have a separate connection to interconnect 102, and optionally and/or selectively is not separately accessible by other units. According to various embodiments, an architecture of interconnect 102 is one or more of: a multi-drop bus; an arbitrated bus; a split-transaction bus; a non-split-transaction bus; a bus that completes transactions in first-come, first-served order; a standardized bus such as RISC-V TileLink or ARM AMBA/AXI bus; an interconnection fabric; an interconnection switch; a crossbar; a network, such as a Clos network; other coupling(s) between two or more communicating units; and a combination or hierarchy of one or more of the foregoing. In further embodiments, processing chip 100 includes one or more Direct Memory Access (DMA) engines (not illustrated in FIG. 1) to provide for greater efficiency and/or less CPU overhead in data transfers between the units.

CPU(s) 106 are run-time programmable as defined in the present disclosure. In some embodiments, CPU(s) 106 are RISC-V CPUs.

I/O unit 118 connects to external I/O interface(s) 180 to enable processing chip 100 to communicate with external I/O devices (not illustrated). A choice of numbers of and types of external I/O interfaces is dependent on an application in which processing chip 100 is intended to operate. Examples of external I/O interfaces include SPI, I2C/SMBus, CAN bus, USB, eMMC, PCMCIA, Ethernet, DOCSIS, Bluetooth, Zigbee, 802.11, other wireless interfaces, cellular (e.g., telecommunication) interfaces, and others depending on the application. In some embodiments, some of these external I/O interfaces are supported through one or more external chips. For example, in some embodiments processing chip 100 supports Bluetooth I/O not by having a Bluetooth wireless output itself, but by providing an external I/O interface to communicate with a known Bluetooth I/O chipset.

In addition to external memory interfaces 150 and external I/O interface(s) 180, processing chip 100 (and other processing chips illustrated and described in the present disclosure) generally have multiple other I/O interfaces, also called I/O pins, which are not illustrated. According to various embodiments, the other I/O interfaces of a processing chip include one or more of: power (such as voltage input and ground) pins; one or more pins for clock inputs and/or other clock circuitry such as oscillators; one or more reset pins to provide reset signal inputs and/or outputs; JTAG pins generally used during manufacturing testing; debug pins, such as for In-Circuit Emulator (ICE) testing; and other pins as used on Application-Specific Integrated Circuits (ASICs) and Systems On a Chip (SOCs); and a combination of the foregoing.

Processing chip 100 also includes Key Management Unit (KMU) 112. KMU 112 includes Keys 114, which are created at manufacturing-time by the KMU key-creation process. Keys 114 include the KMU initial keys, and other information (such as the primordial key and the UUID) created by the KMU key-creation process. KMU 112 is illustrated as not being connected to interconnect 102 and to be connected to CE 110 to indicate that there is no access to Keys 114 by CPU(s) 106. In various embodiments, KMU 114 is coupled to other units, such as more directly to UMC 104 (as when CE 110 is part of UMC 104), but none of these other couplings provide access to Keys 114 by CPU(s) 106.

Processing chip 100 includes other circuitry to implement the immutable H/W boot sequence, such as one or more finite state machines and/or one or more microcontrollers (operating using code from one or more on-chip ROMs). In a first example, processing chip 100 includes circuitry to perform the SPD operation (without a use of a run-time programmable processor, such as one of CPU(s) 106), at least on a number of external memory interfaces 150 sufficient to carry out the H/W boot sequence. In a second example, processing chip 100 includes circuitry to copy contents of boot flash chip 160 into one of external memory chip(s) 170 (such as a DRAM chip). In some embodiments, the copying is performed by an FSM and/or a microcontroller that is not usable by any of the run-time programmable CPUs. In other embodiments, the copying is performed by enabling the H/W boot sequence to control a DMA engine (not illustrated in FIG. 1, but illustrated in FIG. 2) that is also usable by the run-time programmable CPUs once they are out of a reset state.

Processing chip 100 also includes other circuitry which is not illustrated. According to various embodiments, this circuitry includes one or more of: power-on reset circuitry; power and voltage control circuitry; clock generation and/or control circuitry; manufacturing interfaces such as JTAG; self-test circuitry; test and/or debug interfaces such as an In-Circuit Emulator (ICE) interface; circuitry enabling manufacturing-time procedures, such as the manufacturing-time KMU key-creation process, to be performed; other units performing application-specific functions; and other circuitry used in ASICs and/or SOCs.

Internet of Things Chip (IoTC) System

FIG. 2 illustrates an example of selected details of an embodiment of a processing chip used as an Internet of Things Chip (IoTC). IoTC 200 illustrated in FIG. 2 has an interconnect, multiple units, external interfaces, and external memory chips that perform similar functions as those with the same reference number illustrated in FIG. 1 for processing chip 100, and these are not discussed further with respect to IoTC 200 unless some change beyond implementation-specific variations is important to mention. Processing chip 100 itself is usable as an IoTC 200, even though it lacks the additional units illustrated in FIG. 2. Use of one or more of these additional units, such as DMA 220 and accelerator(s) 230, or other types of additional units not illustrated, provides greater flexibility, performance, and/or efficiency (such as power efficiency) to IoTC 200 in some applications.

IoTC 200 is operable as a standalone processing chip in an application such as in an Internet of Things (IoT) device. In a typical usage example, one or more external I/O devices connected via external I/O Interface(s) 180 are used for sensor input and device control outputs, such as monitoring and/or control of appliances, manufacturing equipment, HVAC equipment, surveillance cameras, inspection cameras, and other devices used in IoT applications. IoTC 200 has a wide range of applications, and different embodiments of IoTC 200 are optionally and/or selectively customized for a given application by including additional circuitry in a form of one or more accelerator(s) 230.

In some embodiments, IoTC 200 includes DMA 220 to provide, among other things, greater efficiency in transferring of data among the various other units, including to external I/O devices via I/O 118 and external I/O interface(s) 180 and to external memory chip(s) 170 (and optionally and/or selectively to boot flash chip 160) via UMC 104 and external memory interfaces 150. Similar to CE 110, in various embodiments, DMA 220 is part of UMC 104 (and does not have a separate connection to interconnect 102). According to various embodiments, DMA 220 is operable by hardware circuitry implementing the immutable H/W boot sequence, and/or DMA 220 is operable by CPU(s) 106 (once they are out of a reset state). In further embodiments, CPU(s) 106 use DMA 220 to perform operations such as: moving data from a particular one or more of external memory chip(s) 170 to one or more others of external memory chip(s) 170 (or to another location in the particular external memory chips); moving data between I/O devices on external I/O interface(s) 180 and one of external memory chip(s) 170; moving data to or from an on-chip memory, such as an on-chip SRAM; and other data transfer operations. In some embodiments, CPU(s) 106 are enabled to specify encryption and/or decryption options (performed as part of data movement by routing the data through CE 110), optionally and/or selectively including which of the KMU initial keys or some software-created key to use, and/or optionally and/or selectively including a particular encryption/decryption technique to use.

In some embodiments, DMA 220 is able to support multiple data transfer operations in parallel (such as in an interleaved manner) using tags, such as a four-bit tag. In some embodiments, one or more of CPU(s) 106 is able to control DMA 220 to start a DMA operation by specifying control information including a particular one of the tags (e.g., a number from 0 to 15 for four-bit tags), a source address (which optionally and/or selectively refers to an external I/O device on external I/O interface(s) 180), a destination address (which optionally and/or selectively refers to an external I/O device on external I/O interface(s) 180), a transfer length, and optionally and/or selectively control for CE 110 to specify encryption and/or decryption (and other information, such as selection of a key and/or of an encryption/decryption technique) to be performed as part of the DMA operation. In further embodiments, the given CPU also controls one or more of accelerator(s) 230 with similar tag-specific control information (either controlled via DMA 220 as part of its control information, and/or in further embodiments using separate control information provided by the given CPU directly to the one or more of accelerator(s) 230).

When DMA 220 commences a particular tagged DMA operation, the tag is sent along with data movement control information (such as addresses and read/write selection) and/or along with resulting data transfers, and one or more units having tag-specific control information (e.g., one of accelerator(s) 230 and/or CE 110) are able to operate on the data thus transferred using the tag-specific control information to perform a specified operation for that data transfer. (According to various embodiments, either DMA 220 routes data for these additional operations through the appropriate other units, or data transfer from DMA 220 always goes through these other units.) In a first example, the given CPU sets up a DMA transfer to move data from one range of addresses in external memory to another with the data passing through CE 110 on the way and being decrypted using the default key and then encrypted using a different tag-specific key specified by the CPU. In a second example, the given CPU sets up a DMA transfer to move data from one range of addresses in an I/O device on external I/O interface(s) 180 to a range of addresses in external memory with the data passing through one of accelerator(s) 230, such as for some type of security inspection or image processing, and then passing through CE 110 for encryption using the default key.

Accelerator(s) 230 are zero or more optional application-dependent units that improve factors such as throughput, latency, performance, efficiency, power, or other factors for a particular application. Some examples of accelerator(s) 230 include: a Convolutional Neural Network (CNN) processing accelerator; an image processing accelerator; a computational unit such as a Fast Fourier Transform (FFT), a Discrete Fourier Transform (DFT), or a Wavelet Transform (WT) accelerator; other hardware circuitry used to accelerate operations in a processing chip; and a combination of the foregoing. According to various embodiments, a particular one of accelerator(s) 230 one or more of: operates under control of CPU(s) 106; operates in conjunction with DMA 220, such as by one of CPU(s) 106 specifying that a particular DMA operation is routed through the particular accelerator; uses tags similar to or same as the tags used by DMA 220; other ways of routing data through the particular accelerator; and a combination of the foregoing.

Input/Output Processing Chip (IOPC) System

FIG. 3 illustrates an example of selected details of an embodiment of a processing chip used as an Input/Output Processing Chip (IOPC). IOPC 300 illustrated in FIG. 3 has an interconnect, multiple units, external interfaces, and external memory chips that perform similar functions as those with the same reference number illustrated in FIG. 1 for processing chip 100 and/or in FIG. 2 for IoTC 200, and these are not discussed further with respect to IOPC 300 unless some change beyond implementation-specific variations is important to mention. Either processing chip 100 or IoTC 200 is usable as an IOPC 300, even though they lack the additional units and interconnect illustrated in FIG. 3. Use of one or more of these additional units (such as CPU(s) 306 or DMA 320), or of interconnect 302, or of other types of additional interconnects and/or units not illustrated, provides greater flexibility, performance, and/or efficiency (such as power efficiency) to IOPC 300 in some embodiments.

IOPC 300 is operable as a standalone processing chip in I/O-intensive or other applications, such as in a network firewall, a Network Interface Chip (NIC), a cable modem, an access point, a base station, or a router (such as an edge router). In a typical usage example, one or more external I/O devices connected via external I/O Interface(s) 180 are used for packet-based I/O, such as internet, wireless, cellular, or other network traffic. In some embodiments, one or more of external I/O Interface(s) 180 are designed for higher rates of data transfer for an IOPC 300 than for an IoTC 200.

As illustrated in FIG. 3, IOPC 300 has a hierarchical interconnection scheme where some units, such as CPU(s) 306 and I/O 118, are on a lower-level interconnect than interconnect 102, which serves as a highest-level interconnect in IOPC 300. According to various embodiments, interconnect 302 is a same architecture as interconnect 102, or is a different architecture than interconnect 102. In various embodiments, interconnect 102 provides a higher bandwidth than interconnect 302 because in addition to bandwidth for CPU(s) 106, DMA 220, and other units on interconnect 102, it is able to provide bandwidth for I/O traffic to or from interconnect 302. In a first example, interconnect 302 and interconnect 102 have related architectures, such as an ARM AHB bus and an ARM AXI bus. In a second example, interconnect 302 has a bus architecture such as RISC-V TileLink, and interconnect 102 is a switch fabric, such as a crossbar.

In some embodiments, IOPC 300 includes CPU(s) 306 to provide, among other things, greater efficiency in processing of I/O. In some usage scenarios, having one or more additional CPUs closer to I/O 118 provides greater efficiency and shorter latencies in handling I/O-intensive processing. For example, in some embodiments, CPU(s) 306 provide lower levels of packet processing, such as the link layer, the IP layer, and/or the TCP layer, while CPU(s) 106 provide higher levels of processing, such as the session and/or application layers. Continuing the example, in some usage scenarios, CPU(s) 306 perform, among other tasks, functions of a TCP Offload Engine (TOE), and CPU(s) 106 perform, among other tasks, stateful packet inspection and/or processing of network control information or routing protocols (such as BGP).

Of course, as explained above, any of CPU(s) 106 and CPU(s) 306 is a different architecture, configuration, etc. than others of CPU(s) 106 and CPU(s) 306. For example, in some embodiments, CPU(s) 306 are a different architecture and/or configuration and/or operate at a different nominal maximum clock frequency than CPU(s) 106 so that CPU(s) 306 and CPU(s) 106 are optimized for their respective tasks.

In some embodiments, IOPC 300 includes DMA 320 to provide, among other things, greater efficiency in transferring of I/O data. In various embodiments, DMA 320 has a similar function and operation as DMA 220, and is different solely because it is located on interconnect 302 rather than on interconnect 102. In other embodiments, DMA 320 is optimized specifically for I/O data transfers, such as by supporting a different number of tags, or by providing features for more efficient support of I/O data transfers (e.g., having a list of address ranges as the source and/or as the destination for a single DMA operation). IOPC 300 has a wide range of applications, and different embodiments of IOPC 300 are optionally and/or selectively customized by including additional accelerators (not illustrated in FIG. 3), similar to accelerator(s) 230, but connected to interconnect 302. In some embodiments, these additional accelerators are used by CPU(s) 306 for I/O traffic. For example, packet processing operations performed by CPU(s) 306 are advantageously made more efficient with some packet processing performed in a hardware accelerator so that CPU(s) 306 need only handle exceptions, such as an initial packet in a flow of related packets, or a packet of a type not recognized by the hardware accelerator.

For similar reasons, in some embodiments, IOPC 300 has additional memory, such as SRAM, connected to interconnect 302 for use by CPU(s) 306, DMA 320, and/or the additional accelerators. For example, in some embodiments, packetized I/O is staged in the additional memory for processing prior to being transferred to external memory via interconnect 102. This processing, in some embodiments and/or usage scenarios, modifies the format of received packets to reflect results of the processing.

Secure Boot Chip (SBC) System

FIG. 4 illustrates an example of selected details of an embodiment of a system including a processing chip used as a Secure Boot Chip (SBC). SBC 400 illustrated in FIG. 4 has an interconnect, multiple units, external interfaces, and external memory chips that perform similar functions as those with the same reference number illustrated in FIG. 1 for processing chip 100, and these are not discussed further with respect to SBC 400 unless some change beyond implementation-specific variations is important to mention. Use of one or more additional units, such as DMA 220 and accelerator(s) 230 illustrated in FIG. 2, or other types of additional units not illustrated, provides greater flexibility and/or performance and/or efficiency (such as power efficiency) to SBC 400 in some embodiments. In various embodiments, SBC 400 does not require all of the units in processing chip 100, or uses very minimal versions of those units. For example, some embodiments of SBC 400 do not require I/O 118, other embodiments of SBC 400 use just one or two simple external I/O interfaces for management communication, and yet other embodiments of SBC 400 use any number and/or type of external I/O interfaces.

SBC 400 is operable as a secure boot device for a system (such as system 448) needing greater boot security than offered by traditional system boot procedures, such as found in most personal computers. These systems generally boot by having a processor, such as an x86 processor, start fetching instructions at reset and controlling at least some of the boot process in software. Approaches such as this are potentially vulnerable, even if the boot code being executed is somehow verified, such as with a CRC or other digital signature, because there is still a possibility that the boot code (and its CRC or other digital signature) has been corrupted by malicious software. Use of SBC 400 to load only known-good system boot code that is not corruptible by software running or executing on the system closes this security hole. According to various embodiments, the known-good system boot code includes one or more of: a bootloader; a BIOS; UEFI boot code; drivers; firmware; an operating system; a hypervisor; other code that is part of a system boot process; and a combination of the foregoing. According to various embodiments, system 448 is one or more of: a host computer; a server; a router; a firewall; a computer or processor reading boot code from an external memory or an external I/O interface; and a combination of the foregoing.

In various embodiments, SBC 400 is tamper-resistant and/or tamper-proof to ensure that the system boot code is not corruptible or observable even with physical access to system 448. For example, SBC 400 is designed so that if tampered with, contents of SBC 400, such as cryptographic keys used to encrypt the system boot code, are destroyed (e.g., erased), thus preventing the system boot code from being decrypted by an adversary.

In some embodiments, in order to retrofit SBC 400 into an existing system, such as system 448, SBC 400 uses Flash Slave 440 to communicate via Slave Flash Interface (SFI) 446 to system 448, thus enabling SBC 400 to act as a boot flash chip for system 448. That is, from the perspective of system 448, SBC 400 appears to be just a flash chip (or multiple boot flash chips, whichever system 448 expects) of a type system 448 uses to store its system boot code. But because SBC 400 is securely bootable, it provides known-good system boot code to system 448 (via SFI 446), and system 448 has no way to corrupt that code. (While the example illustrated in FIG. 4 uses SFI 446 to communicate with system 448, in other embodiments, any number and/or type of interfaces, including I/O interfaces such as a network interface, are used for similar purposes instead of or in addition to SFI 446.)

In various embodiments, Flash Slave 440 implements the slave (flash-chip-side) of a flash memory interface, such as a SPI flash slave interface, or an ONFI-4 NAND flash chip-side interface. Flash Slave 440 is able to impersonate one or more types and/or numbers of flash chips that are usable on SFI 446. In further embodiments, SFI 446 and Flash Slave 440 support Serial Presence Detect and are able to identify SBC 400 to system 448 not as a processing chip but as an expected type and/or number of flash chips.

Given that SBC 400 is itself secure, the system boot code for system 448 is stored, in some embodiments, in one or more external, non-volatile memory chips attached to one or more of external memory interfaces 150. In a first example, the one or more external, non-volatile memory chips are boot flash chip 160. In a second example, the one or more external, non-volatile memory chips are multiple ones of external memory chip(s) 170, such as two or more NAND flash chips.

There are multiple ways in which system 448 is held in a reset state during boot of SBC 400 so that known-good system boot code is made available before system 448 begins executing instructions. In a first example, SBC 400 receives a same system reset (Sys Reset In 442) as system 448, but does not respond to a request for data on SFI 446 until after SBC 400 is securely booted and is able to provide known-good system boot code to system 448. This entails no changes to system 448, provided that a delay in returning an answer to system 448's initial instruction fetch over SFI 446 does not cause a timeout or other exception. In a second example, system 448 is slightly modified so that a system reset used by the majority of system 448 is filtered by SBC 400. SBC 400 holds Sys Reset Out 444 active until SBC 400 has securely booted to a point where it is able to return known-good system boot code on SFI 446, at which point SBC 400 releases Sys Reset Out 444 (allowing system 448 to begin booting and fetching instructions). Processors and other logic in system 448 are thus held in reset by Sys Reset Out 444 until SBC 400 is able to provide known-good system boot code to system 448.

In some embodiments, provision is made to update the system boot code that SBC 400 stores for system 448, similar to a manner in which executable code in boot flash chip 160 is updatable. In various embodiments, SBC 400 also serves as a system management processor for system 448 and performs tasks (that might otherwise be performed by a separate IoTC 200) such as monitoring performance, power supplies, fans, temperature, and/or other physical, security, and environmental conditions of system 448.

In some embodiments, provision is made to update the system boot code that SBC 400 stores for system 448, similar to a manner in which executable code in boot flash chip 160 is updatable. In various embodiments, SBC 400 also serves as a System Management Processor for system 448 and performs tasks (that might otherwise be performed by a separate IoTC 200) such as monitoring performance, power supplies, fans, temperature, and/or other physical, security, and environmental conditions of system 448.

SBC 400 imposes minimal or no changes on system 448. More extensive changes to system 448 enable a more complex version of SBC 400, such as one enabled to write to memory in system 448, to provide even more security and/or flexibility. For example, in various embodiments, some or all of SBC 400 is integrated into a Southbridge (such as the I/O Controller Hub) of a PC chipset. Further details of these embodiments are described below with reference to FIG. 13.

Secure Boot Logic (SBL) in a Processor Complex

Figure 13:
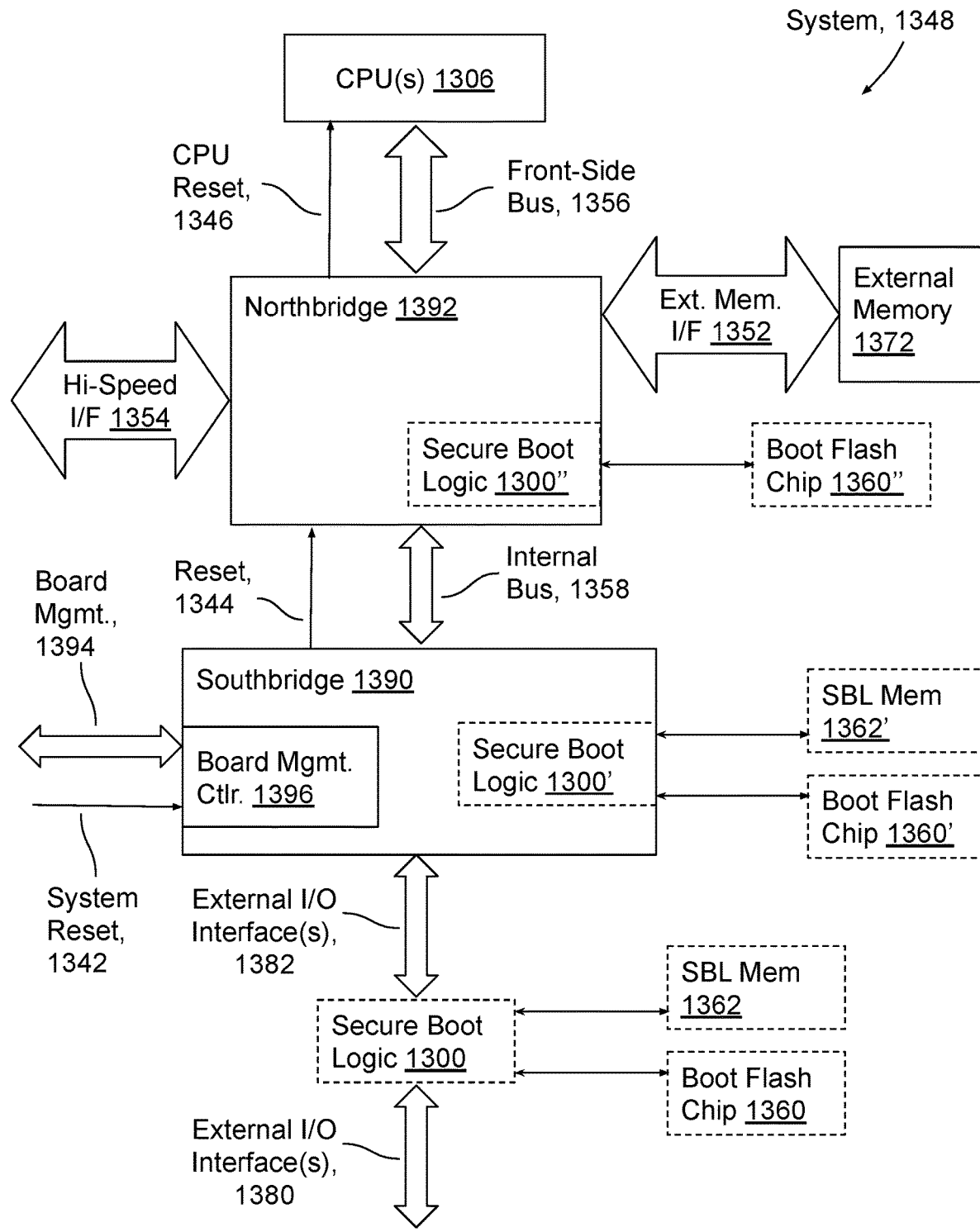
FIG. 13 illustrates an example of selected details of an embodiment of a system including Secure Boot Logic (SBL).

FIG. 13 illustrates an example of selected details of an embodiment of a system including Secure Boot Logic (SBL). System 1348 represents a high-level view of a processor complex, as would be used in a server, a personal computer, or in other applications. As illustrated in FIG. 13, System 1348 also includes: CPU(s) 1306, representing one or more processors (such as Intel, AMD, or ARM processors); Northbridge 1392 coupled to CPU(s) 1306 by Front-Side Bus 1356; and Southbridge 1390 coupled to Northbridge 1392 by Internal Bus 1358. The SBL is located in whole or in part in one or more locations in System 1348 as illustrated by Secure Boot Logic 1300, Secure Boot Logic 1300', and Secure Boot Logic 1300".

Front-Side Bus 1356 is typically a higher-speed interconnection between CPU(s) 1306 and Northbridge 1392, and in some embodiments also interconnects two or more chips that provide CPU(s) 1306. For example, in some systems, Front-Side Bus 1356 is a QuickPath Interconnect (QPI), a HyperTransport bus, or a PCI-Express (PCIe) bus.

Internal Bus 1358 between Northbridge 1392 and Southbridge 1390 is typically a lower-speed interconnection, such as PCI-Express (PCIe) or legacy PCI.

Northbridge 1392 generally supports higher-speed connectivity for CPU(s) 1306, such as PCIe, Accelerated Graphics Port (AGP), etc., as well as a connection to external memory (such as DRAM) used by CPU(s) 1306.

Southbridge 1390 generally supports lower-speed connectivity for CPU(s) 1306, such as for I/O and system management. In some systems, the I/O includes relatively faster interfaces, such as 10 Gigabit Ethernet, and relatively slower interfaces such as USB, SPI, and SMBus. Southbridge 1390 typically includes or is coupled to management logic (illustrated as Board Management Controller 1396) responsible for tasks such as power and environmental control for System 1348. Southbridge 1390 typically provides the interconnection to a boot ROM (e.g., SFI 446 as illustrated in FIG. 4) holding system boot code. The boot ROM is typically one or more NOR flash and/or NAND flash chips.

In some embodiments, the SBL optionally and/or selectively serves as a system management processor (as explained above for SBC 400), such as by including functions of Board Management Controller 1396. For example, the SBL is enabled to use ones of External I/O Interface(s) 1380 provided for system management functions (e.g., SMBus interfaces, interfaces to sensors, interfaces for control of power supplies, clocks, and/or fans, interfaces controlling CPU(s) 1306, etc.) and the known-good executable code executed by CPU(s) 106 performs system control, monitoring (including security monitoring), logging, and/or reporting. In various embodiments, the SBL includes and/or provides some or all of the functionality of Board Management Controller 1396.

While Board Management Controller 1396 is illustrated as being included in Southbridge 1390, some embodiments of System 1348 use a separate one or more chips for Board Management Controller 1396 (such as Secure Boot Logic 1300). In various embodiments of System 1348, Board Management Controller 1396 includes one or more processors separate from CPU(s) 1306.

As illustrated in FIG. 13 and according to various embodiments, the SBL is usable in at least one location in System 1348, including: as a separate chip external to CPU(s) 1306, Northbridge 1392, and Southbridge 1390, such as Secure Boot Logic 1300; integrated into Southbridge 1390, such as Secure Boot Logic 1300'; and/or integrated into Northbridge 1392, such as Secure Boot Logic 1300". In further embodiments, the SBL is distributed and is present in part in two or more of Secure Boot Logic 1300, Secure Boot Logic 1300', and Secure Boot Logic 1300", or in other locations in System 1348. For example, using additional connections between Northbridge 1392 and Southbridge 1390 and/or by communicating over Internal Bus 1358, a Secure Boot Logic 1300' portion of the SBL and a Secure Boot Logic 1300" portion of the SBL are able to function together to implement all functions of the SBL.

While FIG. 13 illustrates Boot Flash Chip 1360, Boot Flash Chip 1360', and Boot Flash Chip 1360", in various embodiments, only one of Boot Flash Chip 1360, Boot Flash Chip 1360', and Boot Flash Chip 1360" is present. Similarly, in some embodiments, only one of SBL Memory 1362 and SBL Memory 1362' is present. In other embodiments, neither SBL Memory 1362 nor SBL Memory 1362' is present, and the SBL uses at least a portion of External Memory 1372 for storage. In embodiments where Secure Boot Logic 1300 is not present, I/O devices coupled to Southbridge 1390 are coupled to External I/O Interface(s) 1382 (and External I/O Interface(s) 1380 is not present).

According to various embodiments, the SBL includes at least some features of one or more of processing chip 100, IoTC 200, IOPC 300, and SBC 400, as well as other features of use in System 1348. In some embodiments, for example, the SBL includes features of SBC 400 to provide known-good system boot code (e.g., executable code used by System 1348 to boot and/or to operate) to CPU(s) 1306. While not illustrated in FIG. 13, the SBL in various embodiments includes features present in one or more of processing chip 100, IoTC 200, IOPC 300, and SBC 400, such as one or more of CPU(s) 106, KMU 112, UMC 104, and other units of processing chip 100, IoTC 200, IOPC 300, or SBC 400.

In some embodiments, the SBL is enabled to enumerate some or all of memory and/or I/O devices of System 1348, such as one or more of SBL Memory 1362 (or SBL Memory 1362'), External Memory 1372, Boot Flash Chip 1360 (or Boot Flash Chip 1360' or Boot Flash Chip 1360"), other memory devices (not illustrated in FIG. 13), or I/O devices on External I/O Interface(s) 1382 (or External I/O Interface(s) 1380). As explained above, in various embodiments immutable hardware of the SBL optionally and/or selectively performs SPD on one or more memory interfaces in order to enable communication with attached memory devices, such as SBL Memory 1362 (or SBL Memory 1362' or External Memory 1372) and/or Boot Flash Chip 1360 (or Boot Flash Chip 1360' or Boot Flash Chip 1360"). In further embodiments, after the SBL itself is securely booted (and optionally and/or selectively prior to CPU(s) 1306 being securely booted), software executing on CPU(s) 106 of the SBL is enabled to enumerate some or all of the I/O devices of System 1348, for example to perform security checks as to the presence and/or types of the I/O devices. In yet further embodiments, the SBL is enabled to act as a transparent I/O bridge from the perspective of CPU(s) 1306, while actually optionally and/or selectively modifying the I/O configuration, such as by hiding the existence of one or more of the I/O devices (such as the boot ROM).

In various embodiments, such as some embodiments where at least a portion of the SBL is integrated into Northbridge 1392, a UMC of the SBL serves as a memory controller for System 1348. For example, the UMC is coupled to External Memory 1372 and memory traffic from other parts of System 1348 is via the UMC. In various embodiments, this enables the SBL to perform encryption/decryption of traffic to/from External Memory 1372, similar to the manner in which these functions were described with respect to CPU(s) 106 in the SBL.

In some embodiments, the SBL is able to access 'host' memory (e.g., External Memory 1372) used by CPU(s) 1306, either directly (such as via the UMC of Secure Boot Logic 1300") or via interfaces within System 1348 (such as via Secure Boot Logic 1300' communicating over Internal Bus 1358 similar to I/O communications to/from memory). In various embodiments, some or all of the host memory accessed by the SBL is inaccessible to CPU(s) 1306, such as by not being included in an address map used by CPU(s) 1306.

In some embodiments, the SBL includes functions of a Secure Boot Chip (e.g., SBC 400) to provide known-good system boot code for CPU(s) 1306 (similar to SBC 400 providing known-good system boot code to system 448). In various of these embodiments, Boot Flash Chip 1360 (or Boot Flash Chip 1360' or Boot Flash Chip 1360") serve the role of Boot Flash Chip 160 as illustrated in FIG. 4, and/or SBL Memory 1362 (or SBL Memory 1362' or External Memory 1372) serve the role of External Memory Chip(s) 170 as illustrated in FIG. 4. For example, in various embodiments including Secure Boot Logic 1300, SFI 446 (as illustrated in FIG. 4) is one of External I/O Interface(s) 1382 and is optionally and/or selectively not passed through to External I/O interfaces 1380. In further embodiments, instead of acting as a replacement for a boot ROM by mimicking the boot ROM on SFI 446, the SBL (such as Secure Boot Logic 1300' or Secure Boot Logic 1300") is enabled to mimic the existence of the boot ROM from the perspective of CPU(s) 1306 by serving as a bridge through which some or all of the I/O traffic of System 1348 passes. In embodiments such as these, the SBL is enabled to be compatible with expectations of System 1348 for presence of a boot ROM, while providing known-good system boot code (such as described for SBC 400 in FIG. 4) in a more secure manner. For example, the SBL is enabled to copy the known-good system boot code into a portion of SBL Memory 1362, and to enable the portion of SBL Memory 1362 to appear to CPU(s) 1306 as if it was a boot ROM of System 1348.

In various embodiments, a boot flash chip (e.g., one or more of Boot Flash Chip 1360, Boot Flash Chip 1360', or Boot Flash Chip 1360") is accessible to and/or is coupled to the SBL. (As explained above, the boot flash chip optionally uses any non-volatile memory type and/or interface, and in some embodiments includes multiple non-volatile memory chips.) In various embodiments, an SBL memory (e.g., one or more of SBL Memory 1362, SBL Memory 1362', or External Memory 1372) is accessible to and/or is coupled to the SBL. In further embodiments, as illustrated in FIG. 13, Secure Boot Logic 1300" is, because of its location in Northbridge 1392, able to use at least a portion of External Memory 1372 as the SBL memory. In yet further embodiments, by control of an address map used to access External Memory 1372, the SBL is enabled to hide portions of External Memory 1372 from CPU(s) 1306 so as to have private memory for the SBL. In other embodiments, Secure Boot Logic 1300" (not illustrated in FIG. 13) has a separate SBL memory (similar to SBL Memory 1362' for Secure Boot Logic 1300').

Figure 5:
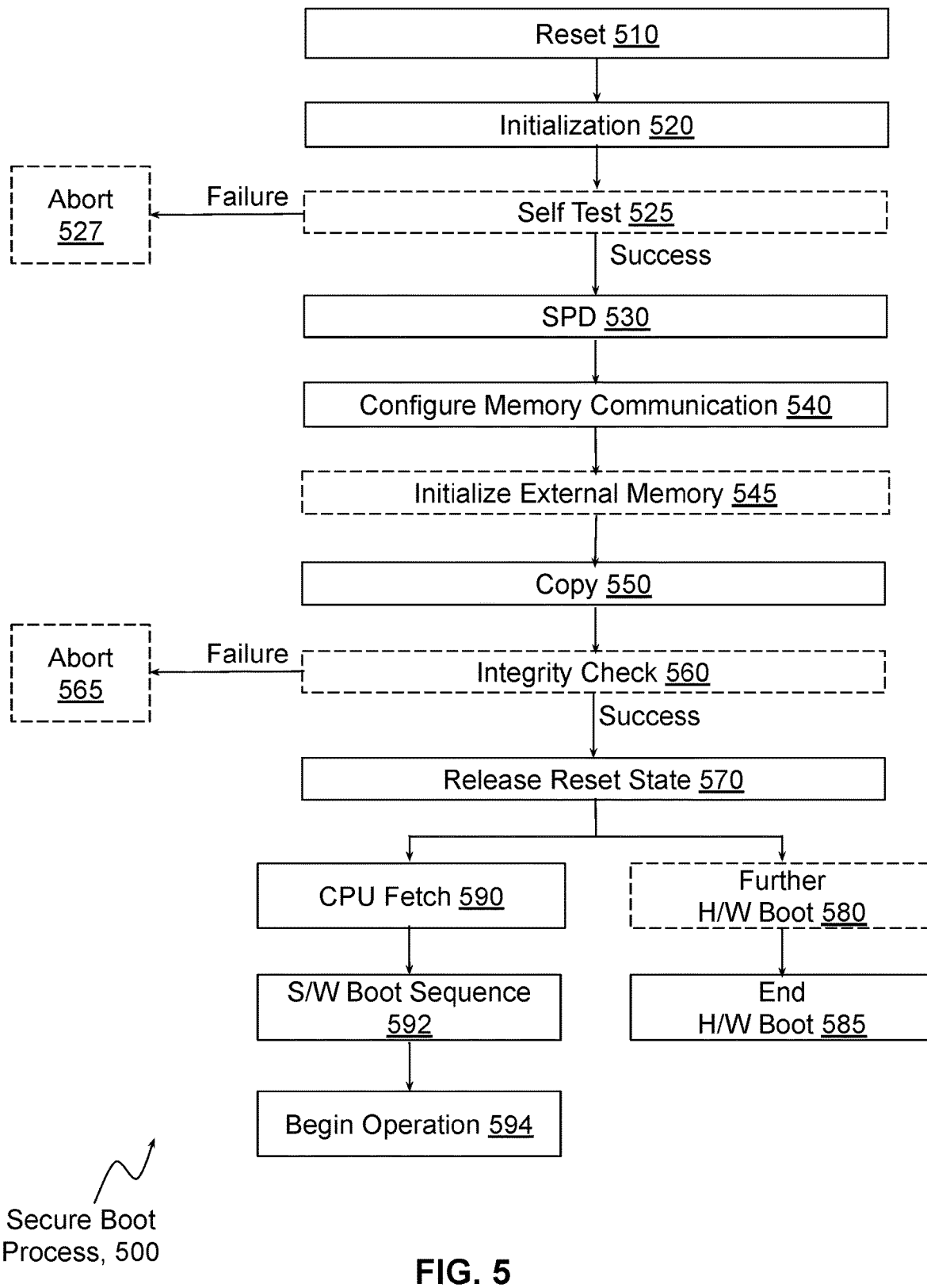
FIG. 5 illustrates an example of selected details of a Secure Boot Process.

In various embodiments, as explained above for SBC 400, the SBL is enabled to securely boot itself to execute known-good executable code, and then to securely boot CPU(s) 1306 to execute known-good system code. For example, the SBL is enabled to hold CPU(s) 1306 (and selectively other parts of System 1348) in a reset state (e.g., via CPU Reset 1346) during boot of the SBL so that known-good system boot code is made available before CPU(s) 1306 begin executing instructions. In some embodiments, when System 1348 is reset (e.g., via System Reset 1342), the SBL is reset and one or more CPU(s) 106 of the SBL are securely booted using techniques such as Secure Boot Process 500 as illustrated in FIG. 5. In various embodiments, CPU(s) 106 are enabled to execute known-good executable code from the SBL memory. The known-good executable code is copied from the boot flash chip to the SBL memory as part of securely booting CPU(s) 106. According to various embodiments, CPU(s) 106 perform one or more of: assisting the booting of CPU(s) 1306; updating of executable code stored in the boot flash chip, such as with Update Process 1050 or Executable Code Update Process 1200; board management functions, such as functions of Board Management Controller 1396; I/O enumeration and/or validation for System 1348; security functions for System 1348, such as described for IOPC 300; other functions to support System 1348; and a combination of the foregoing. In embodiments where the SBL includes functions of the Board Management Controller 1396, securely booting CPU(s) 106 enables the functions of the Board Management Controller 1396 to use known-good executable code from the SBL memory, thus ensuring that the executable code for these functions is protected from a combination of physical attacks and viruses or malware.

In various embodiments, the known-good executable code in the boot flash chip includes the known-good system boot code for System 1348. In further embodiments where the known-good executable code includes the known-good system boot code, copying the known-good executable code from the boot flash chip to the SBL memory leaves a copy of the known-good system boot code in the SBL memory. In yet further embodiments, one or more sections of the boot flash chip include the known-good system boot code, and the known-good system boot code is enabled to be updated (such as with Update Process 1050 or Executable Code Update Process 1200) similar to other sections of the boot flash chip.

In other embodiments the known-good system boot code is copied to the SBL memory under control of CPU(s) 106 subsequent to the secure booting of CPU(s) 106. In a first example, the known-good system boot code is stored in the boot flash chip in a location not used as part of securely booting CPU(s) 106. In a second example, a separate one or more non-volatile memory chips accessible to the SBL (and optionally and/or selectively not accessible to CPU(s) 1306) are used to store the known-good system boot code. According to various of these other embodiments, the copy of the known-good system to the SBL memory is one or more of: controlled by CPU(s) 106; performed by CPU(s) 106; performed by a DMA engine under control of CPU(s) 106; other techniques for copying data from a first memory to a second memory; and a combination of the foregoing. According to various of these other embodiments, updating of the known-good system boot code is one or more of: performed similarly to updating of the known-good executable code; performed cooperatively between the known-good system boot code executing on CPU(s) 1306 and known-good executable code executing on CPU(s) 106; performed, at least in part, using immutable hardware of the SBL; other techniques for updating code stored in a non-volatile memory; and a combination of the foregoing.

In various embodiments, the SBL is enabled to control and/or influence an address map, such as an I/O address map, so that the known-good system boot code appears to CPU(s) 1306 in an expected place, such as by appearing where a boot ROM is expected.

According to various embodiments, the known-good system boot code includes one or more of: a bootloader; firmware, such as UEFI; an operating system kernel; an operating system; a hypervisor; a virtual machine manager; DLLs and other libraries; device drivers; application code; updates or patches to any of the preceding; other code used in an application of System 1348; and a combination of the foregoing.

In some embodiments, the known-good system boot code includes only some of the executable code used by System 1348. In a first example, one or more applications are enabled to be loaded as needed, such as from I/O devices (e.g., hard disks or solid-state disks). In a second example, the known-good system boot code does not include an operating system, and System 1348 uses other techniques to load the operating system. According to various embodiments, the other techniques used to load the operating system include one or more of: loading the operating system as needed, such as from I/O devices (e.g., hard disks or solid-state disks); loading the operating system using functions of a TPM for security; the SBL intercepting commands to load some or all of the operating system, such as I/O read commands, and supplying the requested data from a memory accessible to and/or coupled to the SBL; other techniques for loading executable code; and a combination of the foregoing. For example, the SBL is enabled to intercept disk read commands, such as Serial Advanced Technology Attachment (SATA), Non-Volatile Memory Express (NVMe), or other storage protocol commands, and provide the requested data from a source accessible to the SBL, such as an attached flash chip or solid-state disk, that is optionally and/or selectively not accessible to CPU(s) 1306.

In some embodiments, the SBL has access to some or all of the I/O of System 1348, for example by serving as a pass-through for some or all of External I/O Interface(s) 1382 to External I/O Interface(s) 1380 (such as Secure Boot Logic 1300), or by intercepting the I/O at a higher-level (e.g., by acting as a bridge on a PCIe bus) via integration within Southbridge 1390 (such as Secure Boot Logic 1300') or within Northbridge 1392 (such as Secure Boot Logic 1300"). In embodiments such as these, the SBL is enabled to perform at least some features of IOPC 300 and to act as a firewall (or similar traffic filter/monitor) for I/O into and/or out of System 1348. For example, in some embodiments, the SBL is enabled to monitor and/or filter some or all of the network traffic to and/or from System 1348. In further embodiments, the SBL is enabled, via control of and/or interception of enumeration of I/O devices coupled to System 1348, to perform operations such as: verifying a type and/or configuration of the I/O devices coupled to System 1348; controlling mapping of the I/O devices coupled to System 1348 into an I/O address map of System 1348; and hiding a presence of a particular one or more of the I/O devices coupled to System 1348 so that the particular one or more of the I/O devices are accessible to the SBL but are optionally and/or selectively not accessible to CPU(s) 1306.

In various embodiments, the SBL has access to some or all of the traffic between CPU(s) 1306 and higher-speed interfaces, such as External Memory Interface 1352 connecting to External Memory 1372, and/or Hi-Speed Interface 1354. In embodiments such as these, the SBL is enabled to perform at least some features of IOPC 300 and to act as a firewall (or similar traffic filter/monitor) for traffic on these interfaces instead of or in addition to traffic on some or all of External I/O Interface(s) 1382.

In embodiments where the SBL includes functions of SBC 400 to provide known-good system boot code for CPU(s) 1306, the SBL is enabled to replace a Trusted Platform Module (TPM) and there is no need for a Core Root of Trust Module (CRTM). In some embodiments, such as embodiments where the known-good system boot code does not rely on presence of a TPM, System 1348 is securely booted using the SBL. In other embodiments, such as embodiments where the known-good system boot code assumes presence of a TPM, the SBL is enabled to implement functions of the TPM, such as by implementing the Platform Configuration Registers (PCRs). This, for example, enables compatibility with operating systems that assume the presence of a TPM, and optionally allows the known-good system boot code to not include the operating system (which is loaded using other techniques, such as from I/O devices (e.g., hard disks or solid-state disks).

In embodiments where the SBL includes key management and/or cryptographic functions, such as by including a KMU and a CE, the SBL is able to function as a Root of Trust (e.g., a secure enclave). In further embodiments where the SBL (or a chip containing the SBL) is made tamper-resistant and/or tamper-proof, the SBL is enabled to replace a Hardware Security Module (HSM). As explained in the present disclosure, the SBL (using the KMU and the CE) is enabled to store cryptographic keys, generate additional cryptographic keys, and/or perform cryptographic operations for CPU(s) 106. In embodiments where the SBL performs functions of a Root of Trust or of an HSM, the SBL is similarly enabled to store cryptographic keys, generate additional cryptographic keys, and/or perform cryptographic operations for CPU(s) 1306. In further embodiments, the SBL maintains keys usable by CPU(s) 106 separate from cryptographic keys usable by CPU(s) 1306, so that, for example, CPU(s) 1306 are unable to use the cryptographic keys that are usable by CPU(s) 106. In some embodiments, one or more cryptographic keys are generated at a manufacturing time of the SBL (and are stored in Keys 114) for use by CPU(s) 1306.

In embodiments where the SBL performs functions of a TPM and/or an HSM, the SBL is enabled to perform as a Root of Trust (RoT) in the manner in which a TPM and/or an HSM would.

Secure Boot

According to various embodiments, secure boot is able to be performed on one or more of: processing chip 100; IoTC 200; IOPC 300; SBC 400; and other processing chips that have been configured via a manufacturing-time procedure including a manufacturing-time KMU key-creation process that creates the KMU initial keys (on-chip keys that are never accessible by one or more run-time programmable CPUs in the processing chip) and, in some embodiments, associates a boot flash chip with the processing chip by storing executable boot code in the boot flash chip that is decryptable with one of the KMU initial keys.

A Secure Boot Process as described in the present disclosure refers to a process of controlling a processing chip from a time at which it is reset until executable code stored in non-volatile memory has been securely loaded (e.g., to an external DRAM) and is able to be executed by one or more run-time programmable CPUs. The Secure Boot Process includes, in some embodiments, the H/W boot sequence described above. Of course, an overall boot process does not stop as soon as any of the executable code is executed, as there is a S/W part of the overall boot process (the S/W boot sequence described above) that performs higher-level initializations, such as enumerating and initializing I/O devices. The S/W boot sequence is generally application-dependent and is not discussed in detail. The Secure Boot Process described in the present disclosure is generally agnostic to a nature of the executable code securely provided to the S/W boot sequence. For example, the Secure Boot Process is able to deliver an entire software environment, such as firmware (e.g., UEFI code), drivers, an operating system, and one or more applications, enabling production of stand-alone, fully-secure devices.

According to various embodiments, a Secure Boot Process performs one or more of the following operations: initialization of on-chip hardware; optionally and/or selectively a self-test process; discovery of at least some external memory chips, such as with a Serial Presence Detect (SPD) operation; configuration and enablement of communication between the processing chip and at least some of the discovered external memory chips, for example training of high-speed memory interfaces, such as DDR4 DRAM interfaces; optionally and/or selectively initializing zero or more of the discovered external memory chips; copying contents of a boot flash chip (such as a SPI flash chip) to an external memory (such as a DRAM), optionally and/or selectively including integrity checks or other operations; holding one or more CPUs in a reset state until a H/W boot sequence portion of the Secure Boot Process reaches a particular point; enabling at least one of the CPUs to access the external memory via a path that decrypts data read from the external memory, such as with one of the KMU initial keys (e.g., the default key); and other operations generally performed during boot. In further embodiments, one or more of these operations are performed in immutable hardware, such as part of the H/W boot sequence.

FIG. 5 illustrates an example of selected details of Secure Boot Process 500. Various embodiments of Secure Boot Process 500 use other operations that are not illustrated in FIG. 5, such as for implementation-specific initializations or other boot-time procedures. In some embodiments, one or more operations of Secure Boot Process 500 are optionally and/or selectively controlled by one or more of: a state in an on-chip ROM; a value on an external pin; a type of reset received in Reset 510; and other similar factors. Such control includes enabling or disabling, in whole or in part, individual ones of the operations, and/or controlling a manner in which a particular one of the operations is performed. Of course, permitting an operation of Secure Boot Process 500 that is used to securely boot the processing chip to be disabled should not be configurable for normal operations, but is performed in some testing operations, such as at manufacturing time.

While at least some operations of Secure Boot Process 500 are illustrated as being sequential and in a particular order, in various embodiments at least some of the operations are performed, in whole or in part in parallel, at least partially overlapped in time, in other orders, and/or skipped entirely. In a first example, depending on a type of memory chip on a particular one of the external memory interfaces, operations SPD 530 and Configure Memory Communication 540 are performed in an opposite order from what is illustrated in FIG. 5, or substantially in parallel, or at least partially overlapped in time. In a second example, a processing chip is able to communicate with predetermined types and/or configurations and/or numbers of memory chips without initially having to determine their configuration, and SPD 530 is skipped.

According to various embodiments, Secure Boot Process 500 begins at Reset 510, with the processing chip having been reset, such as at power-on or by a restart (e.g., a reboot when already powered on). As explained above, in typical implementations, a chip is reset when a reset signal is asserted, and de-assertion of the reset signal enables the chip to begin operation. According to various embodiments, the reset signal is one or more of: a power-on reset; a restart reset; provided by an external pin; generated and/or filtered (such as to remove glitches) in the processing chip; provided by a power supply; provided by a voltage regulator and/or monitor; de-asserted when a voltage crosses a threshold; other known ways of providing, generating, filtering, asserting, or de-asserting a reset signal; and a combination of the foregoing. In further embodiments, a reset condition (preventing the H/W boot sequence from starting) is held asserted in the processing chip until one or more processing-chip-internal conditions are satisfied, such as one or more of: meeting a minimum reset-assertion time; waiting for a Phase-Locked Loop (PLL) to achieve lock so that on-chip clocks are stable; other typical reset activities; and a combination of the foregoing.

In some embodiments, during Reset 510, hardware state of the processing chip is initialized, such as flip-flops being set to a default state. In further embodiments, the initialization of the hardware state depends on a type of reset. For example, a power-on reset initializes the hardware state in a fixed way, while a restart reset leaves some of the hardware state at its last value and/or initializes some of the hardware state in a different way than a power-on reset.

Secure Boot Process 500 continues with Initialization 520. In some embodiments, Initialization 520 is not necessary as Reset 510 has performed initialization of the hardware state. In other embodiments, Initialization 520 performs further hardware initializations, such as initializations using a sequence of operations. In a first example, an on-chip memory is initialized, such as by one or more of: enabling use of redundant rows or columns in place of defective rows or columns; writing known values to the memory; other memory initialization techniques; and a combination of the foregoing. In a second example, a Finite State Machine (FSM) executes one or more initial states until it is blocked awaiting some event, such as start or completion of some other one or more parts of the H/W boot sequence (e.g., another FSM or a microcontroller reaching a particular state). In a third example, a memory controller in the UMC that is connected to a particular one of the external memory interfaces performs some initial handshaking with one or more external memory chips on the particular external memory interface. In a fourth example, an on-chip ROM is copied to an on-chip SRAM, which is then used instead of the on-chip ROM to provide higher performance during the H/W boot sequence.

In some embodiments, Secure Boot Process 500 optionally and/or selectively performs Self Test 525. According to various embodiments, Self Test 525 includes one or more of: operation of Built-In Self Test (BIST) circuitry; consistency and/or integrity checks on internal devices and/or internal storage, such as a CRC check performed on an on-chip ROM; other integrated circuit testing techniques; and a combination of the foregoing. In some embodiments, if Self Test 525 succeeds, Secure Boot Process 500 proceeds to SPD 530. In other embodiments, Reset 510 and/or Initialization 520 are performed after a successful Self Test 525 (and Self Test 525 is then skipped on the subsequent flow through Secure Boot Process 500). If Self Test 525 fails, Secure Boot Process 500 is aborted (Abort 527). According to various embodiments, aborting Secure Boot Process 500 at this stage performs one or more of: halting further operation of the processing chip until a subsequent reset is received; retrying Secure Boot Process 500 (including retrying Self Test 525) by internally generating a reset and starting over at Reset 510; providing external outputs, such as used to drive external indicators (e.g., LEDs), to indicate a failure; other known techniques for indicating a failure of a boot process; and a combination of the foregoing.

Secure Boot Process 500 continues with SPD 530. SPD 530 performs a Serial Presence Detect (SPD) operation on SPD-enabled ones of the external memory interfaces. SPD 530 produces respective results for one or more of the SPD-enabled external memory interfaces, where the results include the types and/or configurations and/or numbers of memory chips attached to the one or more of the SPD-enabled external memory interfaces. According to various embodiments, the SPD-enabled external memory interfaces are one or more of: the external memory interfaces; ones of the external memory interfaces where a boot flash chip and one or more DRAM chips are attachable; at least ones of the external memory interfaces where a boot flash chip and one or more DRAM chips are attachable; exactly two of the external memory interfaces, one where a boot flash chip is attachable and one where one or more DRAM chips are attachable; determined optionally and/or selectively according to state in an on-chip ROM; a subset of the external memory interfaces that are optionally and/or selectively configured to be used during the H/W boot sequence; and other subsets of the external memory interfaces including an external memory interface for a boot flash chip and an external memory interface for one or more DRAM chips. In some embodiments, one or more of the external memory interfaces support more than one type of memory chip, and optionally and/or selectively more than one type of SPD operation is performed on those external memory interfaces. In some embodiments, a particular one of the external memory interfaces is restricted to supporting one type (or a limited number of related types) of memory chips, and the SPD operation on the particular external memory interface is restricted to a corresponding type of SPD.

In addition to and/or instead of one or more of the SPD-enabled external memory interfaces, in some embodiments, one or more of the external memory interfaces (including ones of the external memory interfaces where the boot flash chip and/or DRAM chips are attachable) are predetermined to support attachment of particular types and/or configurations and/or numbers of memory chips such that it is not necessary to use an SPD operation to determine the SPD results. These predetermined external memory interfaces have predetermined results (similar to the respective results that an SPD operation produces on an SPD-enabled external memory interface) that are part of the processing chip (such as part of the circuitry of the processing chip and/or in an on-chip ROM). In various embodiments, an SPD operation is performed even on the predetermined external memory interfaces in order to confirm presence of expected types and/or configurations and/or numbers of memory chips.

In further embodiments, a failure to find one or more required memory chips causes Secure Boot Process 500 to be aborted (similar to Abort 527 or Abort 565, but not illustrated in FIG. 5). In a first example, if a boot flash chip is not found (or is not found on an expected one of the external memory interfaces), Secure Boot Process 500 is aborted. In a second example, if one or more DRAM chips are not found, or are not found on an expected one or ones of the external memory interfaces, or are not of a required capacity or configuration, Secure Boot Process 500 is aborted.

Secure Boot Process 500 continues with Configure Memory Communication 540, which configures at least some of the external memory interfaces and the memory chips attached to those external memory interfaces for operation. In some embodiments, Configure Memory Communication 540 uses results of SPD 530 and/or the predetermined results for the predetermined external memory interfaces to provide information used to enable communication with the attached external memory chips, and/or to perform other external-memory-related configuration of the processing chip. According to various embodiments, Configure Memory Communication 540 performs one or more of the following: training of the SPD-enabled and/or the predetermined external memory interfaces, such as DDR ones of these interfaces; configuring operation of the attached memory chips; configuring a memory controller coupled to one of the SPD-enabled or the predetermined external memory interfaces to communicate with the memory chips attached on that external memory interface; generating and/or configuring an address map supporting addressing of one or more of the attached memory chips; other processing chip and/or memory chip configuration to enable communication between the processing chip and the attached memory chips; and a combination of the foregoing. In some embodiments, one or more of the foregoing are dependent on factors such as a type and/or a configuration and/or numbers of particular ones of the attached memory chips. In further embodiments, a failure to configure communication with one or more memory chips, such as the boot flash chip and/or one or more DRAM chips, causes Secure Boot Process 500 to be aborted (similar to Abort 527 or Abort 565, but not illustrated in FIG. 5). In yet further embodiments, a failure to configure communication with one of multiple DRAM chips does not cause Secure Boot Process 500 to be aborted as long as remaining ones of the DRAM chips are able to provide a sufficient capacity for the H/W boot sequence.

In some embodiments, Secure Boot Process 500 optionally and/or selectively performs Initialize External Memory 545. In various embodiments, Initialize External Memory 545 is optionally and/or selectively performed on one or more of the SPD-enabled and/or predetermined external memory interfaces. In further embodiments, Initialize External Memory 545 is not performed on a one of the external memory interfaces to which the boot flash chip is attached. In various embodiments, Initialize External Memory 545, for a given one of the external memory interfaces on which it is performed, writes a predetermined pattern, such as an all-zero pattern, an all-one pattern, an address-in-data pattern, or other types of memory patterns to one or more of the memory chips attached to the given one of the external memory interface. In further embodiments, Initialize External Memory 545 performs a memory test on at least some of the one or more of the memory chips, such as by reading back and verifying a pattern that was written, and optionally and/or selectively repeating this with multiple, different patterns. In some embodiments, if Initialize External Memory 545 performs the memory test and is unsuccessful, Secure Boot Process 500 is aborted (similar to Abort 527 or Abort 565, but not illustrated in FIG. 5). In other embodiments, a decision on whether or not to abort Secure Boot Process 500 is according to whether a memory chip that has failed memory test is used for a remainder of Secure Boot Process 500. For example, if a single DRAM chip of multiple DRAM chips fails a memory test but remaining ones of the DRAM chips have a sufficient capacity for the H/W boot sequence, the failing DRAM chip is not included in a generated address map, status information is left for software (such as in a status register), and Secure Boot Process 500 continues.

Secure Boot Process 500 continues with Copy 550. According to various embodiments, Copy 550 performs one or more of the following: using metadata to control, at least in part, operation of Copy 550 (as described above); reading some or all of contents of the boot flash chip; writing the some or all of the contents to external DRAM unchanged; writing the some or all of the contents except for some or all metadata in the contents, to external DRAM unchanged; decrypting and optionally and/or selectively re-encrypting data of the some or all of the contents (optionally and/or selectively excluding some or all of the metadata in the contents) between reading the data and writing the data; and a combination of the foregoing. In some embodiments, Copy 550 also caches a portion of the some or all of the contents of the boot flash chip in a cache, such as an L3 cache, of the UMC. In further embodiments, the portion in the cache is optionally and/or selectively decrypted. This advantageously provides faster access at a boot time of the processing chip to the portion of the some or all of the contents of the boot flash chip. According to various embodiments, the portion is specified according to one or more of: a fixed, initial part of the some or all of contents of the boot flash chip; an initial part of the some or all of contents of the boot flash chip until the cache has been filled; one or more parts of the some or all of contents of the boot flash chip as specified in the metadata; other techniques for specifying a part of the some or all of contents of the boot flash chip; and a combination of the foregoing. In further embodiments, Copy 550 continues as a background operation (enabling other parts of Secure Boot Process 500 to begin) once a sufficient amount of the contents of the boot flash chip have been copied to external DRAM.

In various embodiments in which the boot flash chip contains more than one image, such as a dual-image, Copy 550 performs a copy of contents of the boot flash chip including a current image and optionally and/or selectively a previous image. An address map, such as the address map generated and/or configured as part of Configure Memory Communication 540, is generated and/or configured so that the copy (in external DRAM) of the current image is accessible to one or more run-time programmable CPUs in the processing chip that are being securely booted, but the portion of external DRAM enabled to hold the copy of the previous image is not accessible to the one or more run-time programmable CPUs. In further embodiments, the portion of external DRAM enabled to hold the copy of the previous image is accessible to immutable hardware of the processing chip, and is enabled to hold an update to the contents of the boot flash chip, such as for Update Process 1050.

In some embodiments, Secure Boot Process 500 optionally and/or selectively performs Integrity Check 560. According to various embodiments, Integrity Check 560 is performed before, as part of, or after Copy 550. Integrity check 560 uses one or more integrity check values that are part of the metadata that is in or is associated with the some or all of the contents read by Copy 550. The one or more integrity check values are used to determine if the some or all of the contents have been corrupted. In various embodiments, a given one of the integrity check values is a digital signature, such as a CRC or a hash, computed on the some or all of the contents (other than the given integrity check value itself), optionally and/or selectively either before or after the some or all of the contents are encrypted. If a recomputed one of the integrity check values matches a stored (as part of the metadata) version of that integrity check value, then the some or all of the contents (with a high probability depending on a size of the recomputed integrity check value) have not been corrupted.

If Integrity Check 560 succeeds, Secure Boot Process 500 proceeds to Release Reset State 570. If Integrity Check 560 fails, then Secure Boot Process 500 is aborted (Abort 565). According to various embodiments, aborting Secure Boot Process 500 at this stage performs one or more of: halting further operation of the processing chip until a subsequent reset is received; retrying Secure Boot Process 500 (including retrying Integrity Check 560) by internally generating a reset and starting over at Reset 510; providing external outputs, such as used to drive external indicators (e.g., LEDs), to indicate a failure; other known techniques for indicating a failure of a boot process; and a combination of the foregoing. In a first example, Integrity Check 560 is performed prior to Copy 550 by reading the some or all of the contents directly from the boot flash chip and using Integrity Check 560 to verify that the some or all of the contents as stored in the boot flash chip are not corrupted. In a second example, Integrity Check 560 is performed during and/or substantially in parallel with Copy 550 by using Integrity Check 560 to verify that the some or all of the contents as read from the boot flash chip by Copy 550 are not corrupted. In a third example, Integrity Check 560 is performed after Copy 550 by reading the some or all of the contents as stored in external DRAM and using Integrity Check 560 to verify that a copy in the external DRAM is not corrupted. Of course, various embodiments perform zero or more of these examples. In some embodiments and/or usage scenarios, greater isolation of a source of corruption is determined if Integrity Check 560 is performed more than once and using data from multiple sources.

Secure Boot Process 500 continues with Release Reset State 570. As part of Release Reset State 570, in various embodiments, hardware of the processing chip is configured (if that is not already performed as part of an earlier operation, such as Initialization 520) so that one or more run-time programmable CPUs in the processing chip are enabled to access at least some of the configured external memory chips, including at least the ones of the external memory chips having the copy of the some or all of the contents of the boot flash chip. In further embodiments, at least a portion of data in external DRAM copied from (encrypted) contents of the boot flash chip is enabled to be decrypted by hardware (such as CE 110) prior to being returned to any of the run-time programmable CPUs. In yet further embodiments, the decryption uses a key (such as the default key) in KMU 112 from Keys 114. Once Secure Boot Process 500 has reached Release Reset State 570 and hardware used for the one or more run-time programmable CPUs to operate securely and properly is configured, Release Reset State 570 removes the reset state from at least one of the run-time programmable CPUs, thus enabling that run-time programmable CPU to complete its first instruction fetch (starting the S/W portion of Secure Boot Process 500 at CPU Fetch 590).

In some embodiments, a hardware portion (such as a H/W boot sequence) of Secure Boot Process 500 ends after Release Reset State 570 (at End H/W Boot 585). In other embodiments, the hardware portion of Secure Boot Process 500 continues with Further H/W Boot 580 before ending at End H/W Boot 585, while in whole or in part in parallel a S/W portion of Secure Boot Process 500 commences with CPU Fetch 590. For example, in various embodiments, the S/W portion of Secure Boot Process 500 commences after an initial section of the boot flash chip has been copied by Copy 550 but prior to when other sections of the boot flash chip have been copied.

While not illustrated in FIG. 5, in some embodiments, portions of Further H/W Boot 580 and S/W Boot Sequence 592 intercommunicate and/or have dependencies on each other. In one example, at least a portion of Initialize External Memory 545 optionally and/or selectively continues as a background operation, such as once a sufficient amount of external DRAM has been initialized, and operates on ones of the external memory interfaces (and/or portions of particular ones of the external memory chips) not otherwise used in the H/W boot sequence. Continuing the example, software is interlocked (such as by delaying a response to an access attempt) from using ones of the external memories (or the portions of the particular memory chips) that are still being used by Initialize External Memory 545.

The S/W portion of Secure Boot Process 500 begins with CPU Fetch 590. In CPU Fetch 590, a particular one of the run-time programmable CPUs is able to complete an initial instruction fetch (and then continue its execution) by accessing an address in external DRAM (optionally and/or selectively using an address map generated by UMC 104 as part of Configure Memory Communication 540). Hardware of the processing chip is configured (as part of or prior to Release Reset State 570) so that the initial instruction fetch is enabled (such as by a combination of the particular CPU using a known address for its initial instruction fetch and the address map associating that address with a particular one of the external memory chips) to return desired initial executable code copied from the boot flash chip.

The S/W portion of Secure Boot Process 500 continues with S/W Boot Sequence 592, such as the S/W boot sequence described above. S/W Boot Sequence 592 performs operations dependent on executable code in the some or all of the contents of the boot flash chip copied into external DRAM as part of Copy 550. In a first example, in some embodiments, the executable code includes firmware, such as UEFI firmware, and the firmware, among other tasks, discovers and initializes one or more I/O devices connected to external I/O interface(s) 180. In a second example, in some embodiments, the executable code includes an operating system which initializes itself to a point where applications are runnable.

The S/W portion of Secure Boot Process 500 ends when S/W Boot Sequence 592 completes and the processing chip is able to begin operational use (Begin Operation 594).

FIG. 6 illustrates an example of selected details of contents of a flash chip usable with a processing chip, such as for a boot flash chip. Flash chip 600 is illustrated as having multiple sections: Section 1 610, Section 2 620, . . . , and Section n, 670. In some embodiments, Flash chip 600 has just a single section, such as a section including executable code used by the S/W boot sequence of the processing chip. In other embodiments, Flash chip 600 has two or more sections: one section for executable code used by the S/W boot sequence of the processing chip, and one or more other sections for further executable code used by the S/W boot sequence, other code such as application code, and/or other data. In various embodiments and/or usage scenarios, the multiple sections do not fill Flash chip 600 and there is an unused portion (Unused 690).

As illustrated in FIG. 6, each of the sections includes a respective metadata portion (Metadata 612, Metadata 622, and Metadata 672), and a respective data portion (Data 616, Data 626, and Data 676). The metadata portions contain metadata as described above. Each of the data portions contains executable code used by the S/W boot sequence of the processing chip, other code such as application code, and/or other data. In some embodiments and/or usage scenarios where only Section 1 610 is used, Metadata 612 is omitted or is empty. While the respective metadata portions are illustrated as being prior to the corresponding respective data portions, in various embodiments a given one of the respective metadata portions is in whole or in part prior to, intermixed with, or after the corresponding respective data portion.

Pointers 680 represent portions of the metadata of each of the sections used to link the sections together. In a first example, the respective metadata portion of each of one or more of the sections includes a pointer to a start of a next one of the sections. The pointer for Section n 670 (not illustrated in FIG. 6) is null, for example all zero, indicating that there is no next section. In a second example, the respective metadata portion of each of one or more of the sections includes a respective length in bytes of the section and a respective bit indicating, if set, that there is a next section. For a given one of the sections, if the respective bit is set, a next one of the sections starts a number of bytes specified by the respective length of the given section after a start of the given section.

Manufacturing-Time Procedure

According to various embodiments, a manufacturing-time procedure is performed on one or more of: processing chip 100; IoTC 200; IOPC 300; SBC 400; and other processing chips including units such as CE 110, KMU 112 (including Keys 114), and an external memory interface for a boot flash chip (such as one of external memory interfaces 150 via UMC 104).

In some embodiments, a manufacturing-time procedure is used to configure a processing chip so that, subsequent to the manufacturing-time procedure, the processing chip stores one or more keys created during the manufacturing-time procedure that are unique to the processing chip, and the processing chip is able to securely boot for an operational use (e.g., as an IoT device) by using one of the keys to decrypt contents of a flash chip, such as a boot flash chip containing encrypted executable code. As explained above, 'manufacturing-time' is not restricted to a chip-level (that is, an integrated circuit) manufacturing time, and according to various embodiments, parts of the manufacturing-time procedure for a processing chip are performed at one or more of: a chip-level manufacturing time; a system-level manufacturing time (for example, after the processing chip is assembled onto a circuit board with other components); a time prior to an initial operational use of the processing chip; and a combination of the foregoing. In some usages, chip-level manufacturing has two phases: die-level manufacturing (fabricating and testing the chip at an integrated circuit die level) and package-level (assembling the tested integrated circuit die into some type of package and performing further testing). For example, in some embodiments and/or usage scenarios, a portion of Procedure 790, such as a portion relating to writing code to the boot flash chip, is performed once at the chip-level manufacturing time in order to write low-level executable code (e.g., a bootloader and/or a kernel) to the boot flash chip, and is performed again at the system-level manufacturing time in order to write high-level executable code (e.g., applications) to the boot flash chip.

Figure 7:
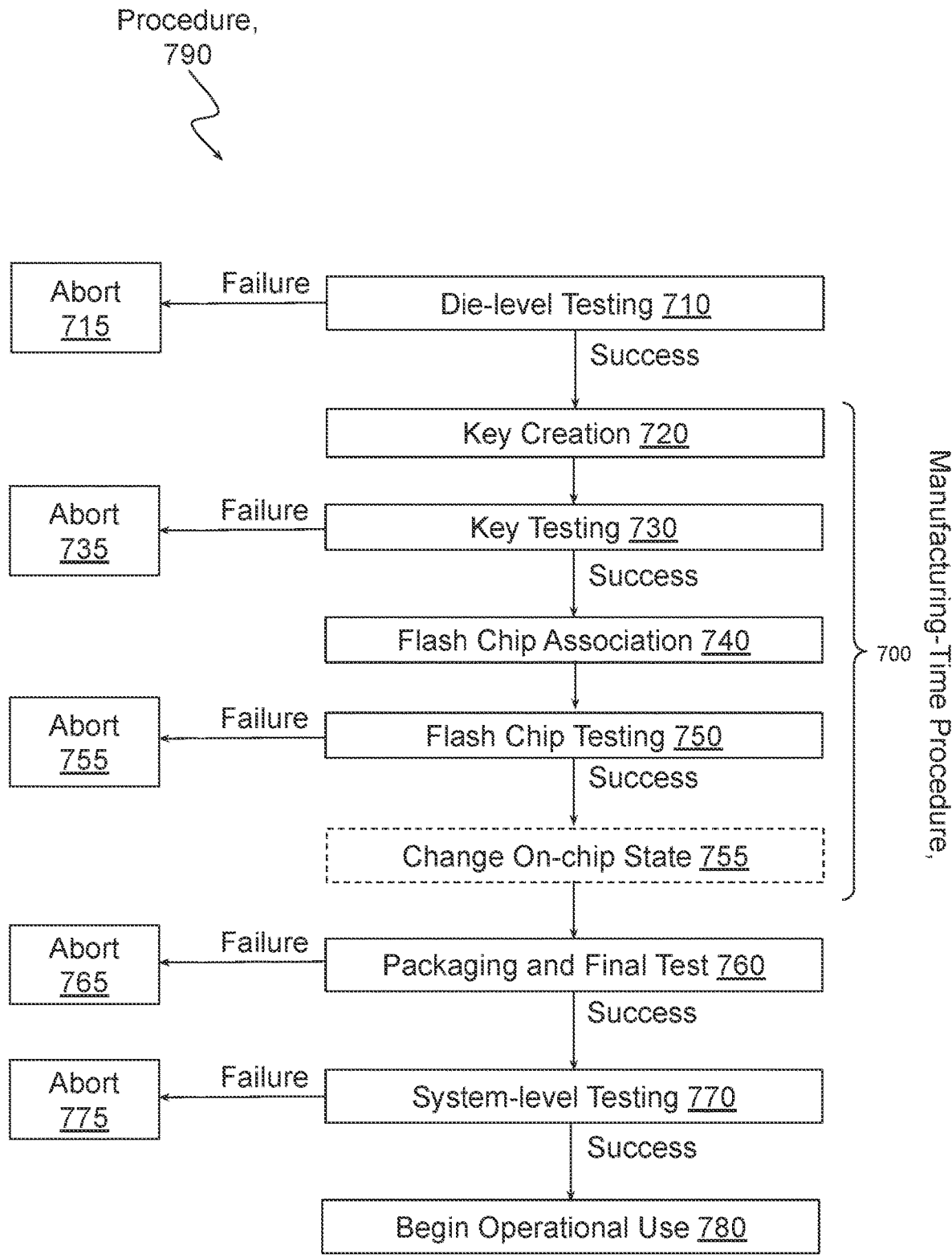
FIG. 7 illustrates examples of selected details of a procedure including a manufacturing-time procedure.

FIG. 7 illustrates examples of selected details of a procedure including a manufacturing-time procedure. Various embodiments of Procedure 790 use other operations that are not illustrated in FIG. 7, such as for implementation-specific, chip-level-specific (e.g., specific to an integrated circuit manufacturing process or specific to integrated circuit packaging and/or testing), system-level-specific (e.g., related to system-level manufacturing and/or testing), or other operations performed with or on integrated circuits.

While at least some operations of Procedure 790 are illustrated as being sequential and in a particular order, in various embodiments at least some of the operations are performed, in whole or in part in parallel, at least partially overlapped in time, in other orders, and/or skipped entirely. Generally, Die-level Testing 710 is an initial operation of Procedure 790, System-level Testing 770 is a final operation, and Manufacturing-Time Procedure 700 is begun after Die-level Testing 710 is begun and ends prior to when System-level Testing 770 ends. In a first example, Packaging and Final Test 760 is performed part-way through Manufacturing-Time Procedure 700, such as after Key Testing 730. In a second example, Packaging and Final Test 760 and System-level Testing 770 are combined into a single operation, such as for a highly-integrated system-in-a-package. In a third example, More Sections? 970 is omitted from embodiments where the flash chip is known to just have a single section of contents.

Procedure 790 includes operations such as Die-level Testing 710 illustrated as being prior to Manufacturing-Time Procedure 700 and Packaging and Final Test 760 illustrated as being after Manufacturing-Time Procedure 700. Operations such as these represent portions of Procedure 790 that are typically performed for an integrated circuit die. Various of the typical operations determine a success or a failure condition. For example, if Die-level Testing 710 is not successful, the integrated circuit die is, in some embodiments deemed defective and further operations of Procedure 790 are aborted (Abort 715). Similarly, if the integrated circuit die fails further testing after it is packaged (Packaging and Final Test 760), Procedure 790 is similarly aborted (Abort 765). And, if the packaged integrated circuit die is assembled into a system and the system fails testing (System-level Testing 770), Procedure 790 is similarly aborted (Abort 775). Of course, one or more of these abort operations (and also Abort 735 and Abort 755) perform, in various embodiments, some remedial action (such as repairing part of an integrated circuit die and/or a package and/or a system) which, in further embodiments, enables repetition of some or all of Procedure 790.

In some embodiments, a processing chip is fabricated as an integrated circuit die, and the integrated circuit die has default settings of on-chip state that enable operation of Manufacturing-Time Procedure 700. For example, in various embodiments, decryption of data read from one of external memory interfaces 150 that is used for the boot flash chip is disabled in the as-fabricated processing chip until it is later enabled (such as by changing state in an on-chip ROM) during Manufacturing-Time Procedure 700.

Die-level Testing 710 performs post-fabrication testing of an integrated circuit die. In some manufacturing processes, some die-level testing is performed at a wafer level (before the wafer is diced into separate die). After a wafer is diced, die-level testing generally places a die to be tested in a test jig called a Device Under Test (DUT) board (or sometimes, a Probecard Interface Board). This test jig allows a testing device (a tester) to access some or all of the I/O pins of the integrated circuit and, under control of a test program running or executing on the tester, perform various tests to ensure that the integrated circuit die was correctly fabricated. In various embodiments, one or more parts of Manufacturing-Time Procedure 700 are performed in this manner on a tester, or in a similar testing environment having control of some or all of the I/O pins of a processing chip.

Packaging and Final Test 760 is generally performed after testing of the integrated circuit die is complete. The integrated circuit die is put in a package, and then further testing is performed to ensure that the packaged integrated circuit die is still functional. Packaging and Final Test 760 sometimes uses another type of DUT board and is able to repeat some or all of the testing performed as part of Die-level Testing 710. In various embodiments, one or more parts of Manufacturing-Time Procedure 700 are performed during Packaging and Final Test 760 as part of package-level testing.

System-level Testing 770 is generally performed after a packaged integrated circuit has been assembled into a system. Generally, System-level Testing 770 does not have the same capabilities for testing the packaged integrated circuit die as Packaging and Final Test 760 due to lack of direct access to all I/O pins of the integrated circuit die. In some embodiments and/or usage scenarios, System-level Testing 770 uses special test connectors, test fixtures, or test probes to provide additional access to the integrated circuit die beyond what is normally available in operational use. In further embodiments, the additional access (or other similar control of at least some of the I/O pins of the integrated circuit die) enables one or more parts of Manufacturing-Time Procedure 700 to be performed as part of System-level Testing 770.

Once System-level Testing 770 of a system including a processing chip is complete (which implies that Manufacturing-Time Procedure 700 is also complete), the system is able to be used for its intended application (Begin Operational Use 780). For example, the system is immediately deployed for use, or is shipped to a destination where it is similarly deployed for use.

According to various embodiments, a manufacturing-time procedure, such as Manufacturing-Time Procedure 700, performs one or more of: creating one or more keys in the processing chip that are unique to the processing chip (Key Creation 720); verifying the correctness of the creation of the keys (Key Testing 730); associating a flash chip (such as a flash chip to be used as a boot flash chip) with the processing chip by writing the flash chip with contents encrypted by one of the unique keys (Flash Chip Association 740); and verifying that the flash chip has been correctly written and/or is usable by the processing chip (Flash Chip Testing 750).

In some embodiments, Manufacturing-Time Procedure 700 starts after some or all of Die-level Testing 710 is complete so that the processing chip is initially known to have at least basic functionality. In various embodiments, some or all of Manufacturing-Time Procedure 700 starts and/or finishes before Die-level Testing 710 finishes. In other embodiments, Manufacturing-Time Procedure 700 starts after Die-level Testing 710 finishes, such as when at least a part of Manufacturing-Time Procedure 700 is a final, die-level operation. According to various embodiments, Manufacturing-Time Procedure 700 is performed one or more of: entirely before Packaging and Final Test 760; started before Packaging and Final Test 760; started after Packaging and Final Test 760; completed before System-level Testing 770; and completed as part of System-level Testing 770. Depending on when Manufacturing-Time Procedure 700 is performed, one or more of the techniques described below are used to control (and/or configure) Manufacturing-Time Procedure 700.

According to various embodiments, Manufacturing-Time Procedure 700 is controlled (and/or configured) by one or more of: JTAG I/O pins of the processing chip; special I/O pins of the processing chip used solely for this purpose; I/O pins of the processing chip that are enabled for this purpose during at least part of Procedure 790; direct probe connections to the processing chip (e.g., special test pads that are not brought out as I/O pins); other techniques for controlling testing and/or configuration of an integrated circuit; and a combination of the foregoing. For example, when the processing chip is on a tester in a manufacturing environment, JTAG I/O pins are usable to change JTAG-accessible state in the processing chip, and I/O pins of the processing chip are controllable by the tester. Further, the tester is able to run a manufacturing test program that is able to carry out complex sequences of operations, including sequences that change their behavior according to outputs of the processing chip.

Manufacturing-Time Procedure 700 uses hardware in the processing chip to perform operations such as key creation and encryption. Using on-chip hardware to perform these operations advantageously keeps the keys from being exposed (e.g., observable or knowable outside of the processing chip or by a processor in the processing chip). For example, the on-chip hardware is configured, such as on a tester, to perform a particular one or more operations (e.g., by configuring state in the processing chip), and then a clock of the processing chip is allowed to run for a fixed number of cycles (or until the processing chip signals completion of the particular operations, such as on an output pin). While the clock is running, the processing chip carries out the particular operations, including in some cases saving results (such as in an on-chip ROM or by writing to an external memory). The on-chip hardware used as part of Manufacturing-Time Procedure 700 is, in some embodiments, autonomous hardware, and includes and utilizes finite state machines and/or microcontrollers. Use of a microcontroller as part of the hardware that performs Manufacturing-Time Procedure 700 enables the tester to load different control programs (e.g., into an on-chip SRAM associated with the microcontroller) for different operations of Manufacturing-Time Procedure 700, or to configure a function of one of the operations of Manufacturing-Time Procedure 700 (e.g., changing a number or a type of keys created by Key Creation 720).

In some embodiments, one or more operations (or portions thereof) of Manufacturing-Time Procedure 700 are performed entirely by one or more on-chip hardware functions, such as by autonomous hardware. Alternatively, trading off flexibility, the on-chip hardware is immutable hardware, such as hardware that uses on-chip, mask-programmed ROMs to control and/or configure its behavior. In various embodiments, the processing chip is designed so that as fabricated, at an initial reset, the on-chip hardware performs the one or more functions. Alternatively or in addition, in further embodiments, the hardware is designed so that, as fabricated, values and/or a sequence of values input on a particular group of one or more I/O pins of the processing chip trigger a reset and then initiate the one or more functions. In yet further embodiments, multiple different 'pin-based reset triggers' (using different pins, values, and/or sequences of values) enable respective sets of the functions to be performed.

In various embodiments and/or usage scenarios, it is advantageous that state in the processing chip (such as state of KMU 112 and/or CE 110) which potentially holds information that, if knowable outside of the processing chip exposes knowledge of a key, is either never on a JTAG scan chain, or is made non-scannable by changing a state in an on-chip ROM prior to completion of Manufacturing-Time Procedure 700. In some embodiments, this advantageously enables any knowledge of the keys from being externally visible by any means short of very sophisticated physical imaging (such as with an Atomic Force Microscope or other non-invasive observation techniques) of the processing chip (e.g., to physically image state values in an on-chip ROM). In various embodiments, prior to completion of Manufacturing-Time Procedure 700, state is set in an on-chip ROM disabling an ability to perform one or more operations (or portions thereof) of Manufacturing-Time Procedure 700 a second time.

In some embodiments, the processing chip includes multiple, independent, autonomous hardware functions. For example, a first autonomous hardware function, initiated by a first pin-based reset trigger, performs Key Creation 720, and a second autonomous hardware function, initiated by a second pin-based reset trigger, performs Flash Chip Association 740. This advantageously enables operations, such as Key Testing 730, to be performed (such as under control of a tester) between the first function and the second function, while still ensuring that the first function and the second function are each indivisible and unobservable. Further, this enables the first function and the second function to be performed at different times, such as performing Key Testing 730 as part of chip-level manufacturing, and performing Flash Chip Association 740 as part of system-level manufacturing.

In some embodiments, Manufacturing-Time Procedure 700 uses one or more I/O pins of the processing chip to provide data inputs and/or outputs for some operations of Manufacturing-Time Procedure 700, such as for Key Testing 730 and/or Flash Chip Association 740. In further embodiments, the I/O pins include at least a portion of one of external memory interfaces 150 that is used for a boot flash chip. For example, data is streamed into the processing chip as if it was read from the boot flash chip, and/or data is streamed out of the processing chip as if it was being written to the boot flash chip. In various embodiments, the one or more I/O pins are repurposed during part of Procedure 790 for testing and/or configuration uses such as this, and otherwise (such as in operational use) have a different function. In further embodiments, the one or more I/O pins include a particular one or more of external memory interfaces 150, and the particular external memory interfaces are used to communicate with one or more external memory chips to provide input for and/or receive output from Manufacturing-Time Procedure 700. For example, a DRAM (such as a DRAM DIMM) is coupled to the processing chip on one of external memory interfaces 150 and is used by Flash Chip Association 740 as a source and/or a sink of data.

Figure 8:
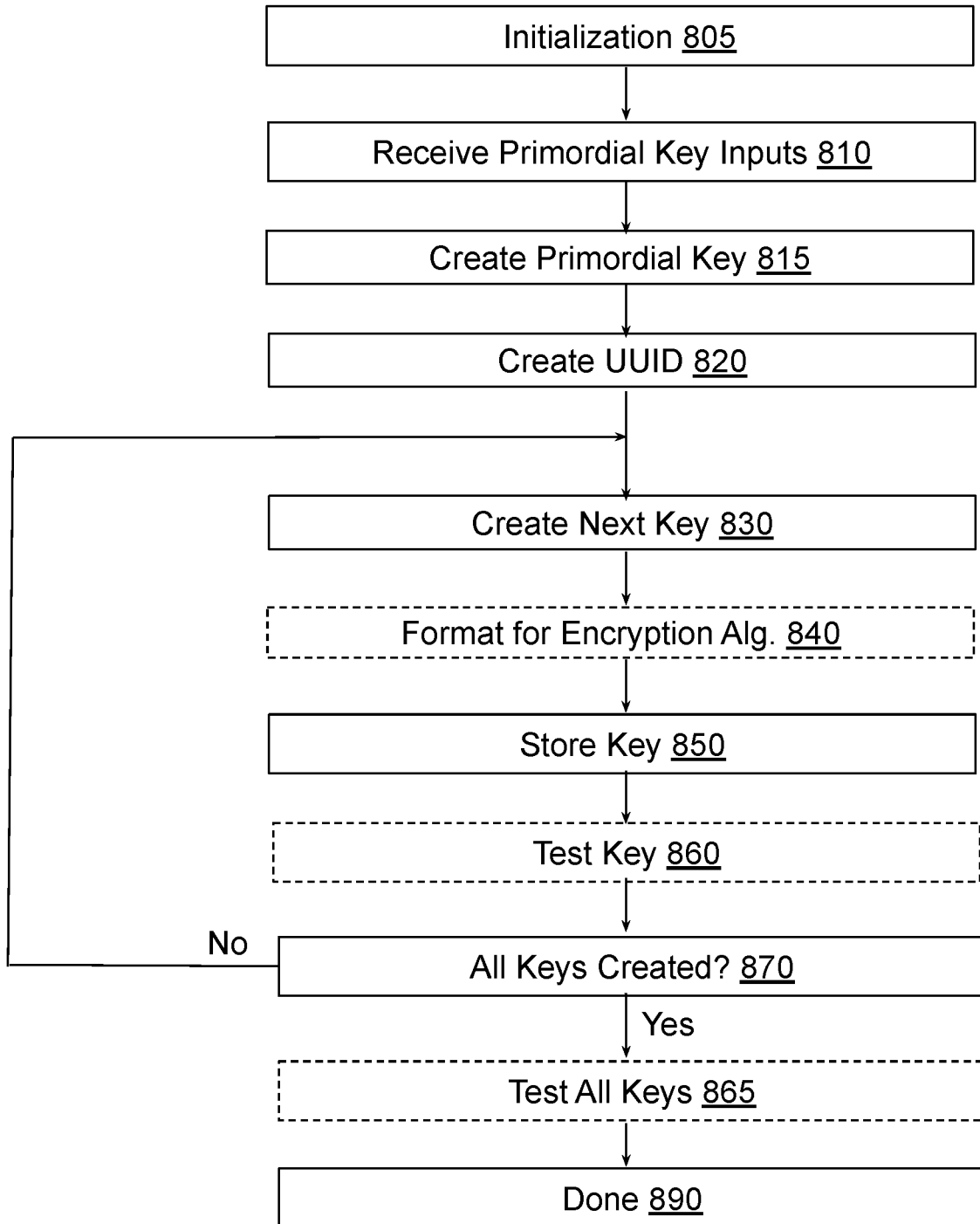
FIG. 8 illustrates examples of selected details of a key process.

Some portions of Manufacturing-Time Procedure 700 need input values either to provide data needed as input to an operation, or to configure a function of an operation. For example, Create Primordial Key 815 (as illustrated in FIG. 8) needs a set of input values to use to create the primordial key. In another example, Format for Encryption Technique 840 (as illustrated in FIG. 8) is selectively performed on particular ones of the keys and/or performs formatting for a selected encryption technique according to configuration information provided by input values.

For portions of Manufacturing-Time Procedure 700 that are, in some embodiments, controlled externally (e.g. using I/O pins of the processing chip), the needed input values are optionally and/or selectively provided directly on the I/O pins. In various embodiments, such as for parts of Manufacturing-Time Procedure 700 that are performed using autonomous hardware, the needed input values are provided in state that is part of or is accessible by the processing chip. In a first example, prior to starting an autonomous hardware function, the needed input values are provided in registers in the processing chip, such as via JTAG scan. In a second example where the processing chip is coupled to an external memory (such as DRAM), prior to starting an autonomous hardware function, the input values are loaded into the external memory (and are then readable by the autonomous hardware in the processing chip at an appropriate time).

In various embodiments, one or more operations of Manufacturing-Time Procedure 700 perform initialization and/or configuration of the processing chip to enable the operation to be performed. For example, in some embodiments, an initialization to perform Key Testing 730 configures the processing chip so that certain I/O pins function to receive input or to provide output, so that hardware data paths are configured to move data on I/O pins used for input to I/O pins used for output via CE 110, and so that various state in CE 110 and elsewhere is configured and/or initialized to enable a key testing operation to be performed.

Manufacturing-Time Procedure 700 commences with Key Creation 720 which creates one or more keys (such as keys used for encryption/decryption techniques) and stores them in on-chip ROM of the processing chip. Key Testing 730 verifies that the created keys are functional and/or meet other criteria. According to various embodiments, Key Testing 730 is performed during Key Creation 720 (such as by testing a key after the key is created), or after Key Creation 720 (such as by testing two or more of the keys after the two or more keys are created). FIG. 8 illustrates examples of selected details of a key process which combines a key creation process (such as Key Creation 720) and a key test process (such as Key Testing 730).

In some embodiments, Key Creation 720 (and optionally and/or selectively Key Testing 730) is performed more than once. For example, Key Creation 720 is performed, such as at chip-level manufacturing time, by a fabrication entity in order to create one or more keys, at least one of which is a public/private key pair (called the 'secondary' key in the present disclosure) that is used as part of updating of low-level executable code (e.g., a bootloader and/or a kernel) stored in the flash chip. Key Creation 720 is also performed, such as at system-level manufacturing time, by an OEM entity in order to create a public/private key pair (called the 'tertiary' key in the present disclosure) that is used as part of updating of high-level executable code (e.g., applications) stored in the flash chip.

According to various embodiments and/or usage scenarios, Key Testing 730 is performed, for a particular one of the keys created by Key Creation 720, via one or more key testing techniques, including: verifying that the particular key itself is sufficiently random, such as by seeing if a zero/one balance (a difference between a number of zeros and a number of ones) of the particular key is within a specified range; encrypting and then decrypting data using the particular key and verifying that the decrypting produces the original data; encrypting data with the particular key and verifying statistical properties of the result, such as randomness; having multiple copies of hardware in the processing chip used to create the particular key (with some exceptions such as for a physically unclonable function), and comparing results of the multiple copies; using other chip-testing techniques, such as scan via JTAG; other techniques for testing an unobservable cryptographic key; and a combination of the foregoing. In various embodiments, none of the keys created by Key Creation 720 are exposed outside of the processing chip, even during Procedure 790, and the keys are only testable by indirect means (such as by using one of the keys to encrypt data, then decrypt the encrypted data, and verifying results). In further embodiments, none of the keys created by Key Creation 720 are accessible by CPUs in the processing chips, even during Procedure 790.

In some embodiments, a particular one of the keys is tested by on-chip hardware. For example, a quantity of random data of a size used by a particular encryption technique in the processing chip is generated and saved (such as in an on-chip register, ROM, or SRAM). The saved data is then compared with a version of the saved data that has been encrypted and then decrypted using the particular encryption technique with the particular key, and the particular key is considered to be defective if the compare fails. The generating random data, encrypting/decrypting, and comparing is optionally and/or selectively repeated a predetermined number of times. Continuing the example, hardware is also enabled to maintain statistics on the encrypted data, such as a zero/one balance of the encrypted data. If, after a sufficient number of repetitions of the generating random data, encrypting/decrypting, and comparing, an absolute value of the zero/one balance exceeds a predetermined threshold, the particular key is considered to be defective. In further embodiments, some or all of the random data is biased to disturb its statistical properties, such as by randomly changing some of the generated '0' bits to '1' bits, and then later randomly changing some of the generated '1' bits to '0' bits.

In some embodiments, the particular key is tested at least in part using external communication, such as one or more of the I/O pins of the processing chip. For example, certain I/O pins of the processing chip are used, during some parts of Manufacturing-Time Procedure 700, to provide an interface for streaming data into the processing chip, and to provide an interface for streaming data out of the processing chip. Similar to the above example, test data is encrypted in the processing chip with the particular encryption technique and the particular key, the encrypted test data is decrypted with the particular encryption technique and the particular key, and the decrypted test data is compared with the original test data. Instead of the test data being generated on-chip, the test data is streamed into and out of the processing chip and the comparison is performed externally. Further, in some embodiments, the encrypted test data is streamed out and then streamed back in for the decryption, enabling statistics to be performed (outside the processing chip) on the encrypted test data to ensure randomness and/or other desired properties.

In various embodiments, if Key Testing 730 fails, Manufacturing-Time Procedure 700 goes to Abort 735, where the processing chip is either deemed to be defective (and Manufacturing-Time Procedure 700 is halted), or some remedial action is taken as described above.

Manufacturing-Time Procedure 700 continues with Flash Chip Association 740. A particular one of multiple processing chips that is performing Flash Chip Association 740 is enabled to encrypt (with a particular one of one or more keys created by Key Creation 720 and using a particular one of one or more encryption techniques in the particular processing chip) a stream of input data to produce a stream of encrypted output data. The encrypted output data is written into a particular one of multiple flash chips.

The particular flash chip is thereby associated with the particular processing chip as only the particular processing chip has the particular key that can decrypt the encrypted data in the particular flash chip. In various embodiments, one or more integrity checks (such as on the stream of input data and/or on the stream of encrypted output data) are computed during Flash Chip Association 740 and resulting values of the integrity checks are optionally and/or selectively stored in an on-chip ROM in the particular processing chip and/or streamed out as part of and/or after the stream of encrypted output data and written into the particular flash chip. FIG. 10A illustrates examples of selected details of a flash chip association process, such as Flash Chip Association 740.

In some embodiments, the particular flash chip is directly coupled to the particular processing chip during Flash Chip Association 740 and/or Flash Chip Testing 750. For example, one of external memory interfaces 150 that is usable for a boot flash chip is used to read and/or to write the particular flash chip. In other embodiments, the particular flash chip is indirectly coupled to the particular processing chip during Flash Chip Association 740 and Flash Chip Testing 750. For example, a stream of output data from the particular processing chip is captured, and is conveyed (such as over a network) to the particular flash chip which is in a separate test jig or other interface apparatus.

In various embodiments, an external memory (e.g., a DRAM) is coupled to the processing chip on one of external memory interfaces 150. For example, the external memory is loaded with the unencrypted contents to be written into the flash chip as part of Flash Chip Association 740, and after completion of preceding operations, such as Key Creation 720, autonomous hardware is enabled to copy contents of the external memory to the flash chip via CE 110 (performing encryption using a particular one of the keys created by Key Creation 720). This is similar to a process that copies the boot flash chip to external memory as part of the H/W boot sequence, but in the other direction. In various embodiments, the copying performed by the autonomous hardware as part of Flash Chip Association 740 is enabled to use metadata to control the copying, similar to metadata control of copying as part of the H/W boot sequence. In some embodiments, such as for initial writing of the flash chip, the contents to be written into the flash chip is stored unencrypted in the external memory. In other usage scenarios, such as for updating contents of the flash chip as described in relation to FIG. 10B, the contents to be written into the flash chip is stored encrypted in the external memory, such as by being encrypted with either the secondary (fabrication entity) key or the tertiary (OEM entity) key. In further embodiments, the contents in the external memory are used as a source of comparison for Flash Chip Testing 750.

In some embodiments, Flash Chip Association 740 (and optionally and/or selectively Flash Chip Testing 750) is performed more than once. For example, Flash Chip Association 740 is performed, such as at chip-level manufacturing time, in order to write initial low-level executable code (e.g., a bootloader and/or a kernel) into the flash chip. Flash Chip Association 740 is also performed, such as at system-level manufacturing time, by an OEM entity in order to write initial high-level executable code (e.g., applications) into the flash chip. In further embodiments, the low-level (high-level) executable code in the boot flash chip is encrypted with the secondary (tertiary) key, while in other embodiments the low-level (high-level) executable code in the boot flash chip is encrypted with another key (such as the default key). In yet further embodiments, the secondary key is the same as the default key.

Manufacturing-Time Procedure 700 continues with Flash Chip Testing 750. After the particular flash chip has been associated with the particular processing chip, in some embodiments, Flash Chip Testing 750 verifies that the particular flash chip has been written correctly. According to various embodiments and/or usage scenarios, Flash Chip Testing 750 is performed by reading contents of the particular flash chip and one or more of: comparing the contents with the stream of encrypted output data (which has been saved in another storage device); streaming the contents back into the particular processing chip, and repeating one or more of the integrity checks as a verification of the contents (by comparing with the previously computed one or more integrity check values); streaming the contents back into the particular processing chip, decrypting the contents, and comparing the result with the original stream of input data as saved in another external memory (such as a DRAM); streaming the contents back into the particular processing chip, decrypting the contents, streaming out a result of the decrypting, and externally comparing the result with the original stream of input data; repeating, external to the processing chip, one of the integrity checks (provided that the technique is known) performed on the stream of encrypted output data and using the integrity check value streamed out as part of or after the stream of encrypted output data to verify the contents; and a combination of the foregoing. In further embodiments where the contents of the particular flash chip include multiple sections, at least some of which have respective metadata, Flash Chip Testing 750 is enabled to use the metadata to control testing of the contents. For example, the procedure described above that Flash Chip Testing 750 performs is performed for one or more of the sections according to the respective metadata.

In some embodiments, Manufacturing-Time Procedure 700 continues with Change On-chip State 755 which changes state in one or more on-chip ROMs of the particular processing chip. In some embodiments, Change On-chip State 755 includes some or all of Change On-Chip State 1030 (as illustrated in FIG. 10A). According to various embodiments, the state is changed to one or more of: record configuration data used by Manufacturing-Time Procedure 700, such as an identifier (e.g., an index) of the particular key, or an identifier of the particular encryption technique; record results of Manufacturing-Time Procedure 700, such as one or more of the integrity check values; enable and/or disable features and/or capabilities of the processing chip; other processing chip configuration settings; and a combination of the foregoing. In a first example, a first state in one of the on-chip ROMs is changed so that the particular key is not usable for further encryption operations, thus preventing a second flash chip from being created using the particular key. The particular processing chip is thereby associated with the particular flash chip as the particular processing chip is unable to encrypt further data that it is then able to decrypt (with the particular key). Continuing the example, if the particular key is further configured (such as in hardware or in on-chip ROM state) to be the key used to decrypt at least an initial portion of executable code read from a boot flash chip, then a secure boot of the processing chip is only performable with the particular flash chip as the boot flash chip. In a second example, a second one or more states in the on-chip ROMs are changed to disable one or more features used in Manufacturing-Time Procedure 700 from being performed a second time, such as disabling some or all uses of JTAG, and/or disabling an ability to copy unencrypted executable code to a boot flash chip, and/or disabling an ability to perform write operations on the one of external memory interfaces 150 that is usable for a boot flash chip.

Key Process

FIG. 8 illustrates examples of selected details of a key process which combines a key creation process (such as Key Creation 720) and a key test process (such as Key Testing 730). Key Process 800 creates (and tests) one or more keys in a processing chip that are unique to the processing chip.

While at least some operations of Key Process 800 are illustrated as being sequential and in a particular order, in various embodiments at least some of the operations are performed, in whole or in part in parallel, at least partially overlapped in time, in other orders, and/or skipped entirely. In a first example, Format for Encryption Technique 840 is performed on some or all of the keys after All Keys Created? 880. In a second example, an initial one of the keys is created and then tested, and subsequently an additional one or more of the keys are created and then tested.

In some embodiments, operations Test Key 860 and Test All Keys 865 of Key Process 800 represent one or more places where Key Testing 730 (as described above) is performed. In a first example, each key is tested as it is created (Test Key 860). In a second example, two or more of the keys are tested after the two or more keys are created (Test All Keys 865). In some embodiments and/or usage scenarios, both Test Key 860 and Test All Keys 865 are performed, while in other embodiments, just one of Test Key 860 and Test All Keys 865 is performed. In various embodiments where both of Test Key 860 and Test All Keys 865 are performed, Test Key 860 and Test All Keys 865 optionally and/or selectively use different ones of the key testing techniques. In further embodiments, Key Testing 730 is performed at other times during or after Key Process 800, but is performed prior to completion of Manufacturing-Time Procedure 700.

Key Process 800 begins with Initialization 805 which configures the processing chip to perform other operations of Key Process 800. According to various embodiments, Initialization 805 performs one or more of: configuring and/or initializing state in the processing chip, such as state in on-chip registers, ROM, and/or SRAM; providing input values (such as control and/or configuration information, or data inputs) needed for parts of Key Process 800 on I/O pins, in on-chip registers, and/or in an external memory (such as DRAM) coupled to the processing chip; other initialization procedures to enable a processing chip to stream data in and out, perform encryption, decryption, and/or integrity checks, or other operations; and a combination of the foregoing. In various embodiments, additional initialization is also performed prior to one or more operations in Key Process 800 to (re)initialize state in the processing chip for the one or more operations.

Key Process 800 continues with Receive Primordial Key Inputs 810, which receives a set of input values, such as such as one or more of a company name, a product line, a product name, and/or a product and/or processing chip identification (e.g., a serial number), used to create the primordial key. In some embodiments, the input values are provided by a tester during Key Process 800. In other embodiments where at least Receive Primordial Key Inputs 810 is performed by an autonomous hardware function, the input values are pre-loaded (into on-chip state, or into an external memory that is coupled to the processing chip and is readable by the processing chip) prior to initiating the autonomous hardware function.

Given the input values from Receive Primordial Key Inputs 810, Create Primordial Key 815 creates the primordial key, such as by performing a hash (e.g., a SHA-256 or a SHA-512 hash) of the input values. After being created, the primordial key is saved in an on-chip ROM. According to various embodiments, a size of the primordial key is one or more of: at least as large as a size of the input values; a size of a hash function used to create the primordial key; a predetermined size; and a combination of the foregoing. If a size of the input values used to create the primordial key is larger than a size of the hash function, then in some embodiments, the hash function is applied separately to portions of and/or functions of the input values, and results of the separate hash functions are concatenated to create the primordial key.

Key Process 800 continues with Create UUID 820, which uses the primordial key and hardware generated random numbers, such as generated by a physically unclonable function in the processing chip, to create a long (such as 8K-bit long or an 8704-bit long) UUID, which is saved in an on-chip ROM. In various embodiments, the UUID is created by obtaining a sufficient amount of random data from the physically unclonable function, combining that data with the primordial key (for example, by using an XOR or an addition), and performing a hash (e.g., a SHA-256 or a SHA-512 hash) of the result. This process is then repeated a number of times to create the full length of the UUID. The sufficient amount of random data is generally an amount of data at least as large as a size of the hash (e.g., 256 bits for SHA-256), and in some embodiments is a larger amount (such as twice the size of the hash). Using the primordial key to create the UUID as well as hardware generated random numbers advantageously ensures that the UUID is unique to the processing chip in which it was created.

Key Process 800 continues with a loop of operations beginning with Create Next Key 830 and ending with a test to see if there are more keys to be created (All Keys Created? 870). In some embodiments, the loop of operations is repeated 17 times to create a default key and a set of 16 other keys. In other embodiments, a number of keys (including just a single key) are created. In various embodiments, a set of keys created by one or more repetitions of the loop of operations includes the KMU initial keys.

In some embodiments, Create Next Key 830 creates a particular one of the keys using a combination of the UUID and hardware generated random numbers, such as generated by a physically unclonable function in the processing chip. Using the UUID (which was created according to the primordial key) to create the particular key as well as hardware generated random numbers advantageously ensures that the particular key is unique to the processing chip in which it was created, as well as being unique among other keys created on that processing chip. In some embodiments, portions or all of the UUID are combined with a sufficient amount of random data from the physically unclonable function (for example, by using an XOR or an addition), and the result is hashed (e.g., using a SHA-256 or a SHA-512 hash) to produce a key of a desired size (repeating the process as necessary if the desired size is greater than a size of the hash). The sufficient amount of random data is generally an amount of data at least as large as the size of the hash (e.g., 256 bits for SHA-256), and in some embodiments is a larger amount (such as twice the size of the hash). Similarly, an amount of the UUID to use to create the particular key is, according to various embodiments: same as the size of the hash; twice the size of the hash; same as a size of the particular key; twice a size of the particular key; all of the UUID; or other predetermined sizes. In further embodiments, different portions of the UUID are used in the creation of different ones of the keys. For example, a pointer into the UUID is advanced after one of the keys is created, and a next one of the keys to be created uses a corresponding subsequent portion of the UUID.

In various embodiments, one of the keys created by Create Next Key 830 is not directly usable by an encryption technique, for example by an RSA technique which uses a public/private key pair. In some embodiments, Format for Encryption Technique 840 is optionally performed after Create Next Key 830 to properly format the key for use by a desired encryption technique. For example, for an RSA key creation process (producing a public/private key pair), portions of the created key (of appropriate sizes, where even the sizes are optionally and/or selectively chosen according to other portions of the created key) are used as initial approximations of the p and q values used in RSA key creation. A hardware computation is then able to find usable p and q values near the respective initial values with an iterative search process. In some embodiments and using the initial p value as an example, the iterative search process performs an iterative primality test on a current value of p, and then increments (for p, or decrements for q) until a prime value of p is found. Other variable inputs to the key creation process (for example, in some embodiments, the e value used in RSA key creation) are chosen similarly (such as either directly as portions of the key, indirectly using portions of the key as an initial approximation, or using a portion of the key to control selection of one of multiple predetermined values). Other inputs to the key creation process are provided (such as prior to initiating an autonomous hardware function that performs Create Next Key 830) as input values, similar to a manner in which the set of input values for the primordial key are provided. In various embodiments, inputs to be provided for RSA key creation include a respective number of bits to be used for the initial p and q values. In yet other embodiments, one of p and q is a fixed value provided as an input and hardware computes the other of p and q. (Knowledge of one of p or q provides a potential backdoor that might be usable to break the encryption, which could be desirable in some usage scenarios. One difference in this case is that just one of p or q is known; the 'public' value n, the product of p and q, is part of the unobservable key information in the processing chip.) Similar formatting of one of the keys created by Create Next Key 830 for other cryptographic techniques, such as elliptic curve cryptography, is also contemplated.

In various embodiments, Format for Encryption Technique 840 creates output that is larger than a key created by Create Next Key 830. For example, RSA key creation produces the values n, d, and e that are saved, and the value n, derived from random data, is itself generally a same size as that of a key created by Create Next Key 830. In further embodiments, additional space is provided in on-chip ROMs to store additional data produced when keys are formatted for specific techniques.

In some embodiments, multiple sizes of keys are supported. In a first example, multiple keys created by Create Next Key 830 are together used to create a large RSA public/private key pair. In a second example, Create Next Key 830 uses configuration information (provided as an input value to Key Process 800) to determine a respective size of one or more of the keys to be created.

In some embodiments and/or usage scenarios, Format for Encryption Technique 840, on at least a particular one of the keys, is not performed as part of Key Process 800, but is performed in operational use as part of CE 110 performing an encryption or decryption operation. In further embodiments, formatting the particular key for use by a particular encryption technique after Manufacturing-Time Procedure 700 is complete is unable to change the particular key in on-chip ROM, and instead saves the re-formatted key in an on-chip register that is both unobservable externally (e.g., is not on a JTAG scan chain, or at least that portion of a JTAG scan chain has been disabled) and is not accessible to any run-time programmable CPU.

In other embodiments, Create Next Key 830 and Format for Encryption Technique 840 are combined and operate as one operation, for example as an operation that creates an RSA public/private key pair using the UUID and the physically unclonable function, and optionally and/or selectively under control of input values. In further embodiments, under control of other input values, Create Next Key 830 is enabled to create each of one or more of the keys as a respective one of multiple types of keys (such as a key for AES encryption/decryption, or public/private key pairs for RSA or elliptic curve cryptography).

Key Process 800 continues with Store Key 850, where the created (and optionally and/or selectively formatted) key is saved in an on-chip ROM. In various embodiments, for uses such as for authentication with a Network Management Center (NMC), only a public (or a private) part of a particular public/private key pair generated by Create Next Key 830 and Format for Encryption Technique 840 is saved in on-chip ROM, and the other part is provided to the NMC. This advantageously keeps the part saved on-chip unknowable outside of the processing chip (and inaccessible by any run-time programmable CPUs in the processing chip). Since only one of the parts of the particular key pair is saved, the particular key pair is not usable for both encryption and decryption, and thus is not usable with external memories.

In some embodiments, the public (or the private) part of a particular public/private key pair is made available, such as to the NMC, by copying the public (or the private) part of the key pair into a known location in DRAM. For example, when creating a public/private key pair at the manufacturing time for encryption of executable code to be stored in the boot flash chip, the public (or the private) part of the key pair is written to a known location in DRAM so that the entity writing the initial executable code is able to retrieve the public (or the private) part for later use to update the executable code once the processing chip is in in operational use. In other embodiments, the public (or the private) part of the key pair is provided in other ways, such as on pins of the processing chip. In further embodiments, the other part of the key pair (which is used to decrypt contents of the boot flash chip) is maintained by immutable hardware of the processing chip and is not exposed to any external entity or to run-time programmable CPUs in the processing chip.

Key Process 800 continues with Test Key 860, which has been described above.

If there are more keys to be created, All Keys Created? 870 returns Key Process 800 to Create Key 830 to repeat the loop of operations for another one of the keys. Otherwise, Key Process 800 continues with Test All Keys 865, which has been described above.

Key Process 800 ends with Done 890.

Write Flash Chip Process

FIG. 9 illustrates examples of selected details of a process to write a flash chip. Write Flash Chip Process 900 is used as part of Flash Chip Association Process 1000 (illustrated in FIG. 10A) and/or as part of Update Process 1050 (illustrated in FIG. 10B), though even on a same processing chip Flash Chip Association Process 1000 and Update Process 1050 optionally and/or selectively use different embodiments of Write Flash Chip Process 900. For example, in various embodiments, a source of data for Copy Data to External Memory 910 and/or Stream Data In 920 is different for Write Flash Chip Process 900 as used in Flash Chip Association Process 1000 vs. Write Flash Chip Process 900 as used in Update Process 1050.

In some embodiments, Write Flash Chip Process 900, Flash Chip Association Process 1000, and Update Process 1050 are performed with the processing chip coupled to both the flash chip and an external memory (such as DRAM). In other embodiments, the flash chip and/or the external memory are not used, and instead a tester (or other external equipment) is able to mimic their behavior. In view of embodiments such as these, the description below of Write Flash Chip Process 900, Flash Chip Association Process 1000, and Update Process 1050 refers to the boot flash chip interface (as one of the external memory interfaces where the flash chip is coupled or mimicked), and the external memory interface (as one of the external memory interfaces where the external memory is coupled or mimicked).

While at least some operations of Write Flash Chip Process 900 are illustrated as being sequential and in a particular order, in various embodiments at least some of the operations are performed, in whole or in part in parallel, at least partially overlapped in time, in other orders, and/or skipped entirely. In a first example, Update Integrity Check(s) 940 is performed as part of Encrypt and Stream Data Out 930. In a second example, a first part of Update Integrity Check(s) 940 is performed prior to Encrypt and Stream Data Out 930 directly on input data to compute a first integrity check value, and a second part is performed subsequent to Encrypt and Stream Data Out 930 directly on encrypted data to compute a second integrity check value.

According to various embodiments, control and/or configuration of Write Flash Chip Process 900, is provided by one or more of: metadata associated with and/or part of the contents written to the flash chip; providing input values (such as control and/or configuration information, or data inputs) on I/O pins, in on-chip registers, and/or in an external memory (such as DRAM) coupled to the processing chip; other techniques for controlling and/or configuring hardware; and a combination of the foregoing. In further embodiments, such as in some embodiments of Update Process 1050, at least some of the input values, such as input values in on-chip registers, are provided by software, such as software running or executing on one or more of CPU(s) 106. In some embodiments, some or all of Write Flash Chip Process 900 is performed by autonomous hardware at a manufacturing time of the processing chip (such as in some embodiments of Flash Chip Association Process 1000), and/or some or all of Write Flash Chip Process 900 is performed by immutable hardware during operational use of the processing chip (such as in some embodiments of Update Process 1050).

Write Flash Chip Process 900 begins with Initialization 903 which configures the processing chip to perform other operations of Write Flash Chip Process 900. In some embodiments, Initialization 903 (and thus Write Flash Chip Process 900) is begun in response to a type of reset, such as a first reset after Key Process 800 has completed, or a reset triggered by a pin-based reset trigger. In further embodiments, some or all of Initialization 903 is performed earlier in Manufacturing-Time Procedure 700 than other parts of Write Flash Chip Process 900, such as by being performed as part of Initialization 805 (illustrated in FIG. 8).

According to various embodiments, Initialization 903 performs one or more of: configuring and/or initializing state in the processing chip, such as state in on-chip registers, ROM, and/or SRAM; providing input values (such as control and/or configuration information, or data inputs) needed for parts of Write Flash Chip Process 900 on I/O pins, in on-chip registers, and/or in an external memory (such as DRAM) coupled to the processing chip; other initialization procedures to enable a processing chip to stream data in and out, perform encryption, decryption, and/or integrity checks, or other operations; and a combination of the foregoing. In various embodiments, additional initialization is also performed prior to one or more operations in Write Flash Chip Process 900 to (re)initialize state in the processing chip for the one or more operations.

In some embodiments, Write Flash Chip Process 900 continues with Copy Data to External Memory 910. Copy Data to External Memory 910 performs a copy operation, similar to Copy 550 and optionally and/or selectively Integrity Check 560 (as illustrated in FIG. 5), to copy source data to the external memory interface. The source data copied is data that is to be written to the flash chip in an encrypted form, and in further embodiments includes one or more sections of contents that are processed either separately or as one or more groups of the sections. According to various embodiments, the source data is received from one or more of: the boot flash chip interface; one of external memory interfaces 150 of the processing chip other than the boot flash chip interface; one of external I/O interface(s) 180 of the processing chip, such as a network interface; other pins of the processing chip; and a combination of the foregoing. In some embodiments, such as various embodiments where Write Flash Chip Process 900 is used as part of Flash Chip Association Process 1000, the source data is not encrypted prior to being written to the external memory interface and/or decrypted after being read from the external memory interface. In further embodiments as part of Flash Chip Association Process 1000, the source data is not encrypted when copied to the external memory interface, and is encrypted subsequently when copied to the boot flash chip interface. In other embodiments, such as various embodiments where Write Flash Chip Process 900 is used as part of Update Process 1050, the source data is encrypted, such as with a default one of the KMU initial keys, prior to being written to the external memory interface and is decrypted, such as with the default key, after being read from the external memory interface.

In some embodiments where a flash chip is coupled to the processing chip, the source data is read from the flash chip via the boot flash chip interface. In some embodiments where an external memory (such as DRAM) is coupled to the processing chip, the source data is written to the external memory. In further embodiments where Load Program 1020

(as illustrated in FIG. 10A) is performed, Copy Data to External Memory 910 copies the source data to a different range of addresses than Load Program 1020 uses for the executable code, so as to not overwrite the executable code. In various embodiments (as illustrated in FIG. 9), Copy Data to External Memory 910 is performed once after Initialization 903, and multiple sections of the contents written to the flash chip are copied. In other embodiments, Copy Data to External Memory 910 is performed separately for at least some of the sections of the contents written to the flash chip, for example in embodiments where More Sections? 970 returns to Copy Data to External Memory 910 to process a subsequent section of the contents.

In various embodiments, Copy Data to External Memory 910 performs one or more integrity checks on the source data as a whole and/or on one or more of the sections of the contents. According to various embodiments, an integrity check is performed one or more of: on source data read from the boot flash chip interface; on source data written to the external memory interface, such as by reading back the source data that was written; and a combination of the foregoing.

In some embodiments, Copy Data to External Memory 910 performs an authentication (as described above) of the source data as a whole and/or on one or more of the sections of the contents to confirm that the source data (and/or the one or more of the sections of the contents) is from a known, trusted source. In various embodiments where a digital signature is used for the authentication, the digital signature is not saved (e.g., not written to the flash chip, to external memory, or saved in an on-chip ROM), and is solely used to authenticate at least a portion of the source data.

Write Flash Chip Process 900 continues with a loop of operations to process at least one section of contents written to the flash chip, optionally surrounded by an outer loop to iterate over one or more subsequent sections of the contents written to the flash chip. The loop of operations begins with Stream Data In 920, and ends with a test to see if there is more data input to be streamed in (More Data? 950). According to various embodiments, one outer loop iteration of the loop of operations processes: one of the sections of the contents; two or more of the sections of the contents, such as two or more of the sections of the contents to be encrypted with a same one of the KMU initial keys; two or more sections of the contents as determined by metadata; all of the sections of the contents; and a combination of the foregoing.

In some embodiments, each pass through the loop of operations processes a fixed-size chunk of data (until the last operation, which optionally uses a smaller amount of data, and/or is padded to the same fixed size). The loop of operations is repeated until there is no more source data to be processed (in a current one or more sections of the contents). In a first example, each pass through the loop processes a chunk of data of a size encryptable as one unit by a particular encryption technique in the processing chip. In a second example, each pass through the loop processes a chunk of data of a size writable to the flash chip as a single unit. Some flash chips, such as some NAND flash chips, write data in 4K-byte or 8K-byte pages, and a chunk of data of that size is processed in each pass through the loop. If a final pass through the loop has less data than a size of the pages, the data is padded (such as with zeros) to fill it out to be the size of the pages. In further embodiments, a size of the chunk of data, for at least an initial chunk of data for a given one of the sections, is chosen to be at least as large as a size of the maximum amount of metadata that is able to be present in the given section.

According to various embodiments, control and/or configuration of the loop of operations (including control and/or configuration of the individual operations) is according to one or more of: executable code executing on CPU(s) 106, such as executable code loaded by Load Program 1020 (as illustrated in FIG. 10A); autonomous hardware, such as finite-state machines and/or microcontrollers controlled by on-chip ROM; and a combination of the foregoing.

Stream Data In 920 receives data input that is to be written to the flash chip. In some embodiments, the data input is provided on I/O pins of the processing chip. In other embodiments, the data input is preloaded into an external memory (such as DRAM) coupled to the processing chip (such as by Copy Data to External Memory 910), and the external memory is read as part of Stream Data In 920 to retrieve the data input. In various embodiments where the data input is read from the external memory, a starting address either is a fixed (e.g., hardwired) value, such as zero, or is provided as an input value, such as preloaded in on-chip state or provided on I/O pins of the processing chip.

In some embodiments, an initial portion of the data input includes metadata as described above that configures at least some of the functions of the loop of operations, such as by specifying a length of (this section of) the contents, or other parameters used by Write Flash Chip Process 900. In further embodiments, some of the metadata, such as a part of the metadata used to configure Write Flash Chip Process 900 and not needed as part of a H/W boot sequence, is removed and not encrypted or output. If some of the metadata is removed, a size of an initial chunk of data is kept same by adding more of the data input, or by padding if the initial chunk of data is also a final chunk of data.

In some embodiments, Stream Data In 920 changes at least some of the metadata. If changing the at least some of the metadata decreases a size of the metadata, a size of an initial chunk of data is kept same by adding more of the data input, or by padding if the initial chunk of data is also a final chunk of data. If changing the at least some of the metadata increases the size of the metadata, the size of the initial chunk of data is kept the same by removing a trailing portion of the data input in the initial chunk and using this trailing portion as the first portion of data input in a next chunk.

Encrypt and Stream Data Out 930 encrypts one chunk of data, and streams the encrypted chunk of data out of the processing chip. In some embodiments, the encrypted chunk of data is streamed out of the processing chip via I/O pins of the processing chip, where a network or other connectivity communicates the encrypted chunk of data to the flash chip where it is written. In other embodiments where the flash chip is coupled to the processing chip, the encrypted chunk of data is streamed out of the processing chip via the boot flash chip interface) and is written to the flash chip. In various embodiments, an initial one or more of the sections of the contents use a particular one of the KMU initial keys, such as the default key.

In some embodiments, one or more parameters used by Encrypt and Stream Data Out 930 are provided by metadata and/or by input values. For example, in various embodiments, the parameters include a specification (such as an index) of a key to be used for the encryption, and/or a specification of one of multiple encryption techniques in the processing chip to be used for the encryption.

In some embodiments, Encrypt and Stream Data Out 930 begins writing the flash chip at a fixed (e.g., hardwired) starting address, such as zero. In other embodiments, the starting address is provided as an input value, such as preloaded in on-chip state or provided on I/O pins of the processing chip, and saved in an on-chip ROM (so that the starting address is available for use by the H/W boot sequence). In yet other embodiments, the starting address is provided in initial metadata (such as part of an initial section). The starting address is removed from the metadata, and is saved in an on-chip ROM. According to various embodiments, when processing a subsequent section of the contents (such as after returning from More Sections? 970 to repeat the loop of operations on the subsequent section), Encrypt and Stream Data Out 930 continues writing the flash chip at one or more of: an address subsequent to an address where writing of a previous section of the contents stopped, optionally and/or selectively rounded up to a boundary, such as a page or a block boundary in NAND flash; an address specified in metadata, such as metadata in the subsequent section of the contents; an address provided as an input value; a starting address, such as described above, in a separate flash chip from the flash chip where a previous section of the contents was written; other techniques for determining or selecting an address; and a combination of the foregoing.

In various embodiments, some or all of the metadata is not encrypted, such as an initial portion of the metadata. Stream Data In 920 and Encrypt and Stream Data Out 930 pass such unencrypted data through unchanged. In some embodiments where the metadata includes the specification of the key to be used for the encryption and/or the specification of one of the multiple encryption techniques, the unencrypted data includes these specifications. In further embodiments, Stream Data In 920 does not include the unencrypted data in the initial chunk of data and optionally and/or selectively saves at least some of the unencrypted data in on-chip ROM.

Update Integrity Checks 940 performs one or more integrity checks on the data input (before and/or after Encrypt and Stream Data Out 930) to compute respective one or more integrity check values. According to various embodiments, a particular one of the integrity checks is one or more of: a CRC (such as a 32-bit or a 64-bit CRC); a hash (such as a SHA-256 hash); a digital signature (such as using a public/private key pair); a Reed-Solomon error-correcting code; a Low-Density Parity Check (LDPC) error correcting code; other data integrity checks or error correcting codes; and a combination of the foregoing. In some embodiments, using an error-correcting code as (or as part of) an integrity check provides a trade-off between detection of corruption (e.g., errors) and an ability to correct some number of errors. In a first example, a first integrity check is performed on a first section of the data input prior to encryption, and a final value of the first integrity check is appended to a final chunk of data and encrypted along with the final chunk of data. This ensures that when the first section of the contents written to the flash chip is later read back and decrypted, the original, unencrypted data input of the first section is either correctly restored or known to be defective. In a second example, a second integrity check is performed on the encrypted data, and a final value of the second integrity check is appended to a final chunk of data after encryption. This provides isolation of errors in that the integrity of the interface to and from the flash chip, as well as storage in the flash chip, is covered by the second integrity check, but not the encryption or decryption hardware in the processing chip. In either of the preceding examples, in some embodiments, the respective final integrity check value is saved in on-chip ROM instead of and/or in addition to being appended to the final chunk of data.

In various embodiments where metadata of one of the sections of the contents written to the flash chip includes a length of the section or a pointer to a next one of the sections, the length (or the pointer) is updated as part of appending integrity check values to account for a size of the appended integrity check values. Since it is known when the initial chunk of data is processed whether and which integrity checks are being performed and which, if any, of the integrity check values are to be appended to the final chunk of data (and a size of the appended integrity check values), the metadata in the initial chunk of data is updated to account for a size of the appended integrity check values prior to the initial chunk of data being encrypted.

In some embodiments, instead of and/or in addition to appending an integrity check value to a final chunk of data for a given one of the sections of the contents, Update Integrity Checks 940 inserts integrity check values into two or more of multiple chunks of data for the given section, for example an integrity check value appended to each of the chunks of data, or an integrity check value appended to every other one of the chunks of data and the final one of the chunks of data. According to various embodiments, an integrity check value appended to a particular one of the chunks of data is either an independent integrity check value covering solely the particular chunk of data, or a cumulative integrity check value covering the particular chunk of data and prior ones of the chunks of data. Of course, if the chunks of data are of a fixed size, ones of the chunks of data having an appended integrity check include less of the data input.

In one example where the flash chip has page-based storage, such as a NAND flash chip, using an error-correcting code, such as an LDPC code, as an integrity check that is appended to and covers a particular page of encrypted data provides both an ability to correct errors in the particular page, as well as to detect some other types of corruption.

In some embodiments, one or more parameters used by Update Integrity Checks 940 are provided by metadata and/or by input values. For example, in various embodiments, the parameters include whether a particular one of multiple integrity checks is computed, and/or a type (such as a CRC or a hash) of one of the integrity checks.

After the loop of operations is complete (when More Data? 950 takes the 'No' path), Output Integrity Check(s) 960 saves the integrity check values so that integrity checks are able to be performed when the flash chip is subsequently read. In some embodiments where a particular one of the integrity check values is appended to the final chunk of data, Output Integrity Check(s) 960 is performed as part of the appending and the stream data out portion of Encrypt and Stream Data Out 930. In various embodiments, the particular integrity check value is additionally (or instead of being appended) saved in an on-chip ROM. Saving the particular integrity check value in an on-chip ROM is a further way to secure contents of the flash chip. For example, anyone trying to replace the flash chip with another version would have to both correctly encrypt the contents for the flash chip to be usable, and ensure that the contents match the integrity check value saved in on-chip ROM (or the flash chip will be rejected).

In some embodiments, the data input received by Stream Data In 920 includes one or more integrity check values. According to various embodiments, a particular one of the one or more integrity check values is one or more of: verified as part of Stream Data In 920; removed and replaced with a newly-computed integrity check value as part of Encrypt and Stream Data Out 930; updated if any metadata covered by the particular integrity check value is updated by Encrypt and Stream Data Out 930; streamed out as part of Encrypt and Stream Data Out 930; and a combination of the foregoing.

In various embodiments, iteration of the loop of operations and Output Integrity Check(s) 960 are repeated for different sections of the contents to be written to the flash chip. More Sections? 970 uses metadata and/or input values to Write Flash Chip Process 900 to determine if there are more sections of the contents to be written to the flash chip. For example, in some embodiments, metadata of each of one or more of the sections of the contents is able to specify if there is a subsequent section of the contents, such as by providing a pointer to the subsequent section (or a null pointer if there is no subsequent section). The pointer indicates where the subsequent one of the sections is located in the source data (such as an address or an offset in external memory). Continuing the example, in further embodiments where the metadata of the section of the contents includes a length of that section, the length serves as the pointer, and a single, additional bit indicates whether or not there is a subsequent section of the contents.

In other embodiments where there are multiple sections of the contents, the entirety of Write Flash Chip Process 900 is performed for each of the sections and additional information provided in the metadata and/or in the input values modifies a function of Write Flash Chip Process 900, such as by changing a destination address in the flash chip, for at least some subsequent ones of the sections.

Write Flash Chip Process 900 continues with Verify Flash Chip 975. In various embodiments, Verify Flash Chip 975 performs operations similar to Integrity Check 560 (as illustrated in FIG. 5). In a first example, Verify Flash Chip 975 reads back contents that were written to the flash chip, recomputes one or more integrity check values that were saved by Output Integrity Check(s) 960 (after, in some cases where an integrity check was computed on the data input prior to encryption, decrypting the read-back contents), and uses the one or more recomputed integrity check values to verify that the flash chip was correctly written. In a second example where the data input received by Stream Data In 920 was read from an external memory, Verify Flash Chip 975 reads back contents that were written to the flash chip, decrypts the read-back contents, and compares the decrypted contents with the data input by re-reading the data input from the external memory. In some embodiments, Verify Flash Chip 975 is performed once after all sections of the contents have been processed (as illustrated in FIG. 9). In further embodiments, Verify Flash Chip 975 is performed separately on one or more of the sections as the sections are written to the flash chip, such as by performing Verify Flash Chip 975 between Output Integrity Check(s) 960 and More Sections? 970.

Write Flash Chip Process 900 ends (at Done 990) when More Sections? 970 determines there are no more sections and after Verify Flash Chip 975 is complete. Success or failure status, such as a result of Verify Flash Chip 975, is returned to a higher-level process, such as one of Flash Chip Association Process 1000 or Update Process 1050. In further embodiments, various error conditions are possible during other operations of Write Flash Chip Process 900, and these error conditions optionally and/or selectively abort Write Flash Chip Process 900 and return the failure status. In a first example of an error condition, an uncorrectable error is detected on the external memory interface during Stream Data In 920.

In a second example of an error condition, a write to the flash chip (during Encrypt and Stream Data Out 930) fails.

Flash Chip Association Process

FIG. 10A illustrates examples of selected details of a flash chip association process. In various embodiments, Flash Chip Association Process 1000 performs Flash Chip Association 740 (as illustrated in FIG. 7). In some embodiments, Flash Chip Association Process 1000 is performed after Key Process 800 is complete. In other embodiments, Flash Chip Association Process 1000 is performed during Key Process 800, such as after one or more keys used by Flash Chip Association Process 1000 have been created and tested, but prior to when others of the keys have been created and tested.

While at least some operations of Flash Chip Association Process 1000 are illustrated as being sequential and in a particular order, in various embodiments at least some of the operations are performed, in whole or in part in parallel, at least partially overlapped in time, in other orders, and/or skipped entirely. For example, in some embodiments, Change On-Chip State 1030 is performed during parts of Write Flash Chip 900.

Flash Chip Association Process 1000 associates a flash chip (such as a flash chip to be used as a boot flash chip) with a processing chip by writing the flash chip with at least some contents (such as executable code used for a S/W boot sequence) encrypted by a key unique to the processing chip. In some embodiments, there is just one section in the contents written to the flash chip (e.g., a section including the executable code). In other embodiments, the contents written to the flash chip includes multiple sections. In further embodiments, each of one or more of the sections is enabled (such as via metadata associated with and/or part of the section, and/or via configuration information provided to Flash Chip Association Process 1000) to be encrypted with a respective one of the KMU initial keys.

According to various embodiments, control and/or configuration of Flash Chip Association Process 1000, is provided by one or more of: metadata associated with and/or part of the contents written to the flash chip; providing input values (such as control and/or configuration information, or data inputs) on I/O pins, in on-chip registers, and/or in an external memory (such as DRAM) coupled to the processing chip; other techniques for controlling and/or configuring hardware; and a combination of the foregoing. In various embodiments, some or all of Flash Chip Association Process 1000 is performed by autonomous hardware without involvement of CPU(s) 106 (as illustrated in FIG. 10A by the path starting with Reset 1005). In other embodiments, there is some software control and/or sequencing of Flash Chip Association Process 1000 (as illustrated in FIG. 10A by the path starting with Load Program 1020), though various portions are still performed by autonomous hardware.

In some embodiments, Flash Chip Association Process 1000 begins with Reset 1005 (e.g., the assertion and subsequent deassertion of a reset signal). In various embodiments, Reset 1005 represents a particular type of reset, such as a first reset after Key Process 800 has completed, or a particular pin-based reset trigger.

After beginning with Reset 1005, Flash Chip Association Process 1000 continues with Initialization 1010 which configures the processing chip to perform other operations of Flash Chip Association Process 1000. In various embodiments, some or all of Initialization 1010 is performed earlier in Manufacturing-Time Procedure 700 than other parts of Flash Chip Association Process 1000, such as by being performed as part of Initialization 805 (illustrated in FIG. 8). In some embodiments, Initialization 1010 includes some or all of Initialization 903 (as illustrated in FIG. 9). According to various embodiments, Initialization 1010 performs one or more of: configuring and/or initializing state in the processing chip, such as state in on-chip registers, ROM, and/or SRAM; providing input values (such as control and/or configuration information, or data inputs) needed for parts of Flash Chip Association Process 1000 on I/O pins, in on-chip registers, and/or in an external memory (such as DRAM) coupled to the processing chip; other initialization procedures to enable a processing chip to stream data in and out, perform encryption, decryption, and/or integrity checks, or other operations; and a combination of the foregoing. In various embodiments, additional initialization is also performed prior to one or more operations in Flash Chip Association Process 1000 to (re)initialize state in the processing chip for the one or more operations.

In other embodiments, Flash Chip Association Process 1000 begins with Load Program 1020, in which executable code to be run on CPU(s) 106 is loaded into the processing chip to control at least some operations of Flash Chip Association Process 1000. In various embodiments, Load Program 1020 uses a manufacturing-time form of a boot process that is similar to Secure Boot Process 500 but does not perform decryption (or re-encryption) as part of Copy 550. In some embodiments of the manufacturing-time form of Secure Boot Process 500 used for Flash Chip Association Process 1000, Reset 510 (as illustrated in FIG. 5) is initiated by a particular type of reset, such as a particular pin-based reset trigger. In further embodiments of the manufacturing-time form of Secure Boot Process 500 used for Flash Chip Association Process 1000, Initialization 520 (as illustrated in FIG. 5) includes some or all of Initialization 903 (as illustrated in FIG. 9). In a first example, Flash Chip Association Process 1000 is performed with the processing chip coupled to both an external memory (such as DRAM) and the (boot) flash chip which is preloaded with the desired executable code (in an unencrypted form). Load Program 1020 performs a boot process that is substantially the same as Secure Boot Process 500, though certain operations are abbreviated or eliminated. For example, in various embodiments, SPD 530 is not performed if configurations of the flash chip and the external memory are known. As with Secure Boot Process 500, Load Program 1020 enables one or more of CPU(s) 106 to begin operation and to fetch instructions that have been copied from the (boot) flash chip to the external memory. A second example is similar to the first example, but the (boot) flash chip and/or the external memory are not used, and instead a tester (or other external equipment) is able to mimic their behavior.

According to various embodiments, the executable code loaded by Load Program 1020 performs one or more of: hardware testing to ensure that the processing chip, including hardware needed for further operations of Flash Chip Association Process 1000, is functional; initiating the start of autonomous hardware which then performs some or all of a remainder of Flash Chip Association Process 1000, such as by performing Write Flash Chip 900; other hardware testing, initializations, initiating, control, and/or configuration; and a combination of the foregoing.

Whether begun with Reset 1005 and Initialization 1010 or with Load Program 1020, Flash Chip Association Process 1000 continues with Write Flash Chip 900 (as illustrated in FIG. 9). In various embodiments, as used as part of Flash Chip Association Process 1000 as part of Manufacturing-Time Procedure 700, some or all of Write Flash Chip 900 is performed by autonomous hardware. In a first example, in various embodiments, if begun with Reset 1005 and Initialization 1010, Flash Chip Association Process 1000 is performed by autonomous hardware. In a second example, in further embodiments, if begun with Load Program 1020, at least some portion of Flash Chip Association Process 1000 is controlled by CPU(s) 106, though other portions of Flash Chip Association Process 1000 use autonomous hardware. Continuing the second example, in yet further embodiments, Write Flash Chip 900 (optionally and/or selectively except for authentication as part of Copy Data to External Memory 910) is performed by autonomous hardware so that CPU(s) 106 are not involved in any data movement, encryption, or integrity checking.

If Write Flash Chip 900 fails, Flash Chip Association Process 1000 is aborted. In some embodiments, remedial action is taken if Flash Chip Association Process 1000 is aborted. For example, if no on-chip state has been changed that prevents Flash Chip Association Process 1000 from being repeated, Flash Chip Association Process 1000 is repeated using a different flash chip. In further embodiments, if Write Flash Chip 900 fails, any data written to an external memory is erased (such as by being overwritten with zeros).

If Write Flash Chip 900 succeeds, Flash Chip Association Process 1000 continues with Change On-Chip State 1030. In some embodiments, Change On-Chip State 1030 is performed (as illustrated in FIG. 10A) after Write Flash Chip 900 completes. In other embodiments, Change On-Chip State 1030 is performed after one or more sections of the contents of the flash chip, such as after an initial section of the contents, are processed (e.g., after Output Integrity Check(s) 960 as illustrated in FIG. 9).

In various embodiments, Change On-Chip State 1030 changes state in an on-chip ROM to prevent some or all of Flash Chip Association Process 1000 from being performed a second time. In further embodiments, Change On-chip State 755 (as illustrated in FIG. 7) includes some or all of Change On-Chip State 1030. According to various embodiments, one or more states in an on-chip ROM are changed so that one or more of: Load Program 1020 is not repeatable, such as by preventing an unencrypted program from being loaded via the boot flash chip interface; Copy Data to External Memory 1010 is not repeatable, such as by preventing at least some initial unencrypted data from being loaded via the boot flash chip interface; a particular one of the KMU initial keys used for at least one of the sections of contents, such as the default key, is disabled from further use for encryption; a particular encryption technique used for at least one of the sections of contents, such as the initial section of the contents, is disabled from further use (and the corresponding decryption technique is not disabled); an ability to write to the boot flash chip interface is disabled; an ability to write to a particular range of addresses on the boot flash chip interface, such as a range of addresses corresponding to one or more initial sections of the contents, is disabled; other changes to prevent some or all of Flash Chip Association Process 1000 from being performed a second time; and a combination of the foregoing.

Flash Chip Association Process 1000 ends (at Done 1040) after Change On-Chip State 1030 is complete.

Update Process Overview

FIG. 10B illustrates examples of selected details of an update process. In some embodiments, Update Process 1050 is not enabled to operate, and a boot flash chip, once associated with a particular one of multiple processing chips by Flash Chip Association Process 1000, is not able to be modified (without rendering the particular processing chip unable to boot). In other embodiments, Update Process 1050 is enabled to securely update one or more sections of contents of the boot flash chip associated with the particular processing chip after the particular processing chip is in operational use. In further embodiments, state in an on-chip ROM controls which of the sections of the boot flash chip are enabled to be updated. In a first example, state in an on-chip ROM includes a bitmap of an initial number of the sections of the contents of the boot flash chip, enabling the sections of the contents in the bitmap to be individually specified as updatable or not. In a second example, state in an on-chip ROM includes one or more address ranges in the boot flash chip that are not updatable. In a third example, each of two or more entities is able to update a respective portion of the boot flash chip.

In some embodiments and/or usage scenarios, the processing chip is already securely booted and one or more on-chip CPUs of the processing chip are executing known-good (because it came from the boot flash chip) executable code. One or more entities have provided the executable code that the one or more on-chip CPUs execute. In further embodiments, each of the entities has their own respective key used to update their portion of the executable code (e.g., a secondary key for the fabrication entity, and a tertiary key for the OEM entity). For example, a fabrication entity of the processing chip has provided low-level code (e.g., boot-loader, kernel, etc.), and an OEM entity has provided high-level code (e.g., applications). The kernel includes a hardened kernel and a 'firmware' (executable code) update application that are trusted. In various embodiments, the executable code update application performs one or more portions of Update Process 1050 that are not performed by immutable hardware.

In some embodiments, the fabrication entity provides the processing chip and the low-level code as a securely bootable system. Another entity, such as an OEM entity, is enabled to add additional executable code (e.g., in the form of applications that run on top of the kernel), but is unable to compromise the low-level code. The fabrication entity is enabled to update (e.g., in the field) the low-level code, and the OEM entity is independently enabled to update the additional executable code. In further embodiments, the fabrication entity and the OEM entity use different keys (e.g., the secondary key for the fabrication entity and the tertiary key for the OEM entity) and are thus only able to update the portion of the executable code they control.

In various embodiments, Update Process 1050 is initiated by either the processing chip and/or by one of one or more entities. In a first example, the processing chip periodically and/or on when exceptional events occur (such as some type of error, detection of a threat, etc.) polls at least one of the entities to see if there's an update and/or to report status. If some error occurs or some problem (e.g., intrusion) is detected, a check for an update ensures that the processing chip is running the latest approved code. According to various embodiments, the processing chip: always contacts all of the entities; contacts at least some of the entities in a given order, such as the low-level code entity first; and/or selects the one of the entities to contact based on the type of event. In a second example, at least one of the entities periodically and/or on a need to provide an update contacts the processing chip in order to provide the update and/or to receive status. For example, bug fixes, particularly critical bug fixes, may be pushed as soon as possible.

While at least some operations of Update Process 1050 are illustrated as being sequential and in a particular order, in various embodiments at least some of the operations are performed, in whole or in part in parallel, at least partially overlapped in time, in other orders, and/or skipped entirely.

For example, in some embodiments, Secure Update Code 1070 is begun during Establish/Authenticate Secure Connection 1060 such as upon an initial connection request. Secure Update Code 1070 is then able to establish and/or authenticate a secure network connection.

In various embodiments, Update Process 1050 is performed in whole or in part by immutable hardware. In further embodiments, some control of Update Process 1050 is performed by software executing on CPU(s) 106, such as by executing Secure Update Code 1070. According to various embodiments, use of Secure Update Code 1070 is made secure by one or more of: executing Secure Update Code 1070 on a hardened operating system kernel that was securely booted by Secure Boot Process 500; executing Secure Update Code 1070 in a non-interruptible mode; executing Secure Update Code 1070 at a kernel level of an operating system; executing Secure Update Code 1070 in a private address space; other techniques for rendering software secure from viruses and malware or other software attacks; and a combination of the foregoing.

Update Process 1050 begins with Establish/Authenticate Secure Connection 1060 in which a secure connection (such as an HTTPS, SSL, OpenSSL, TLS, SSH, IPSEC, VPN, or other secure communication protocol) is established between the particular processing chip and a Network Management Center (NMC). In some embodiments, the NMC initiates the connections, such as when an update is available. In other embodiments, the particular processing chip periodically polls the NMC to see if there are any updates.

The secure connection by itself does not necessarily guarantee security because an adversary could pretend to be the NMC. Accordingly, in various embodiments, Establish/Authenticate Secure Connection 1060 next authenticates that the secure connection is indeed with the NMC. In some embodiments, the NMC sends a message which the processing chip then authenticates (as described above), and/or the data received by Copy Data to External Memory 910 (as illustrated in FIG. 9) is authenticated (also as described above).

If the establishment and/or the authentication of the secure connection fails, Update Process 1050 is aborted, and, in further embodiments, status is logged and/or a network communication is sent indicating the failure. Successful establishment and optionally authentication of the secure connection enables Update Process 1050 to proceed, enabling immutable hardware and/or Secure Update Code 1070 to perform other portions of Update Process 1050.

In some embodiments, Update Process 1050 continues with Secure Update Code 1070. According to various embodiments, Secure Update Code 1070 performs one or more of: hardware testing to ensure that hardware needed for further operations of Update Process 1050 is functional; initiating the start of immutable hardware which then performs some or all of the remainder of Update Process 1050, such as by performing Write Flash Chip 900; other hardware testing, initializations, initiating, control, and/or configuration; and a combination of the foregoing.

In some embodiments, the boot flash chip uses a dual image. For example, the processing chip is configured (by setting state in an on-chip ROM) at the manufacturing time to use either a single image or a dual image. With a dual image, there are two (or more) copies (images) of at least some of the contents of the boot flash chip stored in the boot flash chip. Using multiple images advantageously may provide immunity to bricking of the processing chip if there is a power failure during an update, as only one of the two images is being updated at a given time (and the other is available as a back-up). In further embodiments, the boot flash chip includes two or more flash chips, and each of the flash chips has a respective version of the contents of the boot flash chip. One of the respective versions of the contents is a current (most-recent) image, and the other is a previous image. In yet further embodiments, both of the images are written as part of Manufacturing-Time Procedure 700 so that both of the images are initialized and secure, and so that one of the two images is a back-up for the other.

In various embodiments where the boot flash chip uses a dual image, prior to performing Write Flash Chip 900, Update Process 1050 optionally and/or selectively copies some or all of the contents of the current image into the previous image, and then (using Write Flash Chip 900) updates some or all of the contents of the previous image. If the previous image is successfully updated, the previous image becomes the current image. In a first example of distinguishing which of the images is the current image, a sequence number is included in metadata with both of the images, and if the update succeeds, the sequence number is incremented in the previous image to be greater than the sequence number in the current image. When the processing chip is booted, it uses the one of the two images with the higher sequence number. In a second example of distinguishing which of the images is the current image, a known address in the boot flash chip contains a pointer to the current image, and the pointer is updated as a final operation after the previous image has been updated. In a third example of distinguishing which of the images is the current image, the current image is written with a given data pattern (e.g., a 4 KB chunk of zeros) at a particular location (such as a first 4 KB or a last 4 KB in the image) and the previous image is written with a different data pattern (e.g., the complement of the given data pattern) at the particular location. Continuing the third example, the previous image is 'written' by erasing the particular location subsequent to writing the particular location in the current image. If both images happen to have the given data pattern at the particular location (as might be possible if power failed during the update process just prior to the erasing), the image with the lower address is used. In a fourth example of distinguishing which of the images is the current image, a respective integrity check computed on the current and previous images is only correct for the current image, such as by over-writing the integrity check on the previous image once the current image has been written and verified. In a firth example of distinguishing which of the images is the current image, prior to writing a new image into the boot flash chip, the current image is copied over the previous image (and the copy is verified to be correct). Then, the new image is placed in a fixed part of the boot flash chip (e.g., the lower-addressed part) and, after being verified, is marked as being valid. The preferred image is always the one in the fixed part of the boot flash chip (if it is valid). Continuing the fifth example, in various embodiments external DRAM is also enabled to provide space for two images: one space for a current image loaded from the boot flash chip at boot time (such as by Secure Boot Process 500), and a second space for an 'update' image to be used to update the boot flash chip (such as by Update Process 1050).

In a first example of a boot flash chip using dual images, Update Process 1050 replaces the full contents of one image of the boot flash chip, e.g. the previous image is replaced by Write Flash Chip 900 and becomes the current image (while the prior current image becomes the new previous image). In a second example, a portion of the contents of the boot flash chip, such as an initial one or more sections, is not allowed to be changed, and that portion of the contents is copied from the current image to the previous image. Then, subsequent sections of the contents of the previous image are updated by Write Flash Chip 900.

In some embodiments, the boot flash chip includes a fabrication entity portion and an OEM entity portion, and initial writing of the boot flash chip (at manufacturing time) and subsequent updates of the executable code are performed independently for the fabrication entity portion and the OEM entity portion. In further embodiments in which a dual image is used, because the fabrication entity portion and the OEM entity portion are able to be updated independently, when the processing chip is securely booted a current version of the fabrication entity portion and a current version of the OEM entity portion are determined independently. In other embodiments with dual images where the current image is copied over the previous image prior to updating the current image, both the fabrication entity portion and the OEM entity portion are copied (to their respective previous versions), so that both the fabrication entity portion and the OEM entity portion remain in sync independent of which is updated. In yet other embodiments, a single image is used and executable code updates overwrite the existing version (of the portion of the executable code that is being updated—e.g., the fabrication entity portion or the OEM entity portion).

Update Process 1050 continues with Write Flash Chip 900, initiated, in various embodiments, either by immutable hardware in response to success of Establish/Authenticate Secure Connection 1060, and/or by Secure Update Code 1070. In some embodiments, as performed as part of Update Process 1050, Copy Data to External Memory 910 receives data from one of external I/O interface(s) 180 of the processing chip, such as a network interface. In further embodiments where Write Flash Chip 900 performs Copy Data to External Memory 910, the received data is encrypted, such as with a default one of the KMU initial keys, prior to being written to the external memory interface and is decrypted, such as with the default key, after being read from the external memory interface.

Update Process 1050 continues with Confirm Status 1080 where success or failure of Write Flash Chip 900 is logged and/or reported (such as to the NMC or another entity reachable on a network connection). In some embodiments, after reporting the success or the failure, Confirm Status 1080 tears down the secure connection created by Establish/Authenticate Secure Connection 1060. In other embodiments, reporting the failure leads to remedial action and/or diagnosis of the failure, optionally and/or selectively in cooperation with the NMC. In further embodiments, if Write Flash Chip 900 fails, any data written to an external memory is erased (such as by being overwritten with zeros).

Update Process 1050 ends (at Done 1090) after Confirm Status 1080 is complete.

Key Management Unit (KMU) and Unified Memory Controller (UMC)

Figure 11:
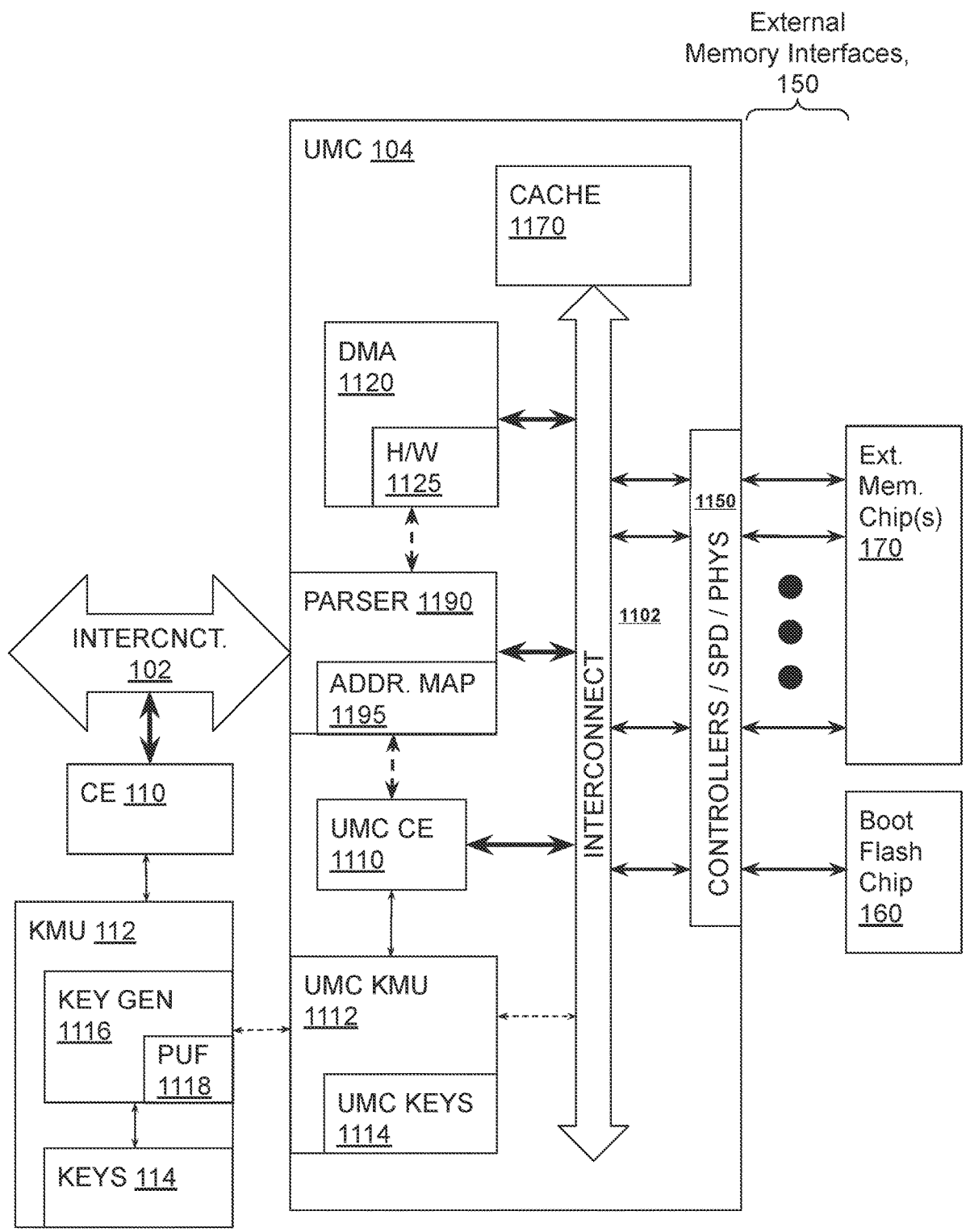
FIG. 11 illustrates examples of selected details of a portion of an embodiment of a processing chip.

FIG. 11 illustrates examples of selected details of a portion of an embodiment of a processing chip. The examples of selected details illustrated in FIG. 11 (and described below) are generally applicable to any cryptographic engine, any key management unit, and any unified memory controller, such as CE 110, KMU 112, and UMC 104 as illustrated in FIG. 1 (as part of processing chip 100), in FIG. 2 (as part of IoTC 200), in FIG. 3 (as part of IOPC 300), and in FIG. 4 (as part of SBC 400).

In some embodiments, in addition to one or more features of a unified memory controller as described above (such as in 'Unified Memory Controller'), UMC 104 includes subunits, such as one or more of interconnect 1102, UMC CE 1110, UMC KMU 1112, DMA 1120, Cache 1170, Controllers/SPD/PHYs 1150, and Parser 1190. In various embodiments, in addition to one or more features of a key management unit as described above (such as in 'Cryptographic Engine and Key Management Unit'), KMU 112 includes Key Generation 1116.

While CE 110 and KMU 112 are illustrated in FIGS. 1-4 as being separate from UMC 104, as described below, in some embodiments UMC 104 includes some or all of CE 110 and/or KMU 112, and in other embodiments UMC 104 includes separate versions of CE 110 and/or KMU 112. In a first example, UMC KMU 1112 is a portion of KMU 112 storing some of the KMU initial keys that are used by UMC 104 as part of Manufacturing-Time Procedure 700 (as illustrated in FIG. 7), Secure Boot Process 500 (as illustrated in FIG. 5), and/or Update Process 1050 (as illustrated in FIG. 10B). In a second example, UMC CE 1110 is a version of CE 110 used by UMC 104 as part of Manufacturing-Time Procedure 700, Secure Boot Process 500, and/or Update Process 1050. Other ways of distributing the functionality of CE 110, KMU 112, and UMC 104 are also contemplated. Generally, unless otherwise stated, functions and/or attributes of CE 110 are applicable to UMC CE 1110, and functions and/or attributes of KMU 112 are applicable to UMC KMU 1112.

According to various embodiments, as fabricated in a particular processing chip, one or more of: portions or all of CE 110, KMU 112, and/or UMC 104 are immutable hardware; portions or all of CE 110, KMU 112, and/or UMC 104 are autonomous hardware, and some functions of CE 110, KMU 112, and/or UMC 104 are configurable at a manufacturing time of the particular processing chip, after which the portions or the all of CE 110, KMU 112, and/or UMC 104 become immutable hardware; and a combination of the foregoing. For example, in some embodiments, KMU 112 is configured at the manufacturing time (e.g., by changing state in an on-chip ROM) to configure functions such as one or more of: a number of keys usable by software; whether software has access to public portions of particular keys that are generated as public/private key pairs; and other similar configuration options.

In further embodiments, functions of CE 110, KMU 112, and/or UMC 104 to generate keys at the manufacturing time and/or to use the generated keys at the manufacturing time or during operational use of the particular processing chip are not observable by run-time programmable CPUs in the particular processing chip. In yet further embodiments, the keys generated at the manufacturing time are inaccessible to the run-time programmable CPUs. However, in some embodiments, a private portion of a public/private key pair is inaccessible to the run-time programmable CPUs, and the public portion of the public/private key pair is accessible so that the run-time programmable CPUs are able to share the public portion with another entity, such as to establish a secure communication channel, or to authenticate a message or data. Because the private portion is only accessible to immutable hardware, security is not compromised. (Of course, it would be equivalent to allow the private portion to be accessible and the public portion to be inaccessible.)

As illustrated in FIG. 11, KMU 112 includes Key Generation 1116. Key Generation 1116 includes Physically Unclonable Function (PUF) 1118, and hardware to generate keys (not illustrated in FIG. 11) using one or more techniques as described below. In various embodiments, PUF 1118 is a hardware random number generator able to generate a random data string of a given length. For example, the random data string is generated over some period of time, such as by accumulating over some number of bits generated at some interval until the given length is reached. In further embodiments, as instantiated in a particular processing chip, PUF 1118 uses Process-sensitive, Voltage-sensitive, and/or Temperature-sensitive (PVT-sensitive) hardware so that generated random data strings vary with the environment in which the particular processing chip is operated, and are unique to the particular processing chip. In a first example, PUF 1118 uses one or more ring oscillators whose frequency of operation is PVT-sensitive. In a second example, PUF 1118 uses one or more latches (or flip-flops) whose inputs are designed to be metastable when the latches (or flip-flops) are clocked. Many types of PUFs are contemplated, any of which are usable as PUF 1118.

According to various embodiments, manufacturing-time configuration of Key Generation 1116 is used to configure one or more of: a number of keys to generate; a respective size and/or a respective type of at least some of the generated keys; inputs needed for specific key generation techniques, such as for RSA key generation or elliptic curve key generation; other configuration options for key generation; and a combination of the foregoing.

Key Generation 1116 uses one or more key generation techniques. According to various embodiments, the key generation techniques are used at a manufacturing time of a particular processing chip to generate one or more of: a primordial key; an 'unclonable unique identifier' or 'UUID'; one or more KMU initial keys, such as keys for either symmetric or asymmetric cryptographic operations; additional keys for other uses in the particular processing chip, such as for authentication of messages and/or of data; and a combination of the foregoing. In further embodiments, at least some of the key generation techniques are used during operational use of the particular processing chip to generate one or more keys for use by software executing on the run-time programmable CPUs in the particular processing chip.

The following example key generation techniques are some of the many ways contemplated to generate the primordial key, the UUID, the KMU initial keys, and/or the additional keys.

Several of the example key generation techniques use a random data string generated by PUF 1118. The random data string is combined with input data, such as with an XOR or an addition. According to various embodiments, a size of the random data string is one or more of: same as a size of the input data; same as the size of a hash, such as a SHA-256 or a SHA-512 hash; a multiple of the size of the hash; same as the length to be generated; a multiple of the length to be generated; other predetermined sizes; and a combination of the foregoing. Generally, the size of the random data string is at least as large as a size of the input data. If the size of the random data string is larger than the size of the input data, then in some embodiments, portions of the input data are used multiple times so that every bit of the random data string is combined with at least one bit of the input data.

Several of the example key generation techniques use one or more hash functions, such as a SHA-256 or a SHA-512 hash. If a length (e.g., of a key) to be generated is less than a size of the hash, a result of the hash is either truncated or is combined with itself, such as with an XOR or an addition, to reduce a size of the result to the length. If a length to be generated is greater than a size of the hash, then results of multiple hashes are concatenated. To keep results of the multiple hashes different, either the input data to be hashed is different, or the input data is combined with sufficient random data (such as a random data string generated by PUF 1118). In a first example, if a size of the input data is less than the length to be generated, then each of the multiple hashes combines the input data with a different random data string. In a second example, if the size of the input data is larger than the length to be generated, then each of the multiple hashes uses a respective portion of the input data, optionally and/or selectively combined with a respective random data string generated by PUF 1118, so that across the multiple hashes, each bit of the input data is used at least once.

A first example key generation technique used by Key Generation 1116 generates the primordial key of a given length by hashing input data such as one or more of a company name, a product line, a product name, and/or a product and/or processing chip identification (e.g., a serial number). The given length of the primordial key is a number of bits, such as 240 bits, 256 bits, or another predetermined number of bits.

A second example key generation technique used by Key Generation 1116 generates the UUID of a given length from the primordial key and a random data string generated by PUF 1118. The random data string is combined with the primordial key and hashed to produce the UUID. According to various embodiments, the given length of the UUID as generated is one or more of: 8K bits; 8704 bits; 8.6K bits; at least as large as all of the KMU initial keys together; other predetermined sizes; and a combination of the foregoing. In various embodiments, a length of the UUID as stored in on-chip ROM in Keys 114 is smaller than the given length of the UUID. The UUID is reduced in size by truncating or by hashing the UUID as generated to a smaller size, such as 2K bits or 1K bits, for storage. In further embodiments, the UUID as stored is used for key generation during operational use, such as at the request of software executing on the run-time programmable CPUs in the particular processing chip.

A third example key generation technique used by Key Generation 1116 generates one of the KMU initial keys at the manufacturing time (or alternatively, during operational use, a software-requested key) starting by combining the UUID as generated at the manufacturing time (or alternatively, during operational use, as stored) with a random data string generated by PUF 1118. As described above, an amount of the UUID to use is, according to various embodiments: same as the size of a hash; twice the size of the hash; same as a size of the particular key; twice a size of the particular key; all of the UUID; or other predetermined sizes. In further embodiments, generation of different ones of the KMU initial keys (and/or generation of different ones of keys generated during operational use) optionally and/or selectively use different, possibly overlapping, portions of the UUID.

In a first variant of the third example, a symmetric key (e.g., for AES) is generated by combining the UUID and the random data string and hashing the result to produce the symmetric key.

In a second variant of the third example, an asymmetric key (e.g., for RSA or elliptic curve cryptography) is generated from one or more previously generated symmetric keys, such as by using an asymmetric key generation technique similar to those described above (such as for Format for Encryption Technique 840).

In a third variant of the third example, an asymmetric key is generated directly from a combination of the UUID and the random data string, such as by combining the UUID and the random data string and hashing the result to produce a given length of data which is then formatted (in similar ways to those described above for Format for Encryption Technique 840) to produce the asymmetric key.

In a fourth variant of the third example, a symmetric key is generated from a previously generated asymmetric key, such as by hashing the public and/or private portions of the asymmetric key.

In various embodiments, after being generated, some or all of the primordial key, the UUID, the KMU initial keys, and/or the additional keys are stored in on-chip ROM in Keys 114 and/or in UMC Keys 1114 (as described below). In further embodiments, the ones of the KMU initial keys stored in Keys 114 are usable (such as for encryption or decryption operations by CE 110) by the run-time programmable CPUs (without being accessible by the run-time programmable CPUs), by referencing a particular one of the ones of the KMU initial keys stored in Keys 114 by a respective index (e.g., an address in the on-chip ROM). This enables the run-time programmable CPUs to specify the particular key to be used for an encryption or decryption operation. In yet further embodiments, the respective index includes information to specify which of a public or a private portion of the particular key to use. For example, an index of 0-15 uses a respective private portion of 16 of the KMU initial keys stored in Keys 114, and an index of 16-31 uses a respective public portion of the 16 keys.

In some embodiments, during operational use, software executing on the run-time programmable CPUs of the particular processing chip is able to request generation of one or more keys for software uses. In further embodiments, software is able to specify a particular type of key to be generated, such as a symmetric key, or an RSA public/private key pair, or an elliptic curve public/private key pair. According to various embodiments, a software-requested key is one or more of: stored in a register or in an on-chip memory, such as an SRAM, that is readable by the run-time programmable CPUs; stored in a register or an on-chip memory, such as an SRAM, that is inaccessible to the run-time programmable CPUs; stored in a specified region of external memory that is readable by the run-time programmable CPUs; stored in a specified region of external memory that is inaccessible to the run-time programmable CPUs, such as by not being referenced in an address map of the UMC; and a combination of the foregoing. In further embodiments where the generated key is a public/private key pair, the public (or alternatively the private) portion of the key pair is accessible to the run-time programmable CPUs, and the private (or alternatively the public) portion is inaccessible to the run-time programmable CPUs.

In various embodiments, software executing on the run-time programmable CPUs is able to specify a use (such as for encryption or decryption operations by CE 110) of a particular one of the software-requested keys by referencing the particular software-requested key via a respective index (or equivalently, a respective address, offset, or other techniques for identifying the particular software-requested key). Similar to a manner in which KMU 112 uses a respective index to specify a use of one of the KMU initial keys, the respective index of a software-requested key is used by KMU 112 (or in other embodiments, by CE 110) to retrieve the software-requested key (from the register or the memory in which it is stored) for the use. In further embodiments, such as embodiments where the software-requested keys are stored in external memory, CE 110 maintains a cache (not illustrated in FIG. 11) of the software-requested keys to provide faster access to more frequently used ones of the software-requested keys.

In some embodiments, KMU 112 is coupled to CE 110 by a wide bus, such as a bus a same width as a size of a key, or a bus the same width as one half the size of a key. By using a wide bus between KMU 112 and CE 110, latency in fetching keys from Keys 114 (for use by CE 110 in encryption or decryption operations) is reduced. In further embodiments, a similar bus couples UMC KMU 1112 to UMC CE 1110. In yet further embodiments, the width of the bus coupling KMU 112 to CE 110 is different from the width of the bus coupling UMC KMU 1112 to UMC CE 1110.

In various embodiments, Parser 1190 serves as a controller for UMC 104 during operational use. Parser 1190 receives commands and/or data via interconnect 102 (from other parts of the particular processing chip, such as from the run-time programmable CPUs), determines how to process the commands and/or how to route the data, controls one or more sub-units of UMC 104 to perform the commands, and returns results (including in some cases resulting data) via interconnect 102 back to the other parts of the particular processing chip. In further embodiments Parser 1190 is unused, is disabled, and/or is disabled except for a bridge function during operations such as Manufacturing-Time Procedure 700, the hardware portion of Secure Boot Process 500, and/or Update Process 1050. For example, during Manufacturing-Time Procedure 700, UMC CE 1110 is controlled by Hardware 1125 (via DMA 1120), and during operational use UMC CE 1110 is controlled by Parser 1190.

In some embodiments, interconnect 1102 is used to interconnect various sub-units of UMC 104. According to various embodiments, interconnect 1102 is a same architecture as interconnect 102, or is a different architecture than interconnect 102. In some embodiments (as illustrated in FIG. 11), Parser 1190 serves as a bridge between interconnect 102 and interconnect 1102. In other embodiments (not illustrated in FIG. 11), Parser 1190 is not coupled to interconnect 102, and instead interconnect 1102 is a lower-level interconnect in an interconnect hierarchy and is directly coupled to interconnect 102. In this other embodiment, Parser 1190 receives commands and/or data via interconnect 1102 rather than directly via interconnect 102.

In various embodiments, Parser 1190 is able to route data among one or more of the sub-units of UMC 104 via interconnect 1102. In further embodiments, Parser 1190 includes one or more dedicated paths for routing some or all of the data, such as a dedicated path to DMA 1120 and/or a dedicated path to UMC CE 1110. According to various embodiments, data is moved (by Parser 1190, DMA 1120 and/or other sub-units in UMC 104) in units of one or more of: a predetermined size, such as a size of a cache line (e.g., a 512-byte cache lines); a multiple of a size of the cache line, such as a size of four cache lines; a fraction of the size of the cache line, such as one fourth of a cache line; a size and/or a multiple of a size of a page of non-volatile memory, such as an 8K-byte NAND flash page; a width and/or a multiple of the width of interconnect 102 and/or interconnect 1102; a size requested for a particular operation; other techniques used in ASICs and/or SoCs for determining a unit of data transfer; and a combination of the foregoing.

Controllers/SPD/PHYs 1150 in FIG. 11 illustrate the external memory controllers, Serial Presence Detect (SPD) hardware, and physical interfaces that are connected to external memory interfaces 150. For example, a first one of Controllers/SPD/PHYs 1150 connects to boot flash chip 160, and a second one of Controllers/SPD/PHYs 1150 connects to one or more of external memory chip(s) 170. A first example of one of the external memory controllers is a DDR DRAM memory controller that interfaces with DRAMs supporting the DDR3 or DDR4 standards. A second example of one of the external memory controllers is a NAND flash controller that interfaces with NAND flash chips supporting the ONFI-4 standard. Continuing the second example, in further embodiments, the NAND flash controller provides higher-level interface functions, such as a flash file system, wear-leveling, and scrubbing.

As illustrated in FIG. 11, two or more of Controllers/SPD/PHYs 1150 are coupled to interconnect 1102. In further embodiments (not illustrated in FIG. 11), at least some of Controllers/SPD/PHYs 1150 are coupled to a lower-level, hierarchical bus which is in turn coupled to interconnect 1102. For example, a group of lower-speed external memory interfaces are aggregated together on a lower-level, hierarchical bus and share one connection to interconnect 1102.

In some embodiments, UMC Keys 1114 is coupled to UMC CE 1110 in a similar manner to the coupling between Keys 114 and CE 110. In other embodiments, UMC Keys 1114 is coupled to UMC CE 1110 via interconnect 1102. In various embodiments, UMC Keys 1114 serves a similar function to Keys 114 (without Key Generation 1116). In further embodiments, UMC CE 1110 serves a similar function to CE 110, but UMC CE 1110 is not usable by the run-time programmable CPUs, and is only used by UMC 104.

According to various embodiments, UMC CE 1110 implements encryption and decryption techniques that are one or more of: a subset of the encryption and decryption techniques implemented by CE 110; same as the encryption and decryption techniques implemented by CE 110; and have at least some encryption and decryption techniques different from those implemented by CE 110.

In various embodiments, Key Generation 1116, at the manufacturing time, generates two or more keys, such as 17, 18, or 19 keys, a first portion of the keys, such as 16 of the keys, are stored in Keys 114 and are available for S/W uses, and a second portion of the keys, such as one, two, or three of the keys, are sent to UMC KMU 1112 to be stored in UMC Keys 1114 for use by UMC 104 (via UMC CE 1110).

According to various embodiments, the keys are sent to UMC Keys 1114 via one or more of: a direct path from Key Generation 1116 to UMC KMU 1112; via CE 110, interconnect 102, Parser 1190, UMC CE 1110, to UMC KMU 1112; via CE 110, interconnect 102, Parser 1190, interconnect 1102, to UMC KMU 1112; and other similar paths to send keys generated by Key Generation 1116 to UMC KMU 1112. In other embodiments (not illustrated in FIG. 11), UMC 104 includes a version of Key Generation 1116 and, at the manufacturing time, generates keys to be stored in UMC Keys 1114 internally. Similar to keys stored in Keys 114, keys stored in UMC Keys 1114 are inaccessible by the run-time programmable CPUs in the particular processing chip, and are only accessible during operational use by immutable hardware. In further embodiments, keys stored in UMC Keys 1114 are not able to be specified for use in encryption and/or decryption operations by the run-time programmable CPUs.

According to various embodiments, one or more keys stored in UMC Keys 1114 are used by UMC CE 1110 for one or more of: encryption and/or decryption of data written to and/or read from the boot flash chip; authentication of messages and/or data used as part of writing data to the boot flash chip, either initially at the manufacturing time or during operational use as part of an update process (such as Update Process 1050); encryption and/or decryption of some or all data written to and/or read from external memory other than the boot flash chip; other uses of keys by UMC 104; and a combination of the foregoing. In further embodiments, one of the one or more keys stored in UMC Keys 1114 is a default one of the keys generated by Key Generation 1116 at the manufacturing time, and the default key is used to encrypt some or all data written to external memory, and to decrypt some or all data read from external memory.

In some embodiments, Hardware 1125 includes autonomous hardware that at the manufacturing time is enabled to perform at least a part of Manufacturing-Time Procedure 700, that becomes immutable hardware after manufacturing time, and that is then enabled to perform the hardware portion (such as the H/W boot sequence) of Secure Boot Process 500 and/or Update Process 1050. While shown as part of DMA 1120 in FIG. 11, in various embodiments Hardware 1125 includes DMA 1120. In further embodiments, Hardware 1125 is located in whole or in part in other sub-units of UMC 104, such as in Parser 1190 and/or in UMC CE 1110. In yet further embodiments, Hardware 1125 is enabled, at the manufacturing time, to control Key Generation 1116 and/or other units outside of UMC 104 to perform parts of Manufacturing-Time Procedure 700.

In various embodiments, Hardware 1125 includes autonomous and/or immutable hardware that is enabled to perform functions in a secure manner so that the functions are not observable, either by the run-time programmable CPUs or external to the processing chip. In a first example, as part of Manufacturing-Time Procedure 700 and/or Update Process 1050, Hardware 1125 is enabled to control DMA 1120 to perform the data movement associated with Write Flash Chip Process 900 (as illustrated in FIG. 9). In a second example, as part of Secure Boot Process 500, Hardware 1125 is enabled to control DMA 1120 to perform Initialize External Memory 545 and/or Copy 550 (as illustrated in FIG. 5). In a third example, as part of Manufacturing-Time Procedure 700 and/or Secure Boot Process 500, Hardware 1125 uses Controllers/SPD/PHYs 1150 to perform the SPD operation (e.g., SPD 530 as illustrated in FIG. 5) on at least some of external memory interfaces 150 and to configure those external memory interfaces for communication with the particular processing chip. In a fourth example, as part of Configure Memory Communication 540 (as illustrated in FIG. 5), Hardware 1125 is enabled to generate and/or configure an initial version of an address map (such as Address Map 1195) supporting addressing of one or more of external memory chip(s) 170 found as part of SPD 530. In a fifth example, Hardware 1125 is enabled to control all of Manufacturing-Time Procedure 700. In a sixth example, Hardware 1125 is enabled to control the hardware portion of Secure Boot Process 500. In a seventh example, Hardware 1125 is enabled to control some or all of Update Process 1050, such as Write Flash Chip Process 900 and/or Confirm Status 1080.

In some embodiments DMA 1120 (without Hardware 1125) is a DMA engine, similar to DMA 220, is not usable by the run-time programmable CPUs, and is usable by Hardware 1125 at manufacturing time (such as for Manufacturing-Time Procedure 700) and/or during operational use (such as for Secure Boot Process 500 and/or Update Process 1050). In various embodiments, DMA 1120 includes an internal buffer (e.g., SRAM) used to buffer data being transferred by DMA 1120. For example, to perform a DMA data transfer from external memory to the boot flash chip, DMA 1120 performs a read operation from external memory into the internal buffer, and then performs a write operation from the internal buffer to the boot flash chip via UMC CE 1110. In further embodiments, DMA 1120 includes hardware circuitry to perform integrity checks (not illustrated in FIG. 11) on data that passes through DMA 1120. For example, DMA 1120 is enabled to perform Integrity Check 560 as part of performing Copy 550 (as illustrated in FIG. 5). In yet further embodiments, hardware circuitry to perform integrity checks is located additionally and/or alternatively with the external memory controllers (as part of Controllers/SPD/PHYs 1150) for the external memory interfaces having the integrity checks. For example, when one of the integrity checks used with data stored in NAND flash is an error-correcting code, such as an LDPC error-correcting code, hardware circuitry to perform generation and checking of the LDPC error-correcting code is part of a NAND flash external memory controller in Controllers/SPD/PHYs 1150.

In various embodiments, DMA 1120 performs the data movement associated with Manufacturing-Time Procedure 700, with Secure Boot Process 500, and/or with Update Process 1050, such as copying data between the boot flash chip and external memory (optionally and/or selectively via UMC CE 1110 to encrypt and/or decrypt the data along the way). In a first example, DMA 1120 performs parts of Write Flash Chip Process 900, such as the loop of operations from Stream Data In 920 to More Data? 950, and/or the data movement portion of Copy Data to External Memory 910 (as illustrated in FIG. 9). In a second example, DMA 1120 performs parts of Secure Boot Process 500, such as Initialize External Memory 545, Copy 550, and/or Integrity Check 560 (as illustrated in FIG. 5).

In some embodiments, Parser 1190 includes and/or is coupled to Address Map 1195. Address Map 1195 includes an address map that associates one or more ranges of addresses (in a physical address space used by UMC 104) with one or more respective ones of external memory chip(s) 170. Initial contents of Address Map 1195 are configured as part of Secure Boot Process 500 so that the run-time programmable CPUs are able to complete CPU Fetch 590 and start S/W Boot Sequence 592 (as illustrated in FIG. 5). As part of S/W Boot Sequence 592 and/or subsequently during operational use, the run-time programmable CPUs are able to modify at least some parts of Address Map 1195, such as by including one or more of external memory chip(s) 170 that were not used as part of Secure Boot Process 500.

According to various embodiments and/or usage scenarios, UMC CE 1110 during operational use is one or more of: controlled via Parser 1190 and according to Address Map 1195, such as by having certain address ranges optionally and/or selectively route data to or from external memory via UMC CE 1110 for encryption or decryption; enabled to be used on all accesses to external memory; disabled from use on any accesses to external memory; selectively bypassed under control of Parser 1190 according to a command received via interconnect 102, if such bypassing is enabled during operational use; and a combination of the foregoing. For example, in some embodiments, at least some data transfers from external memory to one of external I/O interface(s) 180 via I/O unit 118 are enabled to bypass decryption by UMC CE 1110 so that encrypted data is written to an I/O device. Continuing the example, at least some data transfers from the I/O device to external memory are enabled to bypass encryption by UMC CE 1110 so that encrypted data read from the I/O device is written to external memory. This advantageously enables data stored in the I/O device to have a same level of protection as data stored in external memory.

In some embodiments, encryption or decryption performed by CE 110 is transparent to UMC 104 (and is controlled by hardware outside of UMC 104). In other embodiments, CE 110 is controlled at least in part by UMC 104, and control of CE 110 (as well as data routing) is provided via Parser 1190. In further embodiments, CE 110 includes UMC CE 1110. In various embodiments, both CE 110 and UMC CE 1110 are able to encrypt data being written to external memory and/or are able to decrypt data read from external memory. For example, a write to external memory as performed by DMA 220 (illustrated in FIG. 2 and FIG. 3), as controlled by the run-time programmable CPUs, specifies encryption via CE 110 using a private portion of a specific one of the KMU initial keys, and data being written is encrypted by CE 110 and then also by UMC CE 1110 using the default key, so that the data as stored in the external memory is double-encrypted. Continuing the example, the double-encrypted data is later read from the external memory (via DMA 220), is decrypted by UMC CE 1110 using the default key, and bypasses CE 110. The (now) single-encrypted data is sent via I/O unit 118 on one of external I/O interface(s) 180, such as over a network connection, to another entity to which a public portion of the specific key has been communicated.

In some embodiments, Parser 1190 (and thus UMC 104) is controlled and/or configured during operational use (at least to an extent allowed by state in on-chip ROMs) by commands received via interconnect 102 and/or by state and/or changes of state in Control/Status Registers (CSRs) of UMC 104. According to various embodiments, the CSRs (not illustrated in FIG. 11) are read, written, or otherwise modified by one or more of: commands received by Parser 1190 (via interconnect 102); a CSR control bus separate from interconnect 102; other ways of reading, writing or modifying CSRs as used in ASICs and/or SoCs; and a combination of the foregoing. Of course, in various embodiments, operations controlled via commands are alternatively and/or additionally, in other embodiments, controlled via CSRs, and vice versa.

According to various embodiments, the commands processed by Parser 1190 include commands to one or more of: read and/or write Control/Status Registers (CSRs) of UMC 104, such as CSRs that are enabled to be read and/or modified during operational use; read data from or write data to external memory at a given address, as mapped by Address Map 1195 to an address in a particular one or more of external memory chip(s) 170, optionally and/or selectively for a given length; as part of a read and/or a write command for external memory and as enabled during operational use, enable, disable, or bypass encryption and/or decryption by UMC CE 110; initiate operations, such as initiating some or all of an update process, such as Update Process 1050; diagnostic instructions, such as diagnostic reads and/or writes of external memory and/or of Cache 1170, if these are enabled during operational use; other similar commands for controlling and/or using a memory controller, such as a DDR memory controller; and a combination of the foregoing.

According to various embodiments, CSRs of UMC 104 include one or more of: CSRs used to control the respective reset state of one or more of the run-time programmable CPUs; CSRs that form at least part of Address Map 1195 used by UMC 104; CSRs used to control and/or read results of SPD hardware in Controllers/SPD/PHYs 1150; CSRs to configure and/or control external memory controllers in Controllers/SPD/PHYs 1150, such as to initiate a training sequence; CSRs to configure and/or control Cache 1170; CSRs to configure and/or control use of some external memory (such as some portion or all of external DRAM) as a cache for one or more external non-volatile memory chips (such as NAND flash chips); CSRs to initiate some or all of an update process, such as Update Process 1050; CSRs to perform an orderly shutdown and/or restart of the particular processing chip; CSRs for controlling diagnostics; CSRs for reporting status information; other CSRs used in ASICs and/or SoCs; and a combination of the foregoing.

According to various embodiments, Cache 1170 includes one or both of: a higher-level cache for data accessed by other units (outside of UMC 104) in the particular processing chip, such as a cache for data accessed by the run-time programmable CPUs; and a cache for at least some non-volatile memory chips (other than the boot flash chip), such as NAND flash chips, that are attached to the particular processing chip. In either the higher-level cache or the non-volatile memory (NVM) cache embodiment, according to further embodiments data that is cacheable is respectively selected by one or more of: a read or write command received by Parser 1190 specifying that corresponding data is either cacheable or uncacheable; one or more ranges of addresses (in Address Map 1195) that are configured to be cacheable; one or more of external memory chip(s) 170 that are configured, such as by state in CSRs or in on-chip ROM, to be cacheable; a CSR setting that all external memory (other than the boot flash chip) is cacheable; a CSR setting that no external memory is cacheable; other techniques used in ASICs and/or SoCs for determining cacheability; and a combination of the foregoing.

In some embodiments, a higher-level cache included in Cache 1170 is a higher-level cache as described above (such as in 'Caches'). The higher-level cache typically caches units of a same size as a data transfer unit to/from UMC 104, such as a 512-byte cache line. For example, where the run-time programmable CPUs have an associated L2 cache, the higher-level cache is an L3 cache, and is typically a multi-way set associative cache using on-chip SRAM. In further embodiments, cache tags of the higher-level cache are in an on-chip SRAM, while data of the higher-level cache is in an external memory, such as an external SRAM.

In some embodiments, a cache for non-volatile memory chips (an NVM cache) included in Cache 1170 is similar to the caches described above, but due to an amount of storage in the at least some non-volatile memory chips, cache data and/or cache tags are maintained in an external volatile memory (such as DRAM) and control for the NVM cache is in the particular processing chip. The higher-level cache typically caches units of a same size as a unit of the at least some non-volatile memory chips, such as an 8K-byte of 16K-byte page for NAND flash chips. Caching of larger units advantageously reduces a number of cache tags needed by the NVM cache. In further embodiments, the NVM cache includes an on-chip 'tag cache' to cache some of the cache tags of the NVM cache so as to provide faster access to frequently accessed data. In yet further embodiments, a size of the NVM cache (an amount of external volatile memory used to hold cache data of the NVM cache) is specified by CSRs. In some embodiments, the NVM cache is initially configured as part of Secure Boot Process 500 (e.g., by Hardware 1125) so that it is available to the run-time programmable CPUs as part of the S/W boot sequence, such as by reserving a portion or all of external volatile memory for the NVM cache by not including it in Address Map 1195, but including the at least some non-volatile memory chips in Address Map 1195. In further embodiments, the run-time programmable CPUs are able to configure and/or modify the configuration of the NVM cache during operational use.

Keys Used for Executable Code Updates

In some embodiments, one or more key pairs are generated and used for receiving and/or storing an executable code update. In some embodiments, these are the same keys used when the boot flash chip is initially written, either to receive the executable code to be written (using a procedure similar to that of an executable code update), and/or the keys that are used to encrypt the corresponding portion of the executable code as stored in the boot flash chip. In other embodiments, the executable code stored in the boot flash chip is encrypted with a different one or more keys than the keys used to transfer the executable code (initial and/or update).

In various embodiments, the key pairs are generated when an entity is initializing the chip. In a first example, a fabrication entity enables the creation of its key pair (called the 'secondary' key in the present disclosure) at the chip-level manufacturing time of the processing chip (e.g., when the boot flash chip is initially associated with the processing chip). In a second example, an OEM entity enables the creation of its key pair (called the 'tertiary' key in the present disclosure) at a system-level manufacturing time (e.g., when the processing chip is installed in a system). Of course, in various embodiments there are less than or more than two entities, each controlling their own portion of the executable code, and each with a respective key pair. For example, as part of the manufacturing-time procedure for a given one of the entities, unencrypted executable code stored in DRAM is copied to the boot flash chip, and then on-chip state is changed so that any executable code updates must be provided in an encrypted format. The public portion of a public private key pair used to encrypt the executable code updates is made available at the manufacturing time, such as by autonomous hardware posting it to DRAM, where it is able to be read and saved (by the given entity).

In some embodiments, the secondary key is the default key. In further embodiments, all of the executable code in the boot flash chip is encrypted with the default key (even if the executable code was provided by an entity with its respective key). In other embodiments, the same key used to encrypt a portion of the executable code (e.g., the fabrication entity's portion or the OEM entity's portion) for storage in the boot flash chip is also used to encrypt an executable code update for that portion that is communicated to the processing chip.

Various ways of generating the key pair to be used by a given entity are contemplated. In a first example, a key pair is generated by the processing chip using a known (to a given entity) technique from the primordial key (or using the known factors used to make the primordial key). The processing chip has a copy of the key pair (or at least one part of it), and the given entity is able to create the other part of the key pair using the known technique. Because the key is based on the primordial key (or its components) the key is associated with the processing chip, but does not incorporate information from a PUF, and is not externally unknowable. If more than one entity uses a known technique to generate a key pair from known factors, the known techniques used by two such entities are, in various embodiments, optionally and/or selectively different. For example, the known techniques use elliptic curve cryptography, but use different initial points on the elliptic curve and/or different elliptic curve parameters. In a second example, a key pair is generated by the processing chip using any desired technique (including using the PUF), and the public part of the key is provided to a given entity. The private part of the key pair is only accessible to the processing chip, and in some embodiments, the public part of the key pair is disabled from being provided a second time after the given entity has obtained it. According to various embodiments, the public part of the key pair is provided on outputs of the processing chip, is posted in DRAM as part of the initial writing of the executable code to the boot flash chip, is readable by a CPU of the processing chip, and/or another technique that allows the public part of the key pair to be provided externally to the processing chip at least one time. (However, it is equivalent for the processing chip to protect the 'public' part of the key pair and to provide the 'private' part to the given entity.) In further embodiments, as with the KMU initial keys, if the key pair is generated by the processing chip using the PUF, the private part of the key pair is never exposed, and is never accessible by a run-time programmable CPU.

In various embodiments, after creation of a key pair, state in an on-chip ROM is changed so that a key pair for that purpose (e.g., for updating of low-level code stored in the boot flash chip) is not able to be generated again. In further embodiments, the same and/or additional state in an on-chip ROM is changed so that a public part of the key pair is no longer readable. That is, once the entity has obtained the public part of the key pair, any reading (or posting) of the key pair is disabled. In further embodiments, the key pairs for encrypting executable code updates and/or for writing to the boot flash chip are not usable by a run-time programmable CPU (for any operation).

While the description above uses (public/private) key pairs for encrypting and decrypting the executable code updates, in other embodiments, any of the key pairs is alternatively a symmetric key (so that the entity and the processing chip use the same, symmetric key). Such a system is possibly simpler, and is possibly less secure as the symmetric key is knowable outside of the processing chip (and is only as secure as the entity is able to maintain it).

Executable Code Update Format

An executable code update is a stream of data received by the processing chip, such as over a network connection as a stream of one or more packets. In some embodiments, the packets are sequenced in some fashion (e.g., sequence numbers) so that missing packets are detectable. In various embodiments, a total number of packets and/or a total size of the firmware is known so that it can be determined when the full executable code update is received. In other embodiments, the executable code update is structured as one or more sections, and headers on the sections identify a size of each section and a last one of the sections. In yet other embodiments, a communication protocol is used to determine when the full update has been received.

In a first example, the packets are sent via UDP as fixed-size (e.g., 1 KB or 4 KB payload) chunks of the executable code (with padding on a last one of the chunks, if necessary), and each chunk has its own lightweight header with a packet sequence number. In a second example, the packets are sent via TCP using TCP's (byte-ordered) sequence numbering. Two separate network (e.g., TCP) ports are used: one for a control path and one for a data path. In a third example, the control path is used to indicate a start of the executable code update, and then the transfer of the executable code happens over the data path. When a last packet is sent on the data path and acknowledged back to the sender (e.g., via TCP ACKs), the control path is able to signal completion of reception and/or issue a command to copy the executable code update to the boot flash chip.

In various embodiments, the format for an executable code update has a cleartext (e.g., human readable) header with a description of the update (e.g., its purpose, installation directions, etc.). (For example, this may be before the one or more sections in those embodiments.) In a first example, the cleartext header has a fixed size (e.g., 1 KB or 4 KB) so that it can be easily skipped (not written to the boot flash chip). In a second example, the cleartext header itself has a size (e.g., a length) indication (or is a special section in those embodiments) and is similarly skipped. In a third example, the cleartext header is a separate section, and is written to flash—it is either not be copied to DRAM on a reboot, and/or is not put in an address map.

In some embodiments, each entity controlling a portion of the executable code in the boot flash chip is able to provide an executable code update as one or more sections. The two portions of the executable code (e.g., the fabrication entity's portion and the OEM entity's portion) are kept separate and are treated independently. A known boundary is used in the boot flash chip: everything below address X is usable by the fabrication entity, and everything at or above address X is usable by the OEM entity. When the processing chip is securely booted, the boot process first loads the fabrication entity's portion (the sections located below address X) and then loads the OEM entity's portion (the sections located at or above address X). If a 'ping-pong' (dual-image) arrangement of two copies of the executable code is used, a current version of the fabrication entity's portion may not necessarily be in a same one of ping or pong as a current version of the OEM entity's portion (since either portion may have been independently updated, moving a current version between ping and pong). The value X is, according to various embodiments, implicit (e.g., fixed in hardware), stored in on-chip ROM, and/or stored as part of the executable code update application.

A fixed value of 'X' may imply that each portion is limited to a predetermined maximum size. Alternatively, in some embodiments, the fabrication entity is able to change the value of 'X'. For example, if 'X' is stored with the fabrication entity's portion (e.g., as part of a header of one of the sections of the executable code), an executable code update of the fabrication entity's portion is enabled to change X.

In one example with a single image, the boot flash chip is divided in half, and one half is used for the fabrication entity and the other half for the OEM entity. In another example with dual image, the boot flash chip is divided in quarters, and two of the quarters (such as the first and second) are used for the fabrication, and the other two of the quarters (such as the third and fourth) are used for the OEM entity.

DRAM Protection for Executable Code Updates

In some embodiments, a portion of (external) DRAM used to store the executable code update is not present in an address map (e.g., an address map in the UMC) used by run-time programmable CPUs in the processing chip, and hence the executable code update is inaccessible to and cannot be seen or modified by software. A DMA engine, such as a DMA engine in the UMC, is able to read and/or write the portion of DRAM (under H/W control), but only immutable hardware is able to access that memory. For example, when setting up the initial address map, the UMC is able to reserve a portion of DRAM for executable code updates and does not expose that portion of DRAM to software. In further embodiments where software is able to read SPD data from DRAM chips, the UMC is able to 'spoof' some of that data in order to fully hide the reserved portion of DRAM from software. In these embodiments, all writing and reading of the portion of the DRAM is performed by immutable hardware.

In other embodiments, the portion of DRAM used to store the executable code update is present in an address map used by run-time programmable CPUs in the processing chip, and the portion of DRAM is protected using Physical Memory Protection (e.g., PMP) features of the CPUs (such as RISC-V CPUs). For example, the low-level code (e.g., the hardened kernel) ensures that the portion of DRAM is protected using the PMP bits so that only the executable code update application is able to write to it. In further embodiments, the executable code update application only has write access (and no application has read access) to the portion of DRAM. A first DMA engine that is usable by the CPUs (e.g., DMA 220 as illustrated in FIG. 2) is able to be programmed by the executable code update application to transfer data between an I/O port (e.g., a Gigabit Ethernet network port) and the portion of DRAM, but no other application is able to similarly enable the DMA engine to read and/or to write the portion of DRAM. For example, the first DMA engine 'mirrors' the PMP bits (e.g., it uses the same PMP bits as the application/process that programmed it for a particular operation). In further embodiments, the portion of DRAM is only readable using a separate DMA engine (e.g., DMA 1120 as illustrated in FIG. 11) that is controlled by immutable hardware.

In various embodiments, software is able to use the first DMA engine, and one channel of the first DMA engine is reserved for the executable code update transfers, and/or one channel is allocated when the executable code update commands are executed.

UMC Role in Executable Code Updates

In various embodiments, the UMC's mini-KMU holds the secondary and tertiary keys (and/or just copies of them— they are optionally and/or selectively stored in the main KMU), as well as key(s) used to write to and read from the boot flash chip (if those keys are different). All encryption/decryption of the executable code update (and the executable code itself) is performed by the UMC's mini-KMU.

According to various embodiments, the UMC also includes a DMA engine (e.g., DMA 1120 as illustrated in FIG. 11) and this DMA engine is used for one or more of: copying the executable code from external DRAM to the boot flash chip at manufacturing time; copying the executable code from the boot flash chip to external DRAM as part of the boot process; copying an executable code update from an I/O interface (e.g., a NIC) to the portion of DRAM (which, as described above, in some embodiments is alternatively performed by a separate DMA engine outside of the UMC, such as DMA 220 as illustrated in FIG. 2); and/or copying an executable code update from the portion of DRAM to the boot flash chip as part of the update process. One or more of the preceding operations are performed with encryption, decryption, re-encryption, etc. as necessary. The UMC DMA engine is enabled to use an address range (in the UMC's address map) corresponding to the portion of DRAM used for the executable code update. This address range is protected (as described above): e.g., run-time programmable CPUs of the processing chip have no access to the portion of DRAM (with the exception, in some embodiments, of the executable code update application as described above). In some embodiments, the UMC parser (parser 1190) is responsible for converting a special command to the UMC into the appropriate DMA controls for the necessary data transfer (and encryption/decryption/re-encryption/integrity checking) operations.

In some embodiments, the UMC appears to the run-time programmable CPUs as a DDR memory controller optionally and/or selectively extended with special commands. For example, one or more of the four copy operations above each has their own special UMC command. Notably, after establishing a secure connection, software (e.g., the executable code update application) executing on the run-time programmable CPUs is enabled to give a command to the UMC to cause it to copy an executable code update from the NIC to the portion of DRAM. Continuing the example, software is able to obtain a result of the command, and if it was successful, is enabled to give a subsequent command to the UMC to cause it to copy the executable code update from the portion of DRAM to the boot flash chip. Software is further enabled to report results of either or both of these commands over the secure connection.

In various embodiments, the UMC performs the special commands using a FSM or other autonomous (at manufacturing time) or immutable (after manufacturing time) hardware. In further embodiments, the special commands are provided with each piece of data transferred to the portion of DRAM. For example, normal DDR memory commands are enabled to write to any attached memory except for the portion of DRAM (where the executable code update is stored), and the special commands are enabled to write to the portion of DRAM.

In further embodiments, there are command modifiers (or equivalently, separate commands) indicating whether a given one of the special commands is for the fabrication entity (and uses the secondary key) or is for the OEM entity (and uses the tertiary key). According to various embodiments, a use of the secondary vs. the tertiary key (e.g., which of the command modifiers to use) is controlled by one or more of: immutable hardware associating a network address of the communication providing the executable code update with either the fabrication entity or the OEM entity; immutable hardware determining that a communicating entity is the fabrication entity or the OEM entity based upon an authentication using the secondary or the tertiary key, respectively; either of the preceding performed in software by the executable code update application; and/or trusting the communicating entity to specify which of the fabrication entity or the OEM entity it is—any attempt to 'cheat' is detectable when integrity checks of the executable code update are performed, as only the one of the entities with the corresponding key is able to generate the executable code update that passes the integrity check using the corresponding key.

Executable Code Secure Connection via VPN

In some embodiments, a Virtual Private Network (VPN) is used as part of the secure connection with a given entity enabled to provide an executable code update. For example, a VPN (with the given entity) is configured at manufacturing time by providing details to the processing chip. The VPN is provided with an IP address for the external entity, a shared secret (e.g., a pre-shared key), and the VPN connection is set up so that the tunnel ID and session ID are created (and all these parameters are saved in the processing chip).

Update Process Details

Figure 12:
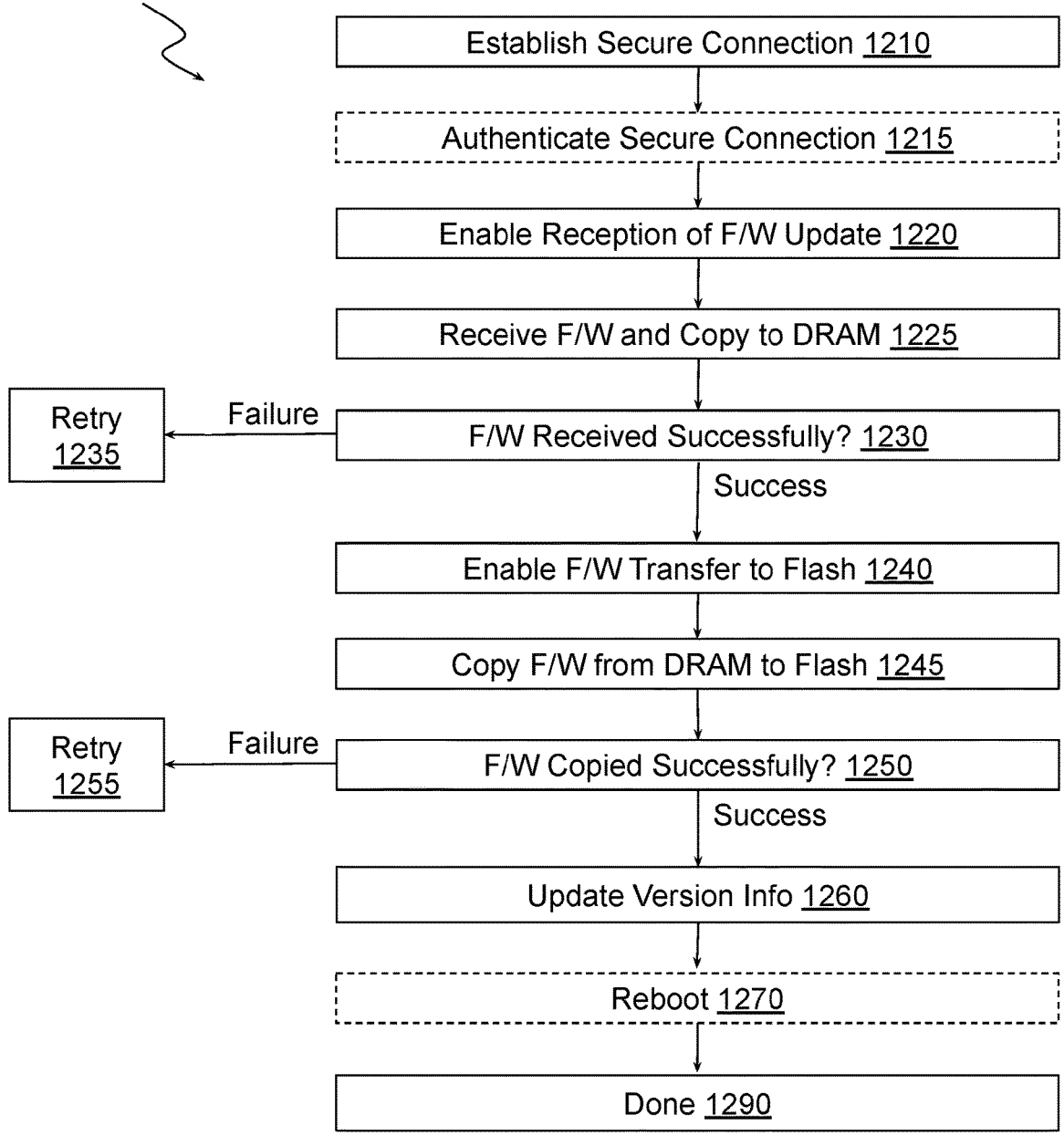
FIG. 12 illustrates examples of selected details of a process used to update some or all executable code stored in a boot flash chip.

FIG. 12 illustrates an example of selected details of an embodiment of a process used to update some or all executable code (e.g., firmware) stored in a boot flash chip. Executable Code Update Process 1200 illustrates an example process flow for securely performing an executable code update on a securely bootable processor. In various embodiments, Executable Code Update Process 1200 is a more detailed version of Update Process 1050 as illustrated in FIG. 10B.

While at least some operations of Executable Code Update Process 1200 are illustrated as being sequential and in a particular order, in various embodiments at least some of the operations are performed, in whole or in part in parallel, at least partially overlapped in time, in other orders, and/or skipped entirely. For example, in some embodiments, Copy Executable Code from DRAM to Flash 1245 is performed at least partially overlapped in time with Receive Executable Code and Copy to DRAM 1225.

In various embodiments, Executable Code Update Process 1200 begins with Establish Secure Connection 1210. In some embodiments, low-level code (e.g., a low-level kernel) is used to establish the secure connection. For example, the secure connection is made using a VPN (where each party has a shared secret, such as a pre-shared key). Generally, VPN's are immune to man-in-the-middle attacks, as compared to other types of secure connections (e.g., HTTPS, TLS, SSL, IPSEC, etc.). According to various embodiments, the shared secret (e.g., a key) is one or more of: derived by both parties from inputs similar to the primordial key; the same as the secondary or the tertiary key (depending on which entity is being connected to); a separate one or more respective keys per entity (or similar random information) that were generated at the manufacturing time of the processing chip; a separate one or more respective keys per entity (or similar random information) that were provided to the processing chip at the manufacturing time; stored in the KMU; stored in some memory other than in the KMU; and a combination of the foregoing.

In some embodiments, Establish Secure Connection 1210 is performed under software control, such as by the executable code update application (running in a secure environment). In other embodiments, all operations of Executable Code Update Process 1200 including Establish Secure Connection 1210 are performed in hardware. For example, Establish Secure Connection 1210 is performed in hardware by the processing chip expecting a connection from a particular IP address on a particular network (e.g., TCP) port.

In various embodiments, each entity having a key (e.g., each entity controlling a portion of the executable code) has its own VPN address (e.g., an IP address) and associated data (e.g., a key). In further embodiments, the VPN address is associated with the key (and other information related to the VPN and/or to a corresponding executable code update) so that a connection to and/or from that VPN address uses the corresponding information. For example, a connection from the fabrication entity uses the VPN parameters associated with the fabrication entity, as well as using the secondary key for any necessary decryption. In other embodiments, any entity is able to make a VPN connection, but only the fabrication entity and/or the OEM entity are able to pass further checks (e.g., authentication and/or integrity checks on the executable code update itself).

In some embodiments, the secure connection uses at least two ports (e.g., TCP ports). A first port is used for control communications, and a second port is used for data communications. A protocol such as TCP provides acknowledgements of packet reception, and thus has built-in 'handshaking' ensuring successful arrival of packets. (Alternatively, another protocol, such as UDP, is used on one or more of the ports and any handshaking is performed in some other fashion, such as explicitly sending 'acknowledgment' packets.)

In various embodiments, Establish Secure Connection 1210 uses some type of network I/O connection, which is optionally and/or selectively wired (e.g., Ethernet) and/or wireless (e.g., 802.11/Wi-Fi).

In some embodiments, Executable Code Update Process 1200 continues with Authenticate Secure Connection 1215. This is an optional operation to perform additional authentication of the connections, as described above. This operation may be optional because it is no more or less secure than the VPN, and neither may be as secure as the executable code update process itself. The key information used in this authentication is, for example, any of the types described above for Establish Secure Connection 1210, and in some embodiments is the same key as used above. In various embodiments, this operation is performed by the executable code update application.

In some embodiments, Executable Code Update Process 1200 continues with Enable Reception of Executable Code Update 1220. This operation enables hardware paths for the transfer of the executable code update from an I/O interface (e.g., a NIC) to DRAM. For example, in some embodiments, this includes setting up a DMA controller so that certain packets from the NIC are processed and sent to certain portions of DRAM. In some embodiments, the executable code update application enables this operation (e.g., setting up the DMA controller), such as in response to a command received over the secure connection. In other embodiments, this operation is performed in hardware.

In various embodiments, after the secure connection (e.g., VPN) is set up, a command (to the UMC) enables all subsequent packets received on the VPN (at a particular network port) to be transferred to the portion of DRAM (with appropriate stripping of packet headers, detection of missing packets, handling of TCP protocol details, etc.). In other embodiments, a DMA engine (e.g., DMA 220 as illustrated in FIG. 2) is programmed to perform the transfer (and the DMA engine provides the appropriate command(s) to the UMC).

In some embodiments, executable Code Update Process 1200 continues with Receive Executable Code and Copy to DRAM 1225. Packets received (e.g., on a known network port as part of the VPN connection) are processed and the contents of the packets are placed in the portion of DRAM. In various embodiments, contents of the packets are encrypted with a key of the executable code update: a selected one of the secondary or tertiary key (or any key associated with the entity performing the executable code update). In further embodiments, each packet is individually decryptable using the executable code update key. For example, if encryption is done in fixed-size units, each packet contains an integer number of the fixed-sized units.

In various embodiments, headers of packets are parsed and stripped, and the contents of the packets are placed in DRAM. In further embodiments, the packets are sequenced so that missing (e.g., dropped) packets can be detected. For example, using TCP, the sequence number specifies a byte offset in the stream, and the length of the data in the packet (determined from the Total Length in the IP header) specifies an amount of the executable code update in the packet. The TCP sequence number thus provides an offset into the portion of DRAM storing the executable code update, and the length of the data provides a number of bytes to write at that offset (enabling each packet to be written independently once it is received).

In various embodiments, a fixed number of missing packets is handled. For example, up to three packets are enabled to be missing (and may not be acknowledged, or may be negative-acknowledged) and if a fourth packet goes missing, reception of the executable code update fails (and is optionally and/or selectively be restarted).

In some embodiments, the offset is checked to ensure it is a positive number and/or is not larger than a size of DRAM allocated for the portion of DRAM.

In some embodiments, no integrity checking is performed on the executable code update as it is received as this advantageously simplifies reception, particularly in the event of out-of-order packets.

In various embodiments, section headers are parsed as the data is received to determine when the executable code update is received. In other embodiments, a network handshaking protocol (e.g., TCP acknowledgement of all packets) is used to determine when the executable code update is received.

While the executable code update is received encrypted, according to various embodiments it is transferred to the portion of DRAM: verbatim (e.g., without further encryption or decryption); decrypted using the executable code update key and re-encrypted using the executable code update key; and/or decrypted using the executable code update key and re-encrypted using another key, such as the default key.

In some embodiments, Executable Code Update Process 1200 continues with Executable Code Received Successfully? 1230. This operation verifies completeness of the executable code update transfer: that all expected data has arrived. In various embodiments, this operation is performed by the executable code update application.

According to various embodiments, the executable code update is determined to have all arrived when one or more of: a header of a section of the executable code update indicates a last section of the executable code update, and all of the executable code update is received; a header or other information provides a total expected length of the executable code update (e.g., this information is sent prior to the executable code update, such as separately and/or as part of the cleartext header, and is part of the information sent in the command to the UMC, and/or as part of the programming of the DMA performing the transfer; a TCP acknowledgment indicating that a data port (of the secure connection) has received all packets is received by the entity sending the executable code update, and the entity then sends a command on a control port (of the secure connection) indicating that all of the executable code update has been received; and a combination of the foregoing.

According to various embodiments, the executable code update is verified to have arrived correctly by one or more of: verifying an integrity check on the executable code update as it is received (this is potentially difficult because of out-of-order packets, having to operate at line rate, etc.); verifying an integrity check on the executable code update after it is stored in the portion of DRAM (but before the copy to the boot flash chip); verifying an integrity check on the executable code update as it is copied to the boot flash chip (this has the problem of corrupting one of the, e.g., two, copies of the executable code in the boot flash chip if the executable code update is not verified; verifying an integrity check on the executable code update after it is stored in the boot flash chip (this has the advantage of ensuring that the boot flash chip is able to be read properly during a subsequent boot operation); and a combination of the foregoing.

In various of the above embodiments, the integrity check(s) is either on the encrypted code (offering less protection) or encrypted along with the encrypted code (which advantageously is able to replace a separate authentication operation). In further embodiments, at least one of the integrity checks is the latter type.

Executable Code Update Process 1200 may continue with Enable Executable Code Transfer to Flash 1240, which operates similarly to Enable Reception of Executable Code Update 1220. In some embodiments, this operation may be automatic—once Enable Reception of Executable Code Update 1220 is complete, everything else may be performed in (immutable) H/W. In other embodiments, results may be returned to software (e.g., the executable code update application) after Enable Reception of Executable Code Update 1220, and software may then (if results report success) performs Enable Executable Code Transfer to Flash 1240 (a UMC command to set up further operations as with Enable Reception of Executable Code Update 1220).

In some embodiments, Executable Code Update Process 1200 continues with Copy Executable Code from DRAM to Flash 1245, e.g., using a process such as Write Flash Chip 900. According to various embodiments, the expanded version here optionally and/or selectively includes one or more of: using the executable code update key to decrypt the executable code update as it is read from the portion of DRAM; using another key, such as the default key, to decrypt the executable code update as it is read from the portion of DRAM; using the executable code update key to encrypt the executable code update as it is written to the boot flash chip; using another key, such as the default key, to encrypt the executable code update as it is written to the boot flash chip; and a combination of the foregoing.

In some embodiments, Executable Code Update Process 1200 continues with Executable Code Copied Successfully 1250, e.g., using operations such as Verify Flash Chip 975 (which references Integrity Check 560), and Confirm Status 1080.

In various embodiments, Executable Code Update Process 1200 continues with Update Version Information 1260, as explained above in relation to Update Process 1050 (as illustrated in FIG. 10B) for dual images of the executable code stored in the boot flash chip.

In some embodiments, Executable Code Update Process 1200 continues with Reboot 1270. This is an optional operation, depending on whether the executable code update is to be used immediately or (for example) on a next reboot. If the executable code update is to be used immediately, the processing chip is restarted (rebooted). In some embodiments, the entity that provided the update is notified prior to the reboot, and after a successful reboot.

Executable Code Update Process 1200 completes with Done 1290. Executable Code Update Process 1200 may end after Update Version Information 1260 and/or Reboot 1270.

Flash Chip Association Using the Update Process

In some embodiments, a portion or all of Update Process 1050 and/or a portion or all of Executable Code Update Process 1200 are also used as part of Procedure 790 at manufacturing time of the processing chip to perform and/or control Flash Chip Association 740 and/or Write Flash Chip Process 900. Using a portion or all of Update Process 1050 and/or a portion or all of Executable Code Update Process 1200 to perform and/or control Flash Chip Association 740 and/or Write Flash Chip Process 900 advantageously simplifies design of the processing chip by sharing functions. As part of Procedure 790, a (boot) flash chip and an external DRAM are coupled to the processing chip (or, a tester coupled to the processing chip is enabled to mimic the behavior of these chips). The boot flash chip initially stores unencrypted executable code including, for example, the bootloader, a kernel, and the executable code update application. First state in an on-chip ROM of the processing chip has an initial value enabling Secure Boot Process 500 to operate without decrypting contents read from the boot flash chip, and second state in the on-chip ROM (which in various embodiments is the same as the first state) enables one or more run-time programmable CPUs of the processing chip to read from DRAM without decryption (so as to be able to execute unencrypted code in DRAM). During Procedure 790 and prior to Flash Chip Association 740, at least one of the one or more run-time programmable CPUs is securely booted (by Secure Boot Process 500) which causes the unencrypted executable code in the boot flash chip to be copied to DRAM by Copy 550, thus performing a version of Copy Data to External Memory 910. Subsequent to at least a portion of Key Creation 720, the at least one of the one or more run-time programmable CPUs is enabled, by execution of a portion of the executable code copied to DRAM previously during Procedure 790, to copy the unencrypted executable code from the location in DRAM where it was stored by Secure Boot Process 500 (e.g., a first image) to a location in DRAM used by Update Process 1050 and/or Update Process 1200 to store an executable code update (e.g., a second image), and this copy is performed with encryption of the data written to DRAM so that the second image is encrypted. This copy is, in various embodiments, performed by a DMA engine (similar to Receive Executable Code and Copy to DRAM 1225, but from DRAM to DRAM instead of from an I/O interface to DRAM, and with encryption). Once there is an encrypted copy of the executable code stored in DRAM in the location in DRAM used by Update Process 1050 and/or Update Process 1200, Update Process 1050 and/or Update Process 1200 are able to 'update' the boot flash chip by copying the encrypted copy of the executable code from DRAM to the boot flash chip. (For example, Update Process 1200 begins with Enable Executable Code Transfer to Flash 1240, assuming that operations through Receive Executable Code and Copy to DRAM 1225 and Executable Code Received Successfully 1230 have been performed in this alternate manner.) Subsequent to verification of the 'update' to the boot flash chip, the first state in the on-chip ROM is changed so that subsequent operations of Secure Boot Process 500 expect encrypted code in the boot flash chip, and the second state in the on-chip ROM is changed so that data read from the DRAM by the one or more run-time programmable CPUs is decrypted.

In various embodiments, the above operations are performed separately for two or more entities, such as for a fabrication entity and an OEM entity. In other embodiments, the above operations are performed for the fabrication entity, and a portion of the boot flash chip reserved for the OEM entity is initially written not using Procedure 790, but using Update Process 1050 and/or Update Process 1200.

There are many other techniques contemplated for performing part of Procedure 790, such as Flash Chip Association 740 and/or Write Flash Chip Process 900. In a first example, other techniques are used to provide an encrypted copy of the executable code in DRAM, and Update Process 1050 and/or Update Process 1200 are used to copy the encrypted executable code to the boot flash chip. In a second example, the unencrypted executable code is copied to DRAM from the boot flash chip as above, and techniques other than Update Process 1050 and/or Update Process 1200 are used to write an encrypted version of the executable code into the boot flash chip.

Other Embodiment Details

Many variations of the techniques described above are contemplated.

While the description above has generally referred to a processing chip with multiple keys, in other embodiments a processing chip has any number of keys including just a single key. In a first example, a processing chip with a single key encrypts (and decrypts) the boot flash chip and data in external memory with the single key. In a second example, a processing chip with a single key either encrypts (and decrypts) at least some of the boot flash chip and/or at least some data in external memory with the single key, and uses key-less scrambling to encrypt (and decrypt) at least some of the boot flash chip and/or at least some data in external memory.

In some embodiments, a power-on reset and a restart reset (a reboot when already powered on) perform different operations. In a first example, a restart advantageously skips the SPD operation (which determines types and amounts of external memory), because this is already known. In a second example, to ensure that there is no contamination across a restart, volatile memories are erased (such as by being power-cycled, or by writing a known value to multiple locations) as part of the H/W boot sequence for a restart. Many other possible differences between a power-on reset and a restart reset are application-dependent. Alternatively, some embodiments prohibit restart resets so that resets perform identically. Further, various of these embodiments actively power-cycle one or more chips in the system, such as for 30 seconds or more, if a reset is performed while the system is powered on.

The techniques above generally referred to copying contents of the boot flash chip to a volatile memory, such as DRAM, as part of the H/W boot sequence. While this is generally preferable for performance, some embodiments copy contents of the boot flash chip to a non-volatile memory, such as NAND flash. For example, some embodiments accelerate a restart reset (vs. a power-on reset) by being able to skip the copying of the contents of the boot flash chip and instead begin executing directly from the copy of the boot flash chip already stored in NAND flash. This faster-restart approach is made more secure by reserving for use with the NAND flash one of the KMU initial keys that is not usable for writing to external memory other than during the H/W boot sequence (so that software is unable to modify the copy of the boot flash chip already stored in NAND flash without rendering it unusable). Or in variant embodiments, where the contents of the boot flash chip have been encrypted with a particular one of the KMU initial keys that is not usable for encryption other than at manufacturing time, maintaining the same encryption on the NAND flash as on the boot flash chip and using the particular key for decryption whenever the copy of the contents of the boot flash chip is read from the NAND flash.

Various embodiments have described security features, such as protecting contents of the boot flash chip from modification or replacement, by restricting software use for encryption of a particular one of the KMU initial keys used to encrypt at least some of the contents of the boot flash chip. This may still leave an exposure to viruses or malware if software is still able to use the particular key for decryption, as decryption using known data patterns possibly yields knowledge of the particular key. Accordingly, in some embodiments, at least one of the keys used to encrypt at least some of the contents of the boot flash chip is only usable by immutable hardware (and is not, for example, able to be specified for use by a CPU in an operation, such as a DMA operation).

There are fewer examples above of a use or a selection of different encryption/decryption techniques as there are examples of a use of different ones of the KMU initial keys. In various embodiments, encryption (and the corresponding decryption) or decryption (and the corresponding encryption) is optionally and/or selectively able to use a given one of one or more encryption/decryption techniques in the processing chip, including key-less scrambling techniques.

There are many ways in which selection of keys and/or of encryption (and corresponding decryption) techniques are performed. According to various embodiments, for a given memory access, a selection of a particular key (from among the KMU initial keys and optionally and/or selectively also from among similar software-created keys) and/or a selection of a particular encryption (and the corresponding decryption) technique (from among a set of techniques supported in the processing chip) is one or more of: based on a particular external memory interface accessed; based on a particular type of memory chip (such as NAND flash) accessed; based on a particular function of memory chip (such as the boot flash chip) accessed; based on an accessed range of memory in an address map; based on an accessed Translation Look-aside Buffer (TLB) entry of one of the CPUs in the processing chip; specified in immutable hardware as part of the H/W boot sequence, optionally and/or selectively during the H/W boot sequence; under software control, such as part of DMA control operation for a DMA operation; other similar techniques for selection of keys and/or techniques; and a combination of the foregoing.

Fuses (or antifuses) that are changeable at manufacturing time are one example of an on-chip, one-time programmable ROM (as defined above). In some embodiments, other types of on-chip, one-time programmable ROMs are used instead of fuses, and some of these types are one-time programmable in the field. While the description above has used 'manufacturing-time' to describe when one-time programmable ROMs are configured, in some embodiments field-programmable, one-time-programmable memories enable greater flexibility in when one or more of the manufacturing-time operations are performed. In a first example, the KMU initial keys (which are unique to a given processing chip) are created at a chip-level manufacturing time, but the association between the processing chip and a boot flash chip (made by writing executable code encrypted with one of the KMU initial keys into the boot flash chip), including programming one-time-programmable settings that are changed when this is complete, is made at a later time, such as at a system-level manufacturing time. In a second example, at least part of the H/W boot sequence is performed using a microcontroller executing code from an on-chip, one-time programmable ROM that is field-programmable. This enables the code executed by the microcontroller to be configured at a system-level manufacturing time, rather than at the manufacturing time of the processing chip.

In some embodiments, the immutable hardware of the processing chip implements a special state of a particular one of the run-time programmable CPUs so that the particular CPU acts as a microcontroller during the immutable H/W boot sequence. The special state prevents the particular CPU from executing arbitrary code, allows it to access code similar to a microcontroller, such as code in an on-chip ROM, and disables interfaces to the particular CPU (such as a JTAG scan chain or an ICE interface) that enable operations of the CPU to be observed. In various embodiments, the special state also restricts the particular CPU from performing certain operations, such as disabling encryption, accessing external I/O, or disabling an ability to remove other run-time programmable CPUs from a reset state. In further embodiments, the particular CPU is reset after it, acting as a microcontroller, has performed its part of the H/W boot sequence. A CPU in the special state is considered a microcontroller in the present disclosure as it is not able to execute code other than that which is part of the immutable H/W boot sequence.

In various embodiments, debug interfaces, such as an In-Circuit Emulate (ICE) interface, are disabled during at least an initial portion of the HW boot sequence. In further embodiments, debug interfaces are disabled at reset of the processing chip and are enableable by software as part of the S/W boot sequence.

In some embodiments, external memory is not fully encrypted. For example, certain external memory interfaces, certain types of memory chips, or certain ranges of addresses used to address external memory are maintained unencrypted (in the clear). In various embodiments, executable code is kept in encrypted memory, but a use of unencrypted memory for some less-critical data advantageously enables faster access to the less-critical data (avoiding latency of encryption/decryption via the CE). Alternatively, in other embodiments, instead of maintaining the less-critical data in the clear, the less-critical data uses a lower latency type of encryption/decryption (e.g., scrambling) vs. the encryption/decryption used for executable code (e.g., AES, RSA or elliptic curve).

The memory chips in the present disclosure have been described as being external to the processing chip. In some embodiments, one or more of the external memory chips, while still being separate integrated circuits, are contained in a same package as the processing chip, such as by using stacked die packaging (e.g., with Through-Silicon Vias), Chip-On-Chip (COC) packaging, and/or other multi-chip packaging techniques. In various embodiments, given appropriate technology, some of the memory chips that are in the present disclosure described as external are optionally and/or selectively integrated in a same integrated circuit as the processing chip. In a first example, given an appropriate integrated circuit manufacturing process, the boot flash chip (or at least an initial portion thereof) is integrated on a same integrated circuit die as the processing chip, providing a more compact solution and additional security. In a second example, a volatile memory, such as a DRAM or an SRAM, is integrated on a same integrated circuit die as the processing chip and serves as the 'external' memory into which at least some contents of the boot flash chip are copied. Continuing the second example, optionally and/or selectively a first portion of the contents of the boot flash chip is copied into the on-chip 'external' memory, and a second portion is copied to an external memory that is not on-chip.

Any of the techniques described in the present disclosure, such as one or more of the techniques that are performed selectively, are controlled according to various embodiments by state in an on-chip ROM (such as by one or more manufacturing-time fuses or other on-chip, one-time programmable memory), and some examples of this control have been explicitly described in the present disclosure. Use of on-chip ROM state allows a level of customization of an integrated circuit so that, according to a various state in the on-chip ROM, particular features or processes/procedures (or individual operations thereof) are enabled or disabled from operation. Of course, some embodiments provide software enables and disables for various features or processes/procedures (or individual operations thereof), such as through software-settable Control/Status Registers (CSRs). In further embodiments, however, software control is restricted to features that have no impact on security, and/or such software control is over-rideable by state that is settable in an on-chip ROM. For example, some embodiments have an on-chip ROM state controlling whether updates of the boot flash chip are enabled or disabled, but there is no corresponding software control of this function.

Example Implementation Techniques

In some embodiments, various combinations of one or more portions of operations performed for and/or structure associated with the techniques described in the present disclosure (such as secure boot) and/or systems implementing the techniques, as well as portions of a processor, microprocessor, system-on-a-chip, application-specific-integrated-circuit, hardware accelerator, or other circuitry providing at least portions of the aforementioned operations, are specified by a specification compatible with processing by a computer system. The specification is in accordance with various descriptions, such as hardware description languages, circuit descriptions, netlist descriptions, mask descriptions, or layout descriptions. Example descriptions include: Verilog, VHDL, SPICE, SPICE variants such as PSpice, IBIS, LEF, DEF, GDS-II, OASIS, or other descriptions. In various embodiments, the processing includes a combination of interpretation, compilation, simulation, and synthesis to produce, to verify, or to specify logic and/or circuitry suitable for inclusion on one or more integrated circuits. A given integrated circuit, according to various embodiments, is compatible with design and/or manufacture according to a variety of techniques. The techniques include a programmable technique (such as a field or mask-programmable gate array integrated circuit), a semi-custom technique (such as a wholly or partially cell-based integrated circuit), and a full-custom technique (such as an integrated circuit that is substantially specialized), a combination thereof, or another technique compatible with design and/or manufacture of integrated circuits.

In some embodiments, various combinations of at least portions of operations as described by a computer readable medium having a set of instructions stored tin the present disclosure, are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with a standard programming or scripting language (such as assembly language, C, C++, Fortran, Pascal, Ada, Java, VBscript, and Shell). One or more of the program instructions, the language statements, or the binary instructions, are optionally stored on one or more computer readable storage medium elements. In various embodiments, some, all, or various portions of the program instructions are realized as one or more functions, routines, subroutines, in-line routines, procedures, macros, or portions thereof.

Certain choices have been made in the description merely for convenience in preparing the text and drawings, and unless there is an indication to the contrary, the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

Various forms of the words 'include' and 'comprise' are specifically intended to be construed as abstractions describing logical sets of open-ended scope and are not meant to convey physical containment unless described explicitly (such as followed by the word 'within').

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in a given component block. The names given to interconnect and logic are merely exemplary, and should not be construed as limiting the concepts described. The order and arrangement of flow-chart and flow diagram process, action, and function elements are variable according to various embodiments. Also, unless specifically stated to the contrary, value ranges specified, maximum and minimum values used, or other particular specifications (such as file types; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, subroutines, in-line routines, procedures, macros, or portions thereof. It is also understood that many functional aspects of embodiments are realizable selectively in either hardware (e.g., generally dedicated circuitry) or software (e.g., via some manner of programmed controller or processor), as a function of embodiment-dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described in the present disclosure in accordance with the unique engineering and business constraints of a particular application.

The embodiments have been described with detail and environmental context well beyond that used for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described in the present disclosure.

All such variations in design are insubstantial changes over the teachings conveyed by the described embodiments. It is also understood that the embodiments described in the present disclosure have broad applicability to other computing and networking applications, and are not limited to the particular application or industry of the described embodiments. The invention is thus to be construed as including possible modifications and variations encompassed within the scope of the claims of the issued patent.

What is claimed is:

1. A method for performing an executable code update, comprising:
    receiving, at a processing chip and via a secure network connection, the executable code update to executable code stored in a boot flash chip coupled to the processing chip;
    writing, via immutable hardware, the executable code update to a portion of external memory coupled to the processing chip that is only accessible to the immutable hardware of the processing chip;
    copying, via the immutable hardware, the executable code update from the portion of the external memory to the boot flash chip; and
    establishing the secure network connection between the processing chip and an external entity possessing a public portion of a key with which the executable code update is encrypted, wherein a private portion of the key is unique to the processing chip and is stored solely within the processing chip, wherein the key is generated using a physically unclonable function in autonomous hardware in the processing chip.

2. The method of claim 1, wherein the private portion of the key is accessible solely by the immutable hardware.

3. The method of claim 1, wherein the method further comprises:
    securely booting one or more central processing units (CPUs) of the processing chip by the immutable hardware performing operations comprising:
    reading the executable code update from the boot flash chip;
    decrypting the read executable code update using the private portion of the key; and
    satisfying an initial instruction fetch of one of the CPUs with a portion of the decrypted executable code update.

4. The method of claim 1, wherein the method further comprises excluding access by one or more central processing units (CPUs) of the processing chip to the portion of the external memory via an address map; and
    wherein the one or more CPUs are configured to be securely booted by the immutable hardware to execute code read from the boot flash chip.

5. The method of claim 4, wherein the portion of the external memory is a first portion of a volatile memory and wherein the method further comprises including access by the one or more CPUs to at least another portion of the volatile memory via the address map.

6. The method of claim 1, wherein the method further comprises enabling, via software executing on a central processing unit (CPU) of the processing chip, the immutable hardware to perform the writing of the executable code update.

7. The method of claim 1, wherein the method further comprises enabling, via software executing on a run-time programmable central processing unit (CPU) of the processing chip, the immutable hardware to perform the copying of the executable code update.

8. The method of claim 7, wherein the enabling comprises issuing a command to a unified memory controller that causes the unified memory controller to set a state in a direct memory access (DMA) controller to perform the copying of the executable code update.

9. The method of claim 1, wherein the copying of the executable code update comprises performing an integrity check on the executable code update.

10. The method of claim 1, wherein the key is one of multiple keys.

11. The method of claim 1, wherein the key is unusable for subsequent encryption operations.

12. A system, comprising:
a processing chip having immutable hardware and a network interface configured to establish a secure network connection;
a boot flash chip coupled to the processing chip configured to store executable code; and
external memory coupled to the processing chip, wherein the processing chip is configured to:
receive, via the secure network connection, executable code update to the executable code stored in the boot flash chip;
write, via the immutable hardware, the executable code update to a portion of external memory, wherein the portion of the external memory is only accessible to the immutable hardware of the processing chip;
copy, via the immutable hardware, the executable code update from the portion of the external memory to the boot flash chip; and
establish the secure network connection between the processing chip and an external entity possessing a public portion of a key with which the executable code update is encrypted, wherein a private portion of the key is unique to the processing chip and is stored solely within the processing chip, wherein the key is generated using a physically unclonable function in autonomous hardware in the processing chip.

13. A processing chip, comprising:
a network interface configured to establish a secure network connection; and
immutable hardware, wherein the processing chip is configured to:
receive, via the secure network connection, an executable code update to executable code associated with a boot flash chip;
write, via the immutable hardware, the executable code update to a portion of external memory that is only accessible to the immutable hardware of the processing chip; and
copy, via the immutable hardware, the executable code update from the portion of the external memory to the boot flash chip,
wherein the processing chip is configured to establish the secure network connection between the processing chip and an external entity possessing a public portion of a key with which the executable code update is encrypted; and
wherein a private portion of the key is unique to the processing chip and is stored solely within the processing chip, wherein the key is generated using a physically unclonable function in autonomous hardware in the processing chip.

14. The processing chip of claim 13, wherein the private portion of the key is accessible solely by the immutable hardware.

15. The processing chip of claim 13, wherein the processing chip comprises one or more central processing units (CPUs); and
wherein the processing chip is configured to securely boot the one or more CPUs by the immutable hardware performing operations comprising:
reading the executable code update from the boot flash chip;
decrypting the read executable code update using the private portion of the key; and
satisfying an initial instruction fetch of one of the CPUs with a portion of the decrypted executable code update.

16. The processing chip of claim 13, wherein the processing chip comprises one or more central processing units (CPUs);
wherein the processing chip is configured to exclude access by the one or more CPUs to the portion of the external memory via an address map; and
wherein the one or more CPUs are configured to be securely booted by the immutable hardware to execute code read from the boot flash chip.

17. The processing chip of claim 13, wherein the processing chip comprises a central processing unit (CPU); and
wherein the processing chip is configured to enable, via software executing on the CPU, the immutable hardware to perform the writing of the executable code update.

18. The processing chip of claim 13, wherein the processing chip comprises a run-time programmable central processing unit (CPU); and
wherein the processing chip is configured to enable, via software executing on the run-time programmable CPU, the immutable hardware to perform the copying of the executable code update.

19. The processing chip of claim 13, wherein the key is one of multiple keys.

20. The processing chip of claim 13, wherein the key is unusable for subsequent encryption operations.

* * * * *